US012287416B2

(12) United States Patent
Clark et al.

(10) Patent No.: US 12,287,416 B2
(45) Date of Patent: Apr. 29, 2025

(54) LIVE SONAR SYSTEMS AND METHODS

(71) Applicant: NAVICO, INC., Tulsa, OK (US)

(72) Inventors: Jeremiah D. Clark, Tulsa, OK (US); Dustyn P. Pendergraft, Claremore, OK (US)

(73) Assignee: Navico, Inc., Tulsa, OK (US)

( * ) Notice: Subject to any disclaimer, the term of this patent is extended or adjusted under 35 U.S.C. 154(b) by 419 days.

(21) Appl. No.: 17/891,354

(22) Filed: Aug. 19, 2022

(65) Prior Publication Data
US 2022/0390542 A1 Dec. 8, 2022

Related U.S. Application Data

(63) Continuation-in-part of application No. 17/174,415, filed on Feb. 12, 2021, now Pat. No. 11,500,054, (Continued)

(51) Int. Cl.
G01S 3/801 (2006.01)
G01S 3/802 (2006.01)
(Continued)

(52) U.S. Cl.
CPC .............. G01S 3/801 (2013.01); G01S 3/802 (2013.01); G06F 3/0412 (2013.01); (Continued)

(58) Field of Classification Search
CPC ........ G01S 3/801; G01S 3/802; G01S 7/6236; G01S 7/6272; G01S 7/629; G01S 15/87; (Continued)

(56) References Cited

U.S. PATENT DOCUMENTS 3,572,837 A * 3/1971 Lackey ..................... B60P 1/26
  298/23 S
4,425,635 A 1/1984 Yamamoto et al.
(Continued)

FOREIGN PATENT DOCUMENTS

AU 2004258175 B2 9/2009
AU 2010273842 A1 * 2/2012 ............. G01S 15/89
(Continued)

OTHER PUBLICATIONS

European Examination Report issued in Application No. 19174327.7 dated Mar. 7, 2023.
(Continued)

Primary Examiner — Daniel Pihulic
(74) Attorney, Agent, or Firm — Nelson Mullins Riley & Scarborough LLP

(57) ABSTRACT

A system for generating live sonar images is provided having a first and second sonar transducer assembly. The sonar transducer assemblies each have sonar transducer elements configured to transmit sonar beam(s) into an underwater environment to form respective coverage volumes. The sonar transducer assemblies each define a respective facing direction. The system includes bracket(s) having alignment feature(s). The bracket(s) are configured to mount the sonar transducer assemblies to a watercraft, and the alignment feature(s) are configured to position the sonar transducer assemblies so that the facing directions are different and relative to each other so as to create continuous coverage of the underwater environment. Continuous coverage has an overall coverage volume that is greater than either of the coverage volumes individually. Sonar return data from the sonar transducer elements is used to form a live sonar image representative of sonar returns received from the overall coverage volume.

20 Claims, 32 Drawing Sheets

Related U.S. Application Data which is a continuation-in-part of application No. 17/123,189, filed on Dec. 16, 2020, now Pat. No. 11,435,427, which is a continuation of application No. 15/982,362, filed on May 17, 2018, now Pat. No. 10,914,810.

(51) Int. Cl.
*G06F 3/041* (2006.01)
*G06F 3/04845* (2022.01)
*G06F 3/0488* (2022.01)
*G09B 29/00* (2006.01)
*H04N 1/00* (2006.01)

(52) U.S. Cl.
CPC ........ *G06F 3/04845* (2013.01); *G06F 3/0488* (2013.01); *G09B 29/003* (2013.01); *H04N 1/00411* (2013.01)

(58) Field of Classification Search
CPC ........ G01S 15/89; G01S 7/521; G06F 3/0412; G06F 3/04845; G06F 3/0488; G09B 29/003; H04N 1/00411
See application file for complete search history.

(56) References Cited

U.S. PATENT DOCUMENTS

| | | | |
|---|---|---|---|
| 4,970,700 | A * | 11/1990 | Gilmour ............ G10K 11/352 367/88 |
| 5,228,008 | A * | 7/1993 | Burhanpurkar ......... G12B 9/08 367/165 |
| 5,311,095 | A | 5/1994 | Smith et al. |
| 5,329,496 | A | 7/1994 | Smith |
| 5,548,564 | A | 8/1996 | Smith |
| 5,744,898 | A | 4/1998 | Smith et al. |
| 5,923,617 | A | 7/1999 | Thompson et al. |
| 6,520,105 | B2 | 2/2003 | Koda et al. |
| 6,678,210 | B2 | 1/2004 | Rowe |
| 7,035,166 | B2 | 4/2006 | Zimmerman et al. |
| 7,106,656 | B2 | 9/2006 | Lerro et al. |
| 7,123,546 | B2 | 10/2006 | Zimmerman et al. |
| 7,173,879 | B2 | 2/2007 | Zimmerman et al. |
| 7,215,598 | B2 * | 5/2007 | Guthmann .......... G01S 15/8902 367/88 |
| 7,330,399 | B2 | 2/2008 | Lerro et al. |
| 7,355,924 | B2 | 4/2008 | Zimmerman et al. |
| 7,453,769 | B2 | 11/2008 | Kirschner et al. |
| 7,542,376 | B1 | 6/2009 | Thompson et al. |
| 7,542,377 | B2 | 6/2009 | Kirschner et al. |
| 7,606,114 | B2 | 10/2009 | Bachelor et al. |
| 7,847,925 | B2 | 12/2010 | Vogt |
| 7,852,709 | B1 | 12/2010 | Lerro et al. |
| 7,889,600 | B2 | 2/2011 | Thompson et al. |
| 7,957,609 | B2 | 6/2011 | Lu et al. |
| 8,254,208 | B2 | 8/2012 | Vogt |
| 8,300,499 | B2 | 10/2012 | Coleman et al. |
| 8,345,511 | B1 | 1/2013 | Rikoski |
| 8,514,659 | B2 | 8/2013 | Vogt |
| 8,605,550 | B2 * | 12/2013 | Maguire ............ G01S 15/8902 367/88 |
| 8,638,362 | B1 | 1/2014 | Thompson et al. |
| 8,645,012 | B2 | 2/2014 | Salmon et al. |
| 8,717,847 | B2 | 5/2014 | Blake |
| 8,761,976 | B2 | 6/2014 | Salmon et al. |
| 8,811,120 | B2 | 8/2014 | Bachelor et al. |
| 8,814,795 | B2 | 8/2014 | Derode et al. |
| 8,940,312 | B2 | 1/2015 | Hayashi et al. |
| RE45,379 | E | 2/2015 | Rowe |
| 8,964,507 | B2 | 2/2015 | Bachelor et al. |
| 9,132,900 | B2 | 9/2015 | Salmon et al. |
| 9,135,731 | B2 | 9/2015 | Lauenstein et al. |
| 9,182,486 | B2 | 11/2015 | Brown et al. |
| RE45,823 | E | 12/2015 | Vogt |
| 9,218,799 | B2 | 12/2015 | Stytsenko et al. |
| 9,322,915 | B2 | 4/2016 | Betts et al. |
| 9,386,964 | B2 | 7/2016 | Bagge |
| 9,664,783 | B2 | 5/2017 | Brown et al. |
| 9,739,884 | B2 | 8/2017 | Proctor et al. |
| 9,766,328 | B2 | 9/2017 | Black et al. |
| 9,784,825 | B2 | 10/2017 | Brown et al. |
| 9,784,826 | B2 | 10/2017 | Matson et al. |
| 9,784,832 | B2 | 10/2017 | Proctor et al. |
| 9,812,118 | B2 | 11/2017 | Matson et al. |
| 9,840,312 | B1 | 12/2017 | Clark |
| 9,846,232 | B1 | 12/2017 | Thompson et al. |
| 9,947,309 | B2 | 4/2018 | Stokes et al. |
| 10,012,731 | B2 | 7/2018 | Pelin et al. |
| 10,019,002 | B2 | 7/2018 | Harnett et al. |
| 10,067,228 | B1 | 9/2018 | Steenstrup et al. |
| 10,107,908 | B2 | 10/2018 | Betts et al. |
| 10,114,119 | B2 | 10/2018 | Horner et al. |
| 10,197,674 | B2 | 2/2019 | Thompson et al. |
| 10,215,849 | B2 | 2/2019 | Kozuki |
| 10,241,200 | B2 | 3/2019 | Sayer et al. |
| 10,247,832 | B2 | 4/2019 | Serafino et al. |
| 10,310,062 | B2 | 6/2019 | Coleman et al. |
| 10,311,715 | B2 | 6/2019 | Jopling |
| 10,365,356 | B2 | 7/2019 | Stokes et al. |
| 10,365,366 | B2 | 7/2019 | Lauenstein |
| 10,408,933 | B1 | 9/2019 | DeHart et al. |
| 10,502,820 | B2 | 12/2019 | Zimmerman et al. |
| 10,513,322 | B2 * | 12/2019 | Clark ................. B63H 20/007 |
| 10,514,451 | B2 | 12/2019 | Brown et al. |
| 10,545,226 | B2 | 1/2020 | Wigh et al. |
| 10,545,235 | B2 | 1/2020 | Pelin et al. |
| 10,605,913 | B2 | 3/2020 | Coleman et al. |
| 10,843,781 | B2 * | 11/2020 | Clark ................... B63H 21/21 |
| 10,852,429 | B2 * | 12/2020 | Gatland ................ G01S 7/6281 |
| 10,890,660 | B2 * | 1/2021 | Wigh ................... G01S 7/521 |
| 10,914,810 | B2 | 2/2021 | Laster et al. |
| 11,059,556 | B2 | 7/2021 | Ahlgren |
| 11,125,866 | B2 | 9/2021 | Sumi et al. |
| 11,220,317 | B2 * | 1/2022 | Clark .................... H04L 63/08 |
| 11,249,176 | B2 | 2/2022 | Hooper |
| 11,367,425 | B2 * | 6/2022 | Antao ................. G10K 11/006 |
| 11,435,427 | B2 | 9/2022 | Laster et al. |
| 11,500,054 | B2 | 11/2022 | Clark |
| 11,585,921 | B2 * | 2/2023 | Proctor ................. G01S 7/524 |
| 11,796,661 | B2 * | 10/2023 | Caspall ................ G01S 7/521 |
| 11,921,200 | B1 * | 3/2024 | Clark ................... G01S 15/89 |
| 11,971,478 | B2 * | 4/2024 | Combs ................... G01S 7/56 |
| 2003/0235112 | A1 | 12/2003 | Zimmerman et al. |
| 2005/0007882 | A1 | 1/2005 | Bachelor et al. |
| 2007/0159922 | A1 | 7/2007 | Zimmerman et al. |
| 2008/0130413 | A1 * | 6/2008 | Bachelor ............. G10K 11/343 367/103 |
| 2009/0037040 | A1 | 2/2009 | Salmon et al. |
| 2010/0067330 | A1 | 3/2010 | Collier et al. |
| 2010/0074057 | A1 | 3/2010 | Bachelor et al. |
| 2010/0284248 | A1 | 11/2010 | Wang et al. |
| 2011/0013485 | A1 * | 1/2011 | Maguire ................ G01S 15/89 367/88 |
| 2013/0021876 | A1 * | 1/2013 | Maguire .................. G01S 7/56 367/88 |
| 2014/0013270 | A1 | 1/2014 | Thomas et al. |
| 2014/0013276 | A1 | 1/2014 | Butterworth |
| 2014/0050051 | A1 | 2/2014 | Vogt |
| 2014/0071059 | A1 | 3/2014 | Girault |
| 2014/0092709 | A1 | 4/2014 | Miller et al. |
| 2014/0096060 | A1 | 4/2014 | Thomas et al. |
| 2014/0258935 | A1 | 9/2014 | Nishida et al. |
| 2014/0336854 | A1 | 11/2014 | Salmon et al. |
| 2015/0142211 | A1 | 5/2015 | Shehata et al. |
| 2016/0054733 | A1 | 2/2016 | Hollida et al. |
| 2016/0061951 | A1 | 3/2016 | Brown et al. |
| 2016/0214715 | A1 | 7/2016 | Meffert |
| 2016/0259049 | A1 | 9/2016 | Proctor et al. |
| 2016/0259050 | A1 | 9/2016 | Proctor et al. |
| 2016/0259051 | A1 | 9/2016 | Proctor et al. |
| 2016/0259052 | A1 | 9/2016 | Kirmani |
| 2016/0306040 | A1 | 10/2016 | Hunt et al. |
| 2016/0341827 | A1 | 11/2016 | Horner et al. |

(56) References Cited

U.S. PATENT DOCUMENTS

| | | | |
|---|---|---|---|
| 2017/0031022 A1 | 2/2017 | Ivanov | |
| 2017/0031023 A1 | 2/2017 | Ivanov | |
| 2017/0038344 A1 | 2/2017 | Capus et al. | |
| 2017/0212230 A1* | 7/2017 | Wigh | G01S 15/10 |
| 2017/0235308 A1 | 8/2017 | Gordon et al. | |
| 2017/0242113 A1 | 8/2017 | Lauenstein | |
| 2017/0363739 A1 | 12/2017 | Lauenstein | |
| 2017/0371039 A1 | 12/2017 | Clark et al. | |
| 2018/0100922 A1* | 4/2018 | Wigh | G01S 15/87 |
| 2018/0107210 A1 | 4/2018 | Harnett et al. | |
| 2018/0224544 A1 | 8/2018 | Ivanov | |
| 2018/0275649 A1 | 9/2018 | Harnett et al. | |
| 2018/0288990 A1 | 10/2018 | Laster et al. | |
| 2019/0079185 A1 | 3/2019 | Steenstrup et al. | |
| 2019/0088239 A1* | 3/2019 | Antao | G01S 7/521 |
| 2019/0113619 A1 | 4/2019 | Laster | |
| 2019/0176952 A1* | 6/2019 | Clark | H04L 63/08 |
| 2019/0176953 A1* | 6/2019 | Clark | G06F 21/36 |
| 2019/0235075 A1 | 8/2019 | Thompson et al. | |
| 2019/0242994 A1 | 8/2019 | Wanis et al. | |
| 2019/0265354 A1 | 8/2019 | Antao et al. | |
| 2019/0353744 A1 | 11/2019 | Laster et al. | |
| 2020/0011965 A1 | 1/2020 | Stokes et al. | |
| 2020/0011981 A1 | 1/2020 | Stokes et al. | |
| 2020/0070943 A1* | 3/2020 | Clark | H04L 63/08 |
| 2020/0072953 A1* | 3/2020 | Wigh | G01S 15/89 |
| 2020/0088840 A1 | 3/2020 | Stokes et al. | |
| 2020/0103512 A1 | 4/2020 | Brown et al. | |
| 2020/0116843 A1 | 4/2020 | Zimmerman et al. | |
| 2020/0158842 A1 | 5/2020 | Wigh et al. | |
| 2020/0241133 A1 | 7/2020 | Laster | |
| 2020/0256967 A1* | 8/2020 | Wigh | G01S 7/521 |
| 2020/0300994 A1 | 9/2020 | Matson et al. | |
| 2021/0096244 A1* | 4/2021 | Wigh | G01S 15/87 |
| 2021/0141048 A1 | 5/2021 | Laster et al. | |
| 2021/0165068 A1 | 6/2021 | Clark | |
| 2021/0173061 A1 | 6/2021 | Fyler et al. | |
| 2021/0263150 A1 | 8/2021 | Stokes | |
| 2021/0364636 A1 | 11/2021 | Simonton | |
| 2021/0389439 A1 | 12/2021 | Sumi et al. | |
| 2022/0035026 A1 | 2/2022 | Proctor | |
| 2022/0035027 A1 | 2/2022 | Proctor | |
| 2022/0089267 A1* | 3/2022 | Clark | G06F 21/36 |
| 2022/0113393 A1 | 4/2022 | Nishimori et al. | |
| 2022/0120882 A1 | 4/2022 | Coleman et al. | |
| 2022/0373663 A1* | 11/2022 | Caspall | B63B 45/08 |
| 2022/0373678 A1* | 11/2022 | Combs | G05D 1/43 |
| 2022/0381906 A1* | 12/2022 | Combs | G01S 15/93 |
| 2022/0390542 A1* | 12/2022 | Clark | G09B 29/003 |
| 2022/0404491 A1 | 12/2022 | Caspall et al. | |
| 2023/0111196 A1* | 4/2023 | Proctor | G01S 15/96 |
| | | | 367/153 |
| 2023/0143089 A1* | 5/2023 | Pendergraft | B63H 20/007 |
| | | | 701/2 |
| 2024/0061105 A1* | 2/2024 | Clark | G01S 7/6281 |

FOREIGN PATENT DOCUMENTS

| | | | | |
|---|---|---|---|---|
| AU | 2009283312 B8 | 6/2015 | | |
| AU | 2015201220 B2 * | 2/2017 | | G01S 15/89 |
| AU | 2019213353 A1 | 8/2019 | | |
| AU | 2019203322 A1 | 12/2019 | | |
| AU | 2019203322 B2 | 12/2020 | | |
| AU | 2019283811 B2 | 9/2021 | | |
| AU | 2021229158 A1 * | 9/2021 | | G01S 15/003 |
| AU | 2022202065 A1 * | 12/2022 | | G01S 15/42 |
| AU | 2022203017 A1 * | 12/2022 | | B63H 21/21 |
| AU | 2021229158 B2 * | 6/2023 | | G01S 15/003 |
| AU | 2022203017 B2 * | 8/2023 | | B63H 21/21 |
| AU | 2023270184 A1 * | 12/2023 | | B63H 21/21 |
| AU | 2023263507 A1 * | 7/2024 | | G01S 15/42 |
| CA | 2530290 C | 11/2015 | | |
| CA | 2899119 A1 | 1/2017 | | |
| CA | 2928461 A1 | 1/2017 | | |
| CA | 2993361 A1 | 2/2017 | | |
| CA | 3032163 A1 | 8/2019 | | |
| CA | 3042656 A1 | 11/2019 | | |
| CA | 3121772 C * | 9/2023 | | G01S 15/42 |
| CA | 3221275 A1 * | 6/2024 | | G01S 15/42 |
| CA | 3223790 A1 * | 6/2024 | | B63B 79/10 |
| CN | 105759257 A | 7/2016 | | |
| CN | 110493698 A | 11/2019 | | |
| DE | 202010018577 U1 * | 11/2017 | | G01S 15/89 |
| DE | 202010018565 U1 * | 12/2017 | | G01S 15/89 |
| EP | 1925949 A1 | 5/2008 | | |
| EP | 2294452 B1 | 12/2011 | | |
| EP | 2612165 A1 | 7/2013 | | |
| EP | 3084467 A2 | 10/2016 | | |
| EP | 3144700 A1 | 3/2017 | | |
| EP | 1656568 B1 | 12/2017 | | |
| EP | 3325997 A1 | 5/2018 | | |
| EP | 3479138 A1 | 5/2019 | | |
| EP | 3572837 A1 | 11/2019 | | |
| EP | 2326970 B1 | 10/2020 | | |
| EP | 2956796 B1 | 4/2022 | | |
| EP | 4009069 A1 | 6/2022 | | |
| EP | 4043915 A1 * | 8/2022 | | G01S 15/42 |
| EP | 4092444 A1 * | 11/2022 | | B63H 21/21 |
| EP | 4386440 A1 * | 6/2024 | | G01S 15/42 |
| EP | 4393811 A1 * | 7/2024 | | B63H 79/10 |
| JP | 2004-080577 A | 3/2004 | | |
| JP | 2007-535195 A | 11/2007 | | |
| JP | 2008-508539 A | 3/2008 | | |
| JP | 2010-261883 A | 11/2010 | | |
| JP | 5600678 B2 | 10/2014 | | |
| JP | 5688197 B2 | 3/2015 | | |
| JP | 2016-510106 A | 4/2016 | | |
| JP | 2017-227489 A | 12/2017 | | |
| JP | 6444319 B2 | 12/2018 | | |
| JP | 2019-030623 A | 2/2019 | | |
| JP | 2020-039841 A | 3/2020 | | |
| JP | 6732274 B1 | 7/2020 | | |
| JP | 6737464 B2 | 8/2020 | | |
| JP | 2020-141250 A | 9/2020 | | |
| JP | 2020-155900 A | 9/2020 | | |
| KR | 200184719 Y1 | 6/2000 | | |
| KR | 20160121915 A | 10/2016 | | |
| RU | 133285 U1 | 10/2013 | | |
| WO | 94/09605 A1 | 4/1994 | | |
| WO | 1997/004334 A1 | 2/1997 | | |
| WO | 2005/008272 A2 | 1/2005 | | |
| WO | 2006/017511 A2 | 2/2006 | | |
| WO | WO-2011008430 A1 * | 1/2011 | | G01S 15/89 |
| WO | 2012/028896 A1 | 3/2012 | | |
| WO | 2013/126761 A1 | 8/2013 | | |
| WO | 2014/126847 A2 | 8/2014 | | |
| WO | 2014/144471 A1 | 9/2014 | | |
| WO | 2016/205938 A1 | 12/2016 | | |
| WO | 2017/015741 A1 | 2/2017 | | |
| WO | 2018/201097 A2 | 11/2018 | | |
| WO | 2018/222556 A1 | 12/2018 | | |
| WO | 2019/050552 A1 | 3/2019 | | |
| WO | 2020/174640 A1 | 9/2020 | | |
| WO | 2021/019858 A1 | 2/2021 | | |
| WO | 2021/127592 A2 | 6/2021 | | |
| WO | 2021/176726 A1 | 9/2021 | | |
| WO | 2021/220377 A1 | 11/2021 | | |

OTHER PUBLICATIONS

Thompson et al; "Two Dimensional and Three Dimensional Imaging Results Using Blazed Arrays;" MTS/IEEE Oceans 2001. An Ocean Odyssey. Conference Proceedings (IEEE Cat. No. 01CH37295); Nov. 5-8, 2001; pp. 985-988.

SeaBotix—Underwater Remotely Operated Vehicles (ROVs); ADS, Inc. YouTube. 2014 Video (mentioning SmartFlight): retreived Jul. 29, 2020 from https://www.youtube.com/watch?v=hkqJh5j6eQA.

SmartFlight 2.0 video; retrieved Jul. 29, 2020 from: http://www.teledynemarine.com/smartflight2-0?ProductLineID=112.

"Garmin Marine Webinars: Panoptix LiveScope Installation and Setup;" YouTube; Apr. 6, 2020; retreived Jan. 12, 2021 from https://www.youtube.com/watch?v=Z2AiSOmX5PA.

(56) References Cited

OTHER PUBLICATIONS

Nov. 26, 2021 Extended European Search Report issued in European Patent Application No. 21177698.4; 8 pp.
RyTek Marine (Apr. 6, 2022). Seeing double isn't always a bad thing . . . ; retrieved Sep. 30, 2022 from https://www.facebook.com/RyTekMarine.
"Open Access Review: a Review of Acoustic Impedance Matching Techniques for Piezoelectric Sensors and Transducers;" Sensors; vol. 20; No. 14; Jul. 21, 2020; DOI: https://doi.org/10.3390/s20144051.
"Active Target 'Scout Only' Transducer Mount Combo;" RyTek Marine; retreived Aug. 10, 2022 from https://rytekmarine.com/collections/lowrance-activetarget/products/active-target-scout-only-transducer-mount-combo.
WASSP Multibeam; retrieved from <https://wassp.com/video/26/WASSP-S3-Demo-WEB.mp4> May 17, 2018.
Ellison, Ben; Panbo; The Marine Electronics Hub; "Garmin BlueChart g2 & g2 Vision 2010, lots new?" Mar. 16, 2010; retrieved from <https://www.panbo.com/garmin-bluechart-g2-g2-vision-2010-lots-new>.
Ellison, Ben; Panbo; The Marine Electronics Hub; "Maptech i3 fishfinder road trip" Jun. 15, 2005; retrieved from <https://www.panbo.com/maptech-i3-fishfinder-road-trip>.
"Teledyne SeaBotix—SmartFlight 2.0"; YouTube; Apr. 13, 2018; retrieved from https://www.youtube.com/watch?v=xFJ2OCKIXwc.
"SAMM"; Oceanic Imaging Consultants; retrieved Feb. 12, 2021 from https://www.geomatrix.co.uk/software/oceanographic-and-hydrographic/samm/.
ADS, Inc.; "SeaBotix—Underwater Remotely Operated Vehicles (ROVs)"; YouTube, Jul. 16, 2014; retrieved from https://www.youtube.com/watch?v=hkqJh5j6eQA.
Teledyne Marine; "SmartFlight 2.0 powered by Greensea"; retrieved Jun. 19, 2019 from http://www.teledynemarine.com/smartflight2-0?ProductLineID=112.
"LED Programmable Message Pocket Fan & Rave Toy"; retrieved Jan. 31, 2019 from https://www.amazon.com/LED-Programmable-Message-Pocket-Rave/dp/B002FWOYG2.
AguaDrone—The World's First Drone with a Fish Finder! website visited Oct. 25, 2016 (10 pgs.) https://www.aguadrone.com/.
AeroKontiki—Introducing the world's first autopilot fishing drone kontiki website visited Oct. 25, 2016 (4 pgs.) http://www.aerokontiki.com/.
DIY Drones—The Leading Community for Personal UAVs—Home website visited Oct. 25, 2016 (9 pgs.) www.diydrones.com.
DIY Drones—The Leading Community for Personal UAVs—My Blog Automated Precision Landing on a (stationary) Boat website visited Oct. 25, 2016 (6 pgs.) www.diydrones.com/profiles/blogs/automated-precision-landing-on-a-stationary-boat.

* cited by examiner

LIVE SONAR SYSTEMS AND METHODS

CROSS-REFERENCE TO RELATED APPLICATION(S)

This application claims priority to and is a continuation-in-part of U.S. Non-Provisional application Ser. No. 17/174,415, filed Feb. 12, 2021, entitled "Marine Chart and Sonar Image Presentation Systems and Methods", which claims priority to and is a continuation-in-part of U.S. Non-Provisional application Ser. No. 17/123,189, filed Dec. 16, 2020, entitled "Marine Electronic Device For Presentment of Nautical Charts and Sonar Images", which claims priority to and is a continuation of U.S. Non-Provisional application Ser. No. 15/982,362, filed May 17, 2018, entitled "Marine Electronic Device For Presentment of Nautical Charts and Sonar Images", which issued as U.S. Pat. No. 10,914,810, the contents of each being hereby incorporated by reference in its entirety.

FIELD OF THE INVENTION

Embodiments of the present invention relate generally to systems with sonar transducer assemblies, to the presentation of marine data, and to providing improved live sonar imagery.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, may convert electrical energy into sound or vibrations at a particular frequency. A sonar sound beam is transmitted into and through the water and is reflected from objects it encounters (e.g., fish, structure, bottom surface of the water, etc.). The transducer may receive the reflected sound (the "sonar returns") and convert the sound energy into electrical energy. Based on the known speed of sound, it is possible to determine the distance to and/or location of the waterborne or underwater objects.

The sonar return signals can also be processed to be presented on a display, giving the user a "picture" or image of the underwater environment.

BRIEF SUMMARY OF THE INVENTION

A display can be used to present marine information (such as sonar images or nautical charts) to a user. Live sonar imagery provides a two-dimensional sonar image that continuously updates all at the same time to provide a "live" sonar image of the underwater environment. Current systems provide limited coverage volumes however. Embodiments of the present invention provide improved sonar imagery that includes increased coverage volume of the underwater environment, particularly for such live sonar imagery. In some embodiments, the live sonar imagery may be provided as an overlay on a nautical chart, such as to give real-world context to the live sonar imagery.

Example embodiments of the present invention provide various sonar systems for imaging an underwater environment. Some example sonar systems provide for generating a live sonar image that represents an image of a volume of the underwater environment that is updating in real-time. In this regard, in some embodiments, the sonar system may include one or more arrays of sonar transducer elements that operate to beamform multiple sonar return beams. The multiple sonar return beams can be filtered, such as based on frequency, to receive sonar returns in sonar beam slices (e.g., around 0.25 degrees-2 degree beam angle). The sonar beam slices build-up to form the live sonar image extending across an overall sonar beam angle (e.g., multiple adjacent slices may form an overall coverage angle, such as ~135 degrees). Since the sonar beam slices update continually, the resulting sonar image updates. Accordingly, the system may be configured to generate a corresponding two-dimensional (2D) near-real time (or "live") sonar image.

Other example embodiments provide systems having sonar transducer assemblies and brackets having alignment features. The alignment features may be used to control the facing direction of sonar transducer assemblies. In some embodiments, a single bracket may be provided that is configured to position two or more sonar transducer assemblies. However, in other embodiments, there may be multiple brackets where each bracket may be configured to position one or more sonar transducer assemblies. In some systems, three sonar transducer assemblies, four sonar transducer assemblies or a greater number of sonar transducer assemblies may be provided. By using multiple sonar transducer assemblies, the overall coverage volume for sonar may be increased. The overall coverage volume may be defined by a coverage angle in one dimension (e.g., horizontal) that may be increased to 140 degrees, 150 degrees, 180 degrees, 270 degrees, or even 360 degrees.

In some example embodiments, the array(s) may be oriented such that the facing direction corresponding to the sonar image is generally outward of the watercraft. In such an example, the sonar image may extend in a horizontal plane, such as may correspond with the horizontal plane of a nautical chart. Accordingly, in some embodiments, the system may be configured to cause presentation of the live sonar image in the facing direction on the chart and relative to a representation of the watercraft so as to provide live sonar imagery on the chart to visually provide a relationship between objects within the live sonar imagery and a real-world position of the objects.

In some embodiments, the effective distance of the sonar coverage for the live sonar image may be accounted for during presentation on the chart. In this regard, the size of the sonar image on the chart may dimensionally correspond to the size of the sonar beam coverage within the underwater environment. In such examples, a user can more accurately understand where an object presented in the sonar image is in the real world. This may be useful for casting a fishing line or setting an anchor, among other things.

In some embodiments, the array may be rotatable with respect to the watercraft. Accordingly, the orientation of the sonar image of the chart with respect to the watercraft may be adjusted based on the current facing direction of the sonar system.

In an example embodiment, a system for generating live sonar images is provided. The system includes a first sonar transducer assembly having a first plurality of sonar transducer elements. The first sonar transducer assembly defines a first facing direction, and the first plurality of sonar transducer elements are configured to transmit one or more first sonar beams into an underwater environment to form a first coverage volume within the underwater environment. The system also includes a second sonar transducer assembly having a second plurality of sonar transducer elements.

The second sonar transducer assembly defines a second facing direction, and the second plurality of sonar transducer elements are configured to transmit one or more second sonar beams into the underwater environment to form a second coverage volume within the underwater environment. The system also includes at least one bracket having one or more alignment features. The bracket(s) are configured to mount the first sonar transducer assembly and the second transducer assembly to a watercraft, and the alignment feature(s) are configured to position the first sonar transducer assembly and the second sonar transducer assembly so that the first facing direction and the second facing direction are different and relative to each other so as to create continuous coverage of the underwater environment. The continuous coverage has an overall coverage volume that is greater than either of the first coverage volume or the second coverage volume individually. The first facing direction and the second facing direction are generally outward of the watercraft. Further, the sonar return data from the first plurality of sonar transducer elements and the second plurality of sonar transducer elements is used to form a live sonar image representative of sonar returns received from the overall coverage volume.

In some embodiments, the system may also include at least one processor configured to receive first sonar return data from the first plurality of sonar transducer elements and second sonar return data from the second plurality of sonar transducer elements. Further, the processor(s) may be configured to generate the live sonar image based on the first sonar return data and the second sonar return data.

In some embodiments, the bracket(s) may include a first bracket and a second bracket. The first bracket may be configured to mount the first sonar transducer assembly, and the second bracket may be configured to mount the second sonar transducer assembly.

In some embodiments, the bracket(s) may include a first bracket, and the first bracket may be configured to mount both the first sonar transducer assembly and the second sonar transducer assembly. Further, in some embodiments, the first bracket may include a first arm, a second arm, and a connecting arm. The connecting arm may connect the first arm and the second arm, the first arm may be configured to mount the first sonar transducer assembly, and the second arm may be configured to mount the second sonar transducer assembly. In some embodiments, the first arm may be connected to the connecting arm at a first end of the connecting arm, and the second arm may be connected to the connecting arm at a second end of the connecting arm. The connecting arm may extend in a lengthwise direction from the first end to the second end. Further, the first arm may possess a slope that is angularly offset from the lengthwise direction. Additionally, in some embodiments, the first bracket may be oriented such that the lengthwise direction is a vertical direction, and the slope may cause the first sonar transducer assembly to be rotated at a downward angle relative to a horizontal direction when mounted on the first arm. In some embodiments, the connecting arm may define a first surface, the first arm may extend at a first angle that is angularly offset from the first surface, and the second arm may extend at a second angle that is angularly offset from the first surface. Furthermore, in some embodiments, the first angle may be angularly offset from the first surface in a first direction, and the second angle may be angularly offset from the first surface in a second direction that is the opposite of the first direction. In some embodiments, extension of the first arm at the first angle and extension of the second arm at the second angle may reduce an overall footprint of the first sonar transducer assembly and the second sonar transducer assembly when the first sonar transducer assembly and the second sonar transducer assembly are mounted on the first bracket.

In some embodiments, the system may also include a clamp. The clamp may define an internal volume, and the clamp may be configured to be attached to an object by receiving the object in the internal volume. The clamp may be configured to be attached to the bracket(s) to assist in attaching the bracket(s) to the object, and a connecting arm of the bracket(s) may be offset by some distance from a center point of the internal volume when the bracket(s) is attached to the clamp. In some embodiments, the bracket(s) may be attachable to at least one of a pole, a trolling motor, a primary motor, or a hull of the watercraft.

In another example embodiment, a system for generating live sonar images is provided. The system includes at least one sonar transducer assembly having a plurality of arrays of a plurality of sonar transducer elements associated with a watercraft on a body of water and oriented with an emitting face in a facing direction. The facing direction is generally outward of the watercraft, and the plurality of sonar transducer elements are configured to transmit one or more sonar beams into an underwater environment to form an overall coverage volume with a horizontal coverage angle. The horizontal coverage angle defines an angle that is greater than 140 degrees. Further, sonar return data from the plurality of sonar transducer elements is used to form a live sonar image representative of sonar returns received from the overall coverage volume.

In some embodiments, the system may also include at least one processor that is configured to receive the sonar return data from the plurality of sonar transducer elements. The processor(s) may also be configured to generate the live sonar image of the underwater environment based on the sonar return data.

In some embodiments, the horizontal coverage angle may define an angle that is at least 180 degrees. Furthermore, in some embodiments, the horizontal coverage angle may define an angle that is at least 270 degrees. Additionally, in some embodiments, the horizontal coverage angle may define an angle that is at least 360 degrees. In some embodiments, sonar transducer assembl(ies) may include a first sonar transducer assembly having a first facing direction, a second sonar transducer assembly having a second facing direction, and a third sonar transducer assembly having a third facing direction. The first facing direction, the second facing direction, and the third facing direction may be different, and the sonar return data may be used to generate a 360 degree live sonar image. Furthermore, in some embodiments, the system may also include a first bracket and a second bracket. The first bracket may be configured to mount the first sonar transducer assembly and the second sonar transducer assembly, and the second bracket may be configured to mount the third sonar transducer assembly. In addition, in some embodiments, the sonar transducer assembl(ies) may also include a fourth sonar transducer assembly, and the second bracket may be configured to mount the third sonar transducer assembly and the fourth sonar transducer assembly.

In some embodiments, the system may also include a display, at least one processor, and a memory including computer program code. The computer program code may be configured to, when executed, cause the processor(s) to cause the plurality of sonar transducer elements to transmit the sonar beam(s) into the underwater environment, receive the sonar return data, and generate the live sonar image of the underwater environment based on the sonar return data. The live sonar image may be a two-dimensional live sonar image that is formed of the sonar return data, and the sonar return data used to form the live sonar image may be received at substantially a same time by the plurality of sonar transducer elements. The computer program code may also be configured to, when executed, cause the processor(s) to cause, on the display, presentation of the live sonar image.

In another example embodiment, a bracket for positioning sonar transducer assemblies is provided. The bracket includes a first arm having a first alignment feature, a second arm having a second alignment feature, and a connecting arm. The connecting arm connects the first arm and the second arm, and the connecting arm extends in a lengthwise direction between a first end and a second end. The first arm is connected to the connecting arm at the first end, and the second arm is connected to the connecting arm at the second end. The first alignment feature is configured to receive a first sonar transducer assembly and aim the first sonar transducer assembly in a first facing direction, and the second alignment feature is configured to receive a second sonar transducer assembly and aim the second sonar transducer assembly in a second facing direction. The bracket is configured to position the first sonar transducer assembly and the second sonar transducer assembly such that the first sonar transducer assembly and the second sonar transducer assembly together provide an overall coverage volume with a horizontal coverage angle of greater than 140 degrees.

Additional example embodiments of the present invention include methods, systems, apparatuses, and computer program products associated with various embodiments described herein.

BRIEF DESCRIPTION OF THE DRAWINGS

Figure 1:
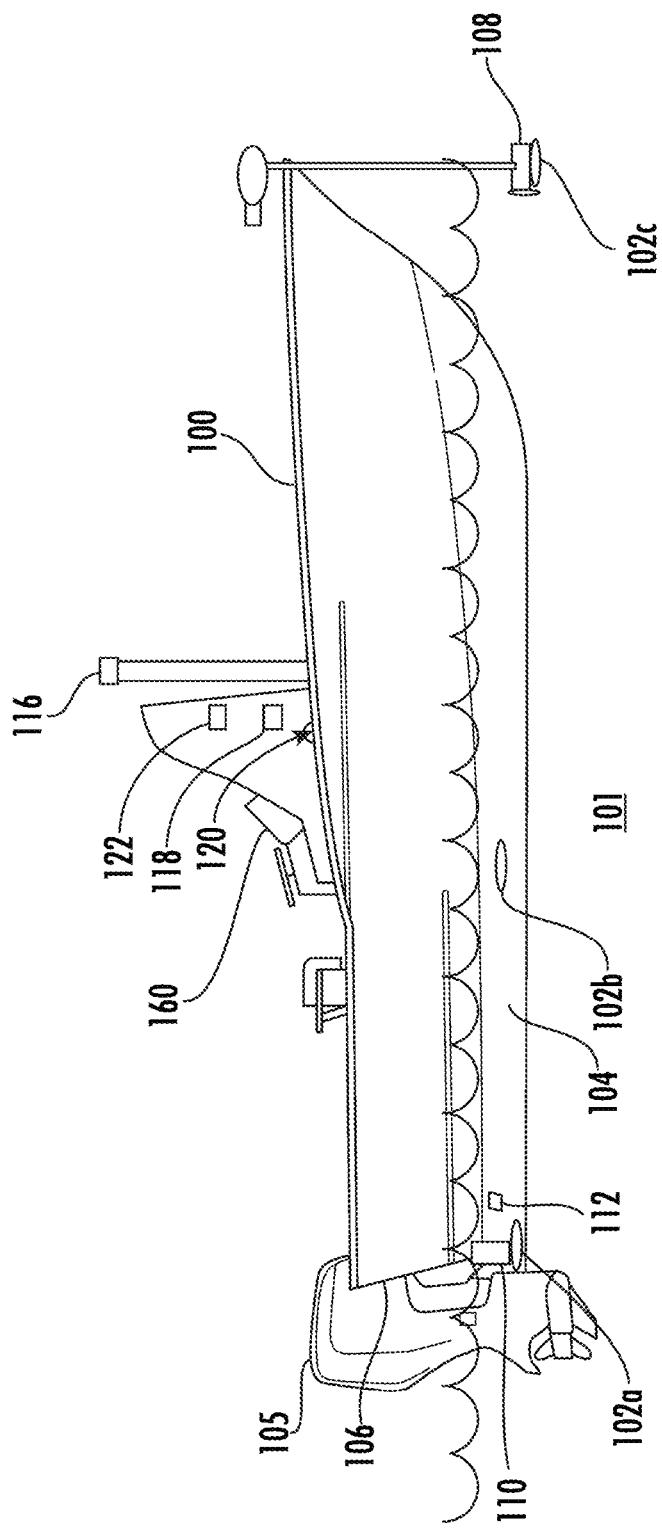
Figure 2A:
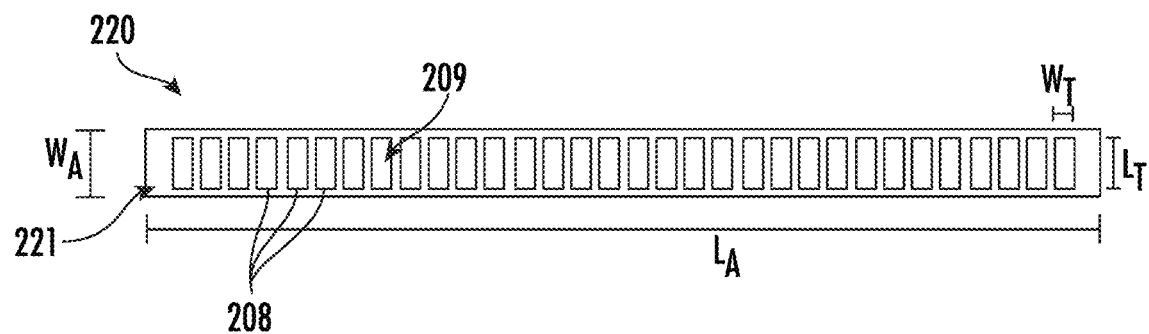
Figure 2B:
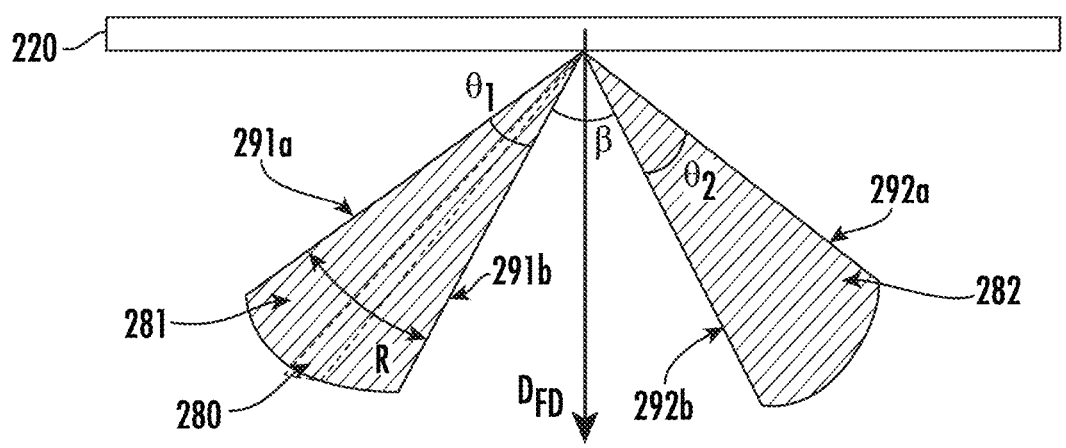
Figure 2C:
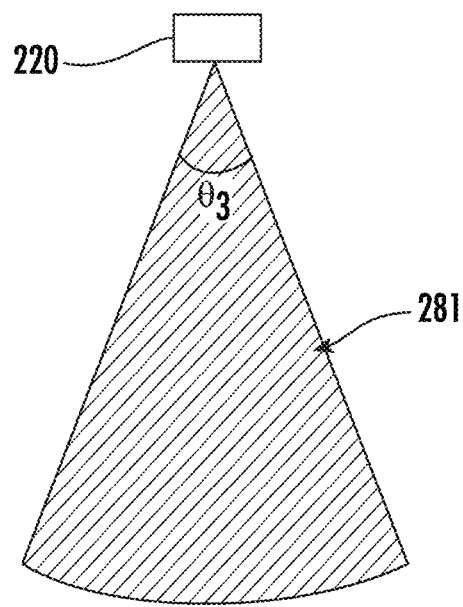
Figure 3:
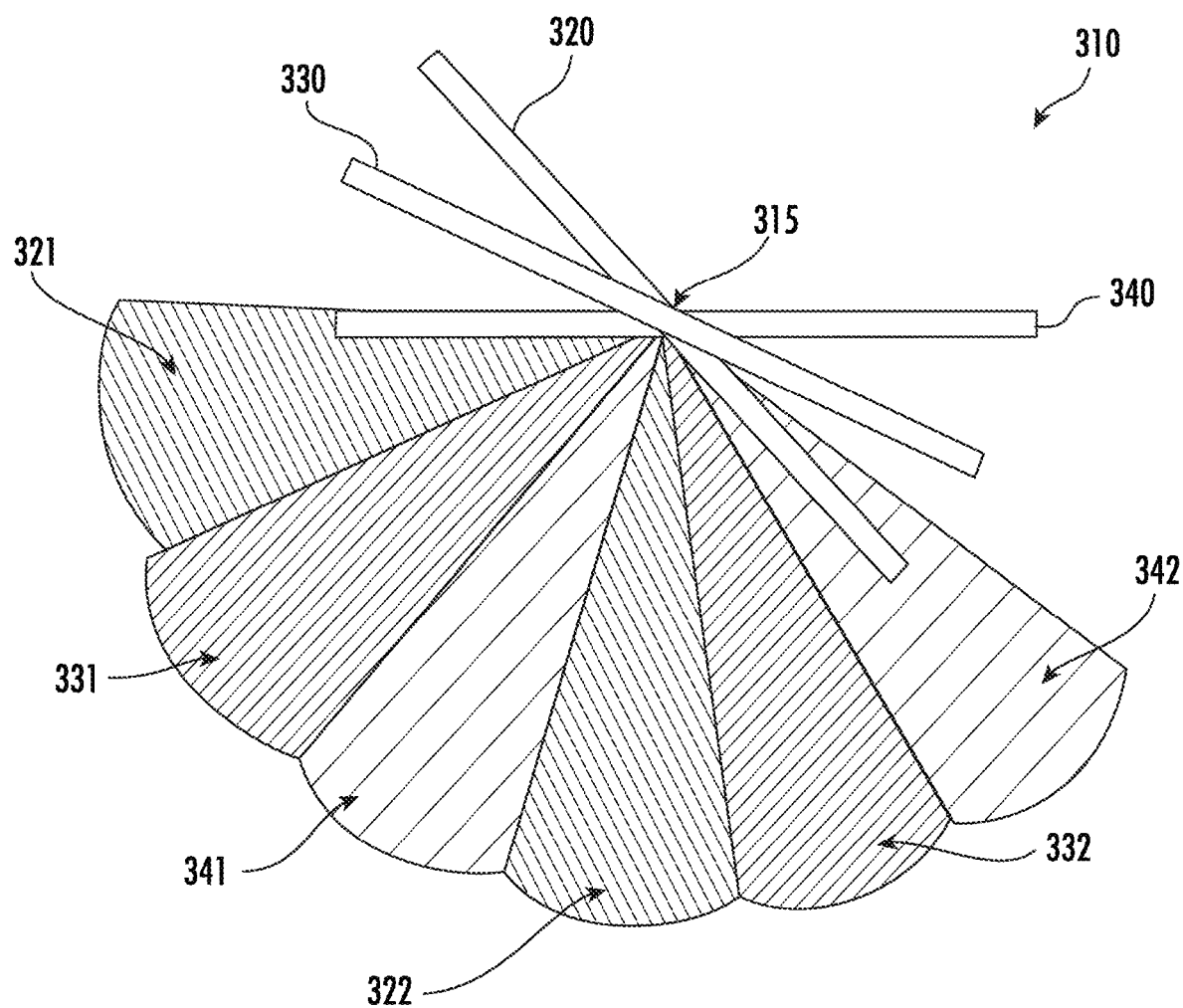
Figure 3A:
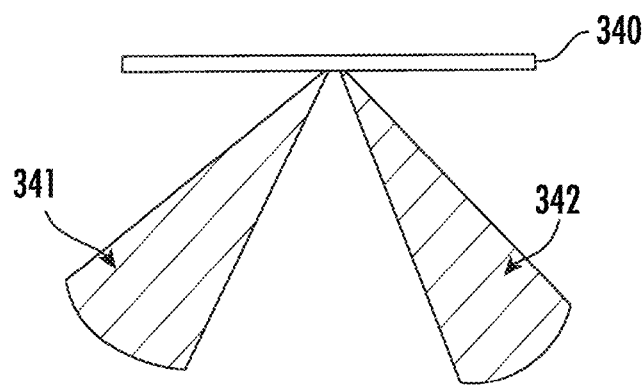
Figure 3B:
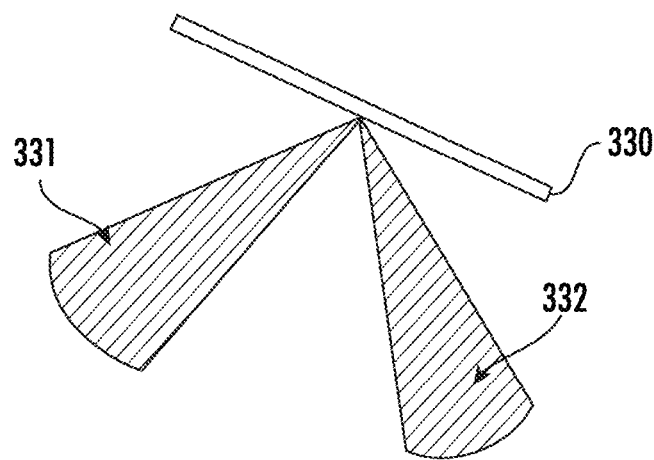
Figure 3C:
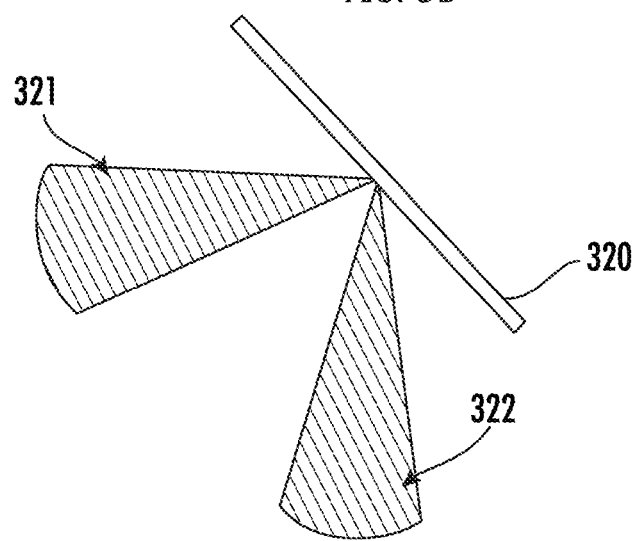
Figure 4:
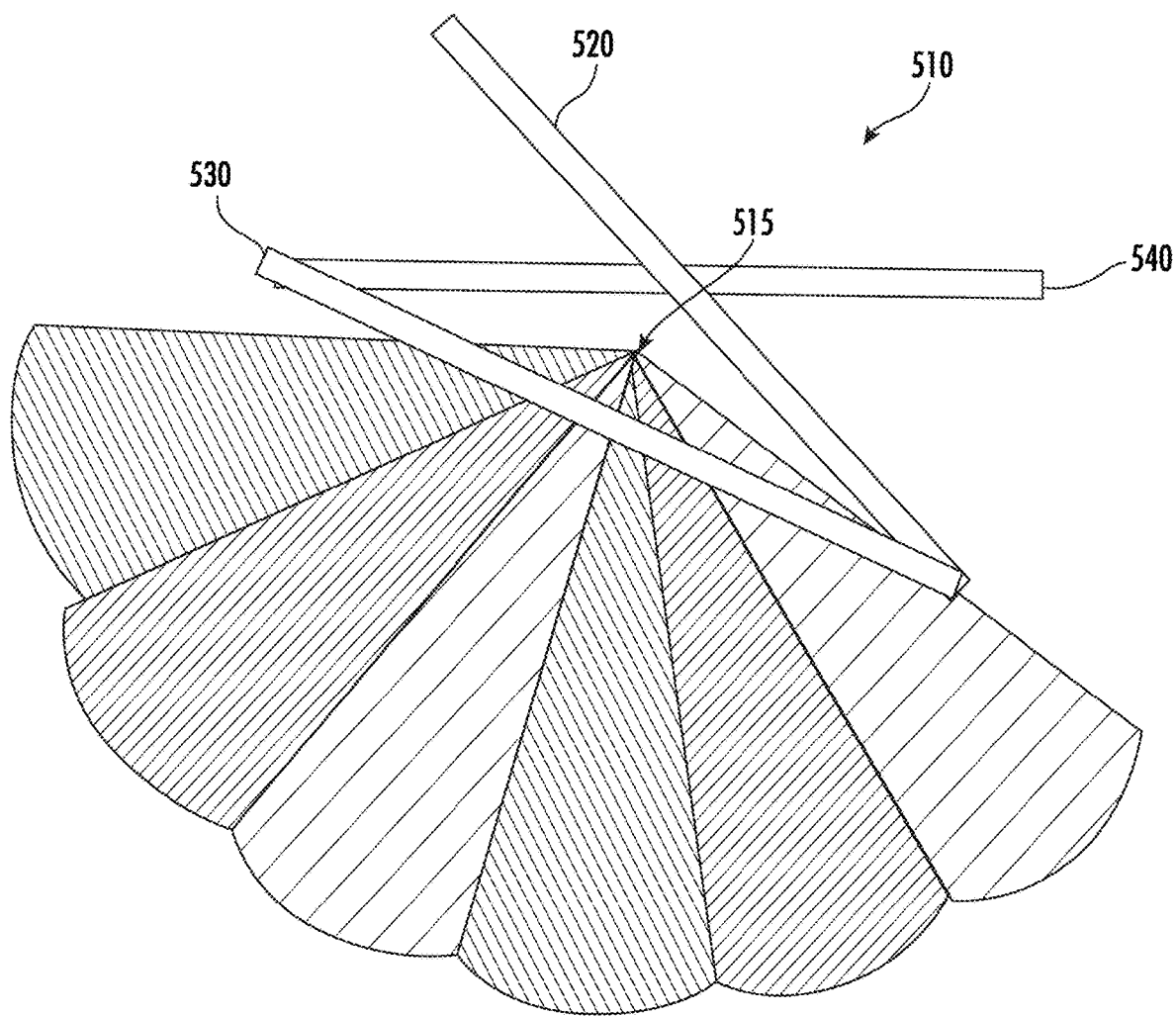
Figure 5:
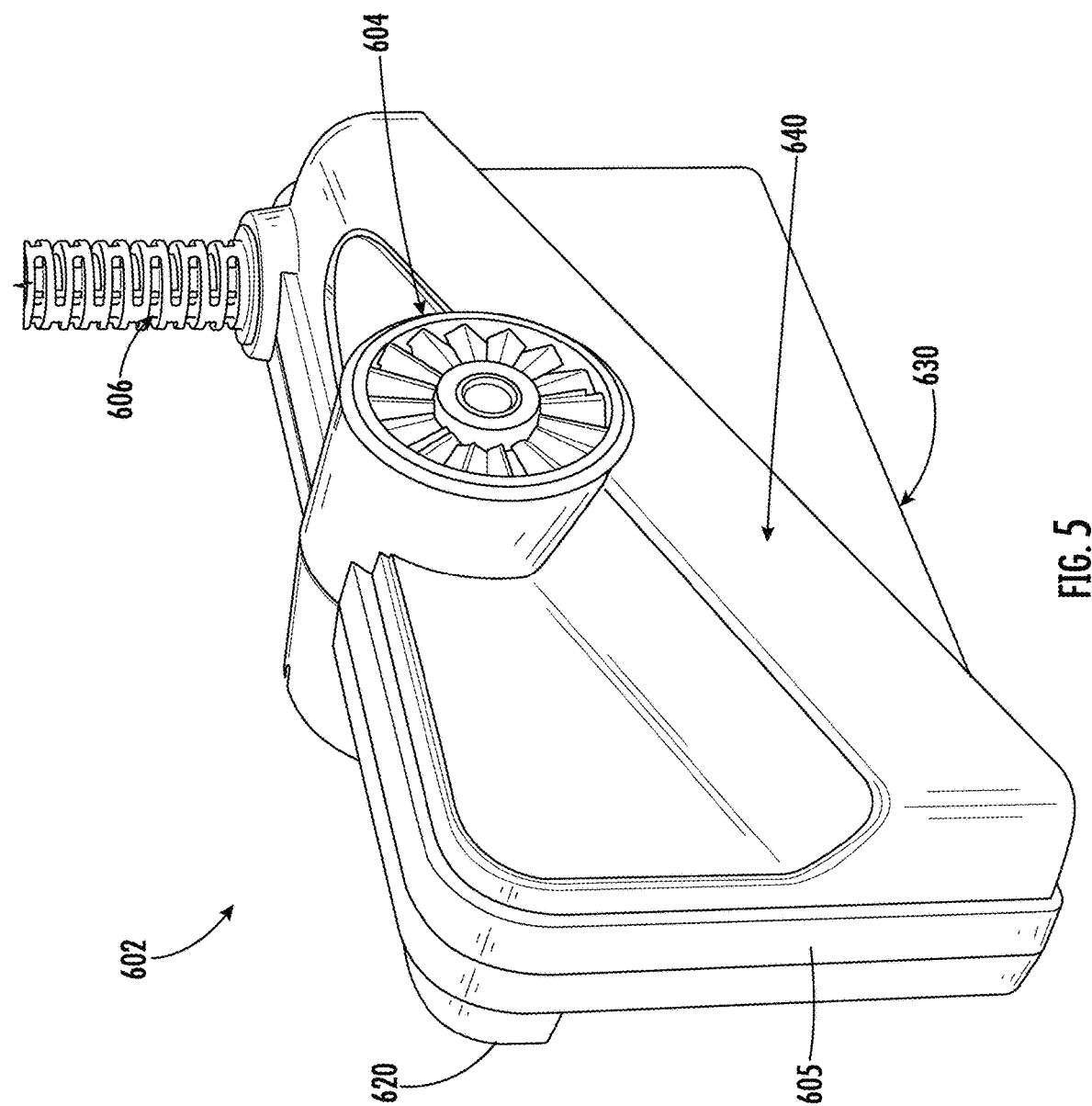
Figure 6:
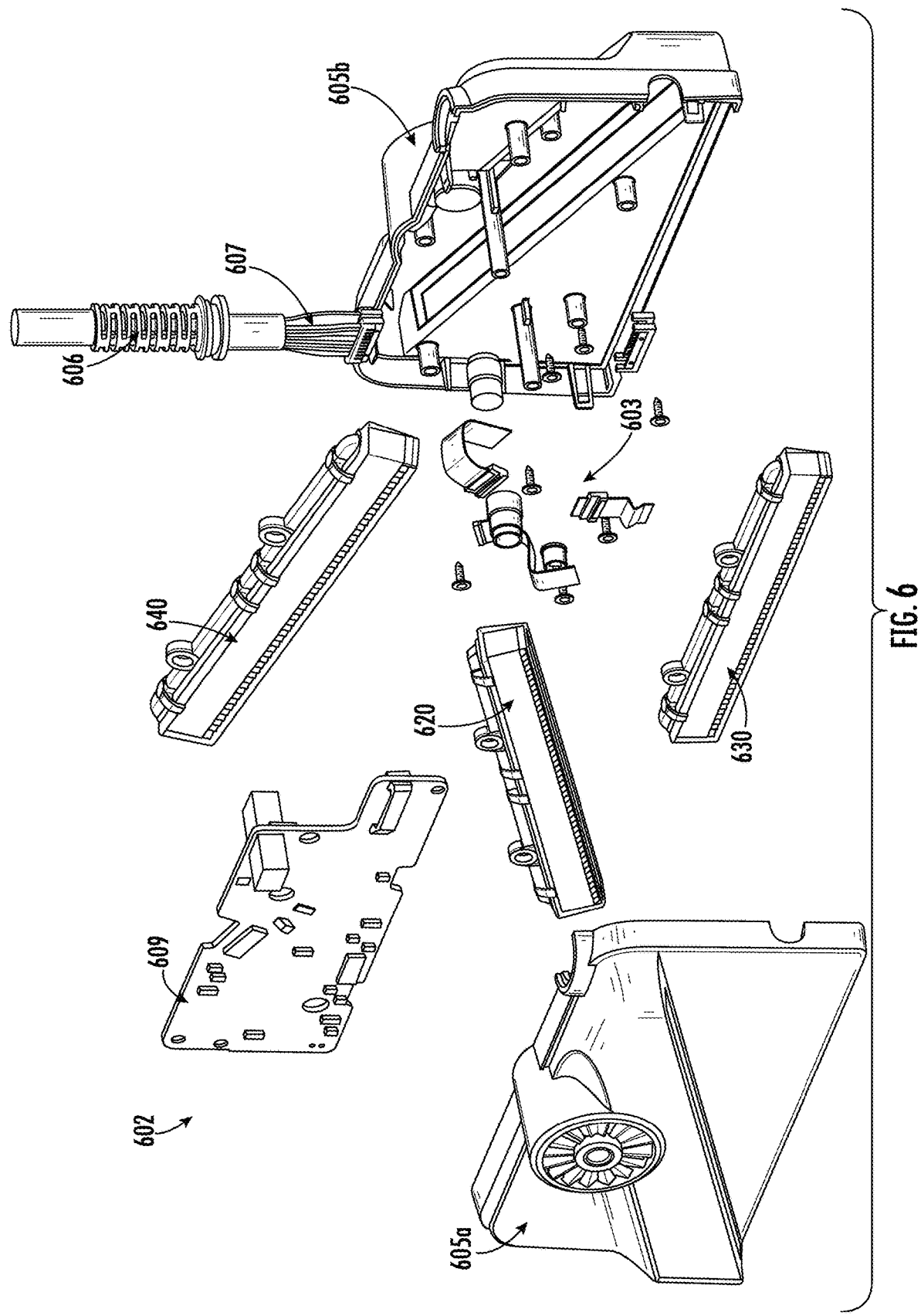
Figure 7A:
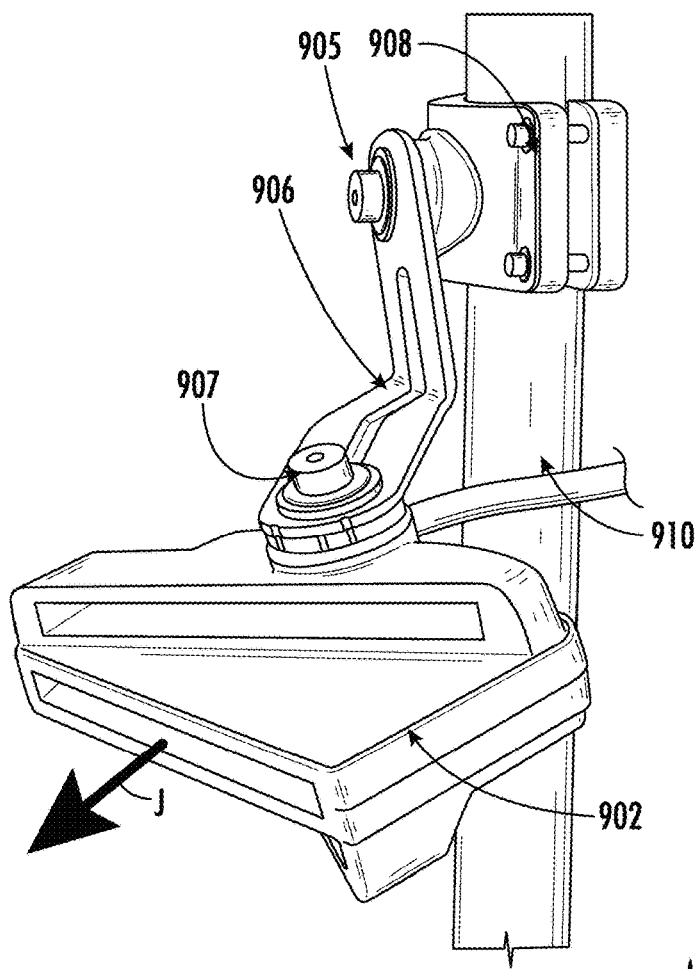
Figure 7B:
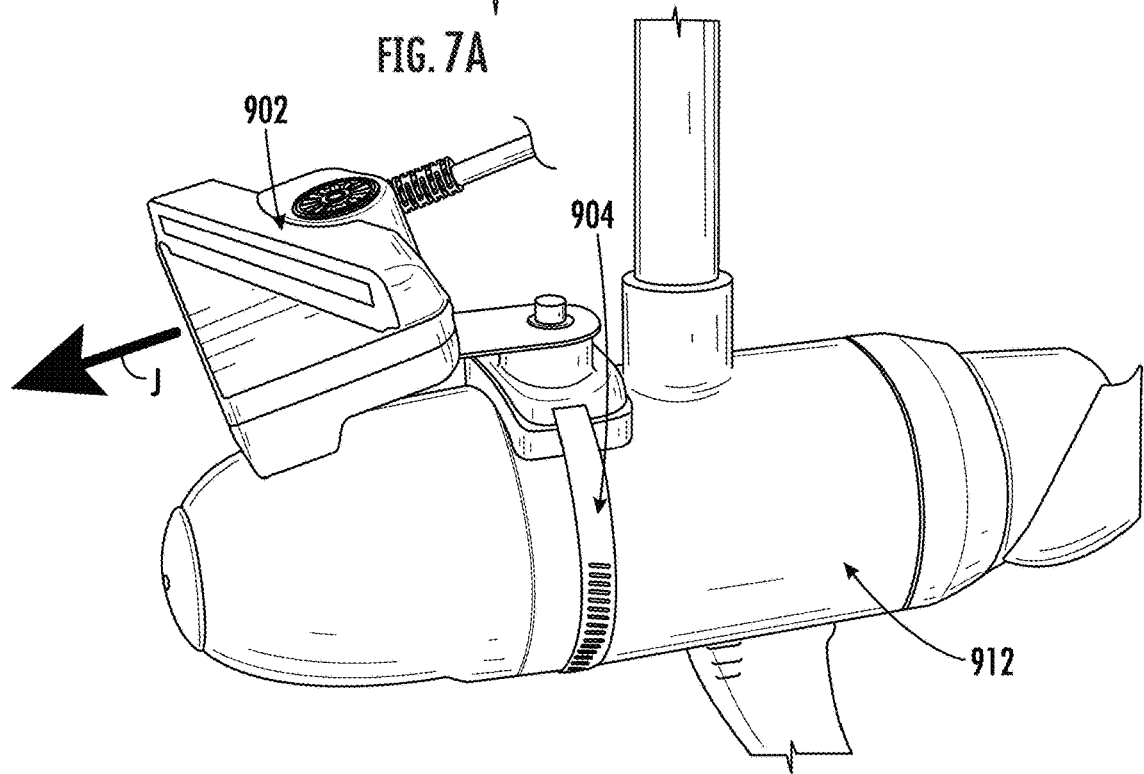
Figure 8:
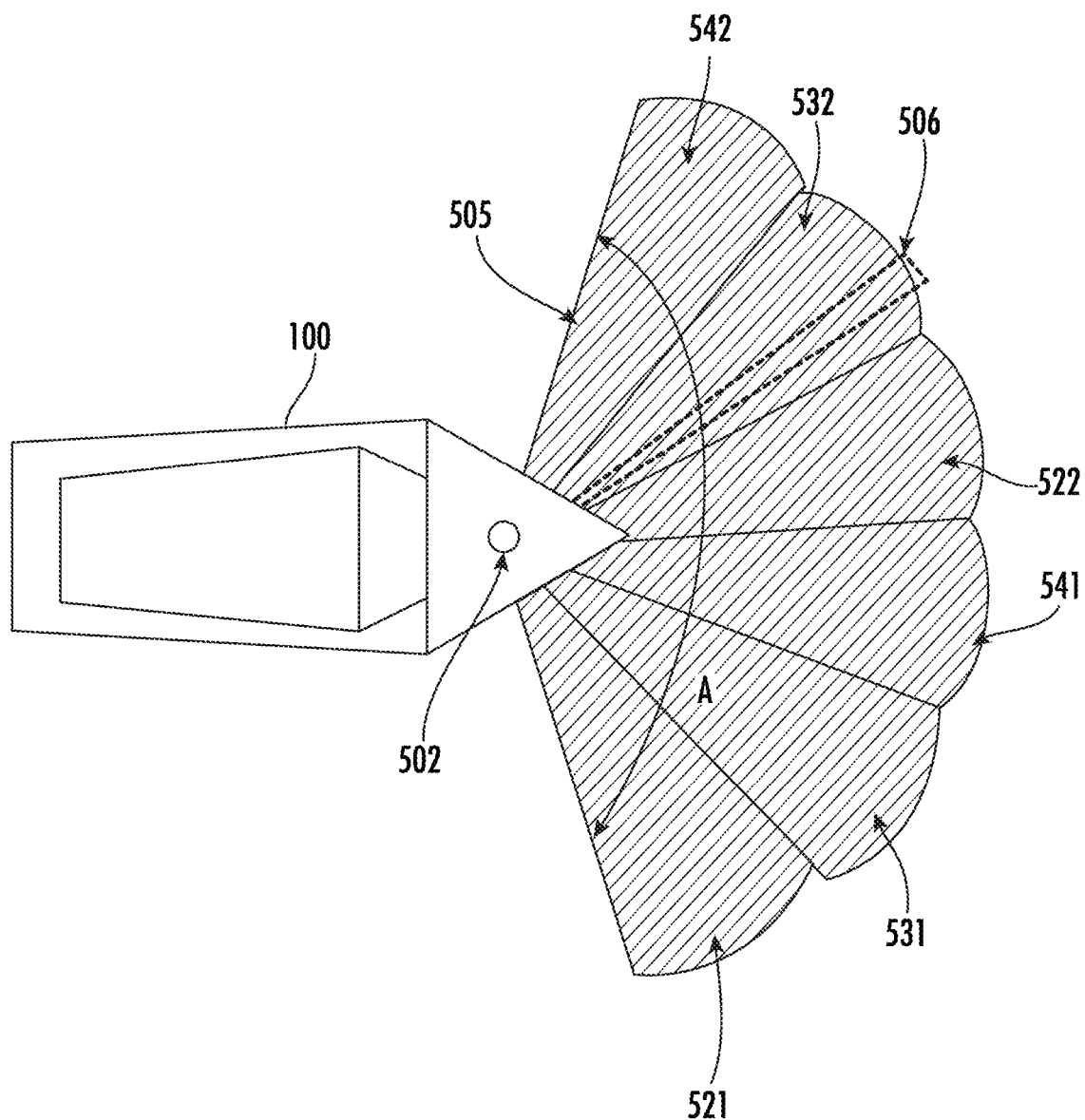
Figure 9:
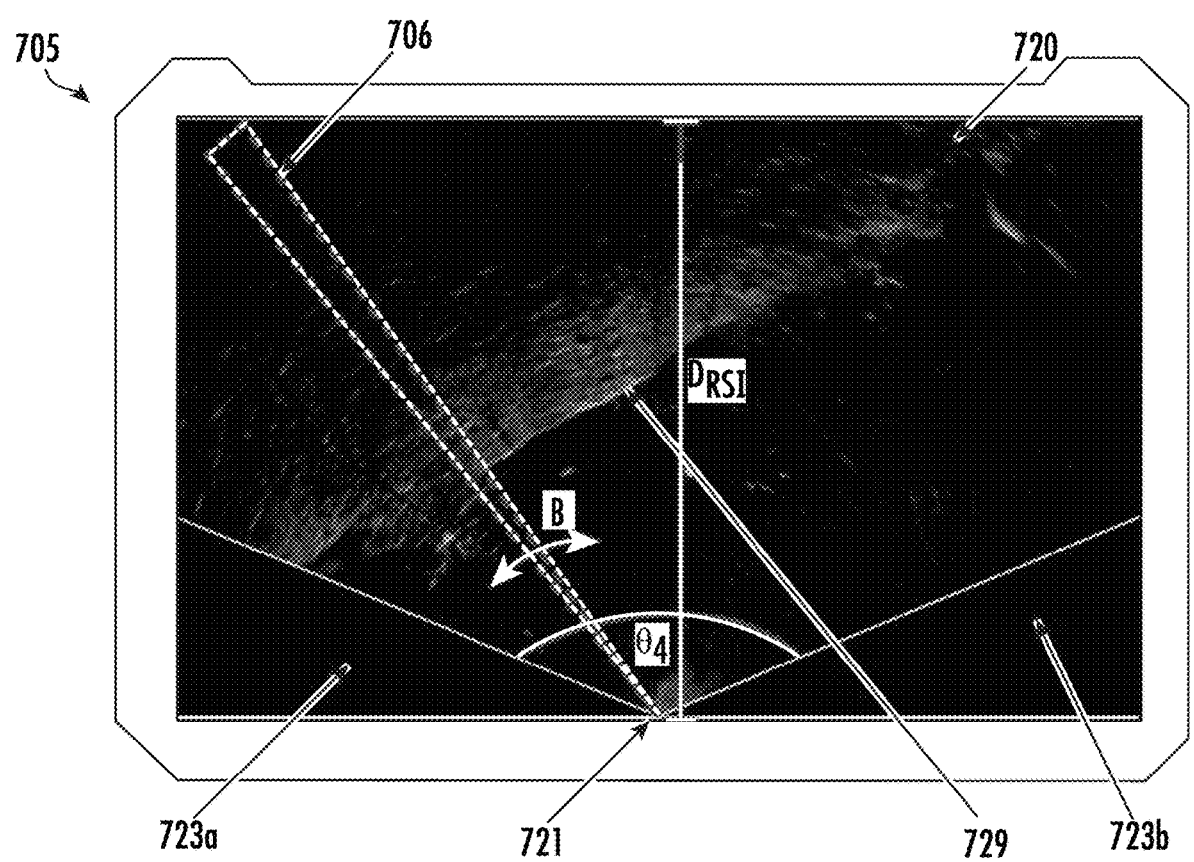
Figure 10:
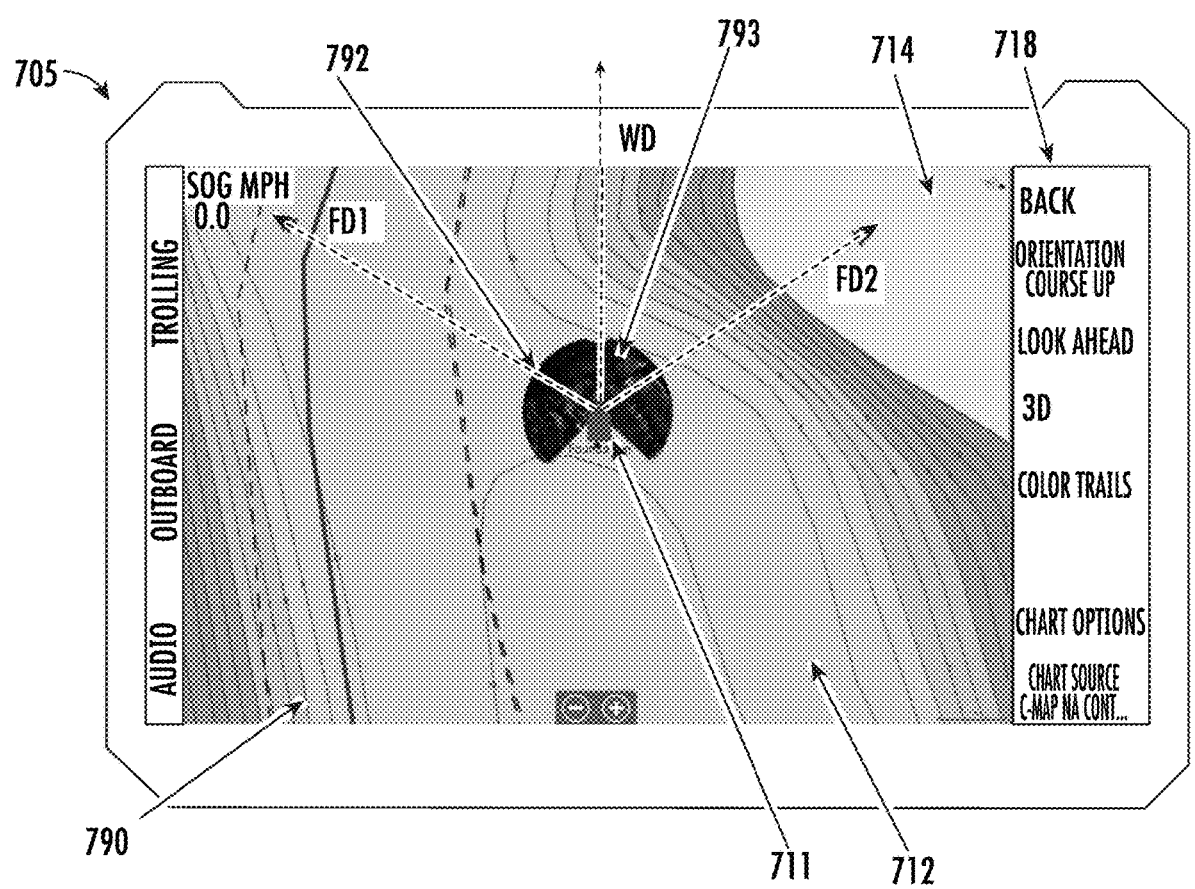
Figure 11:
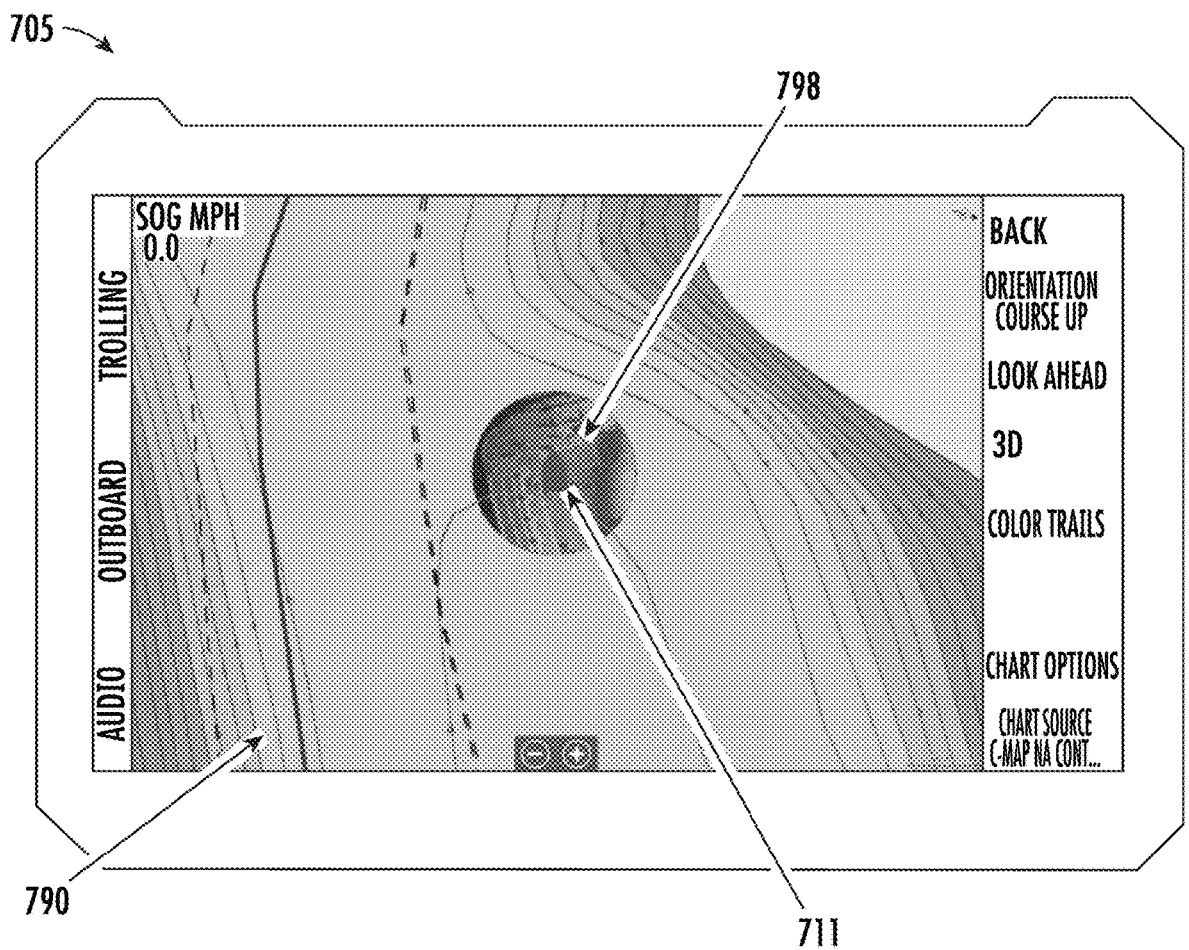
Figure 12A:
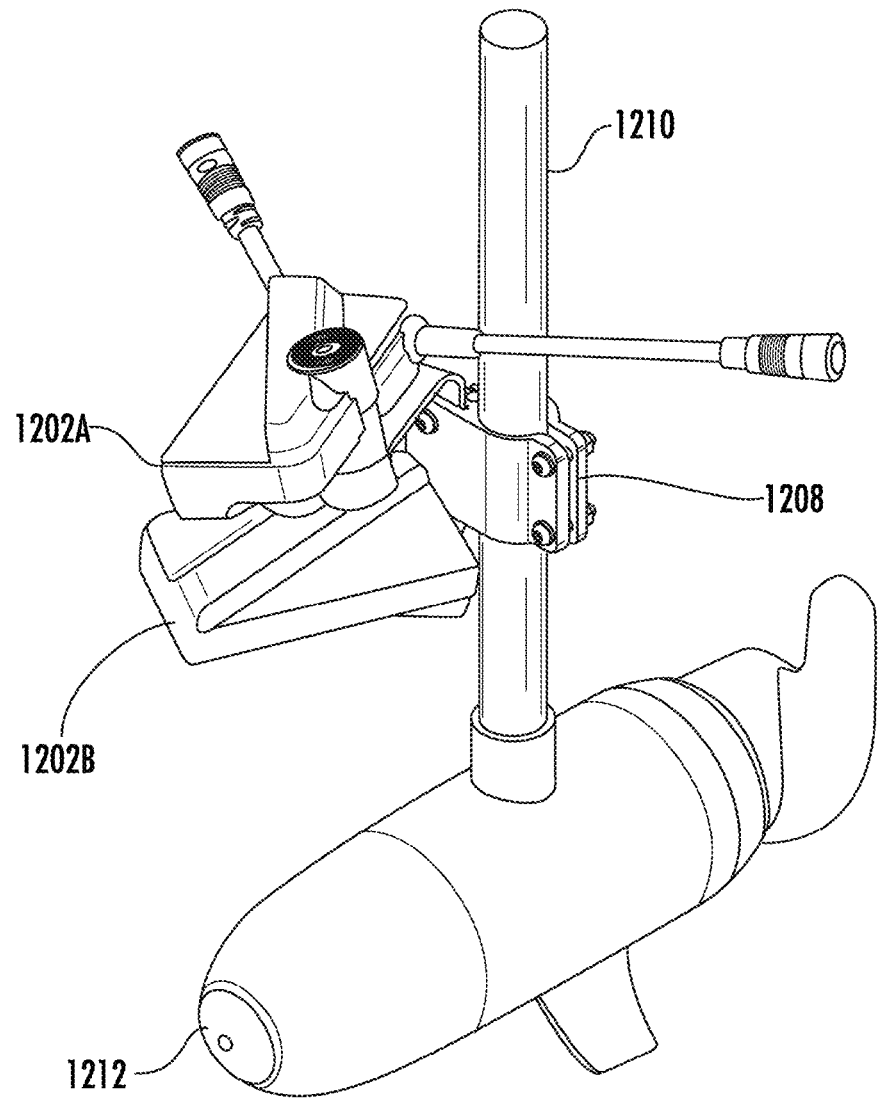
Figure 12B:
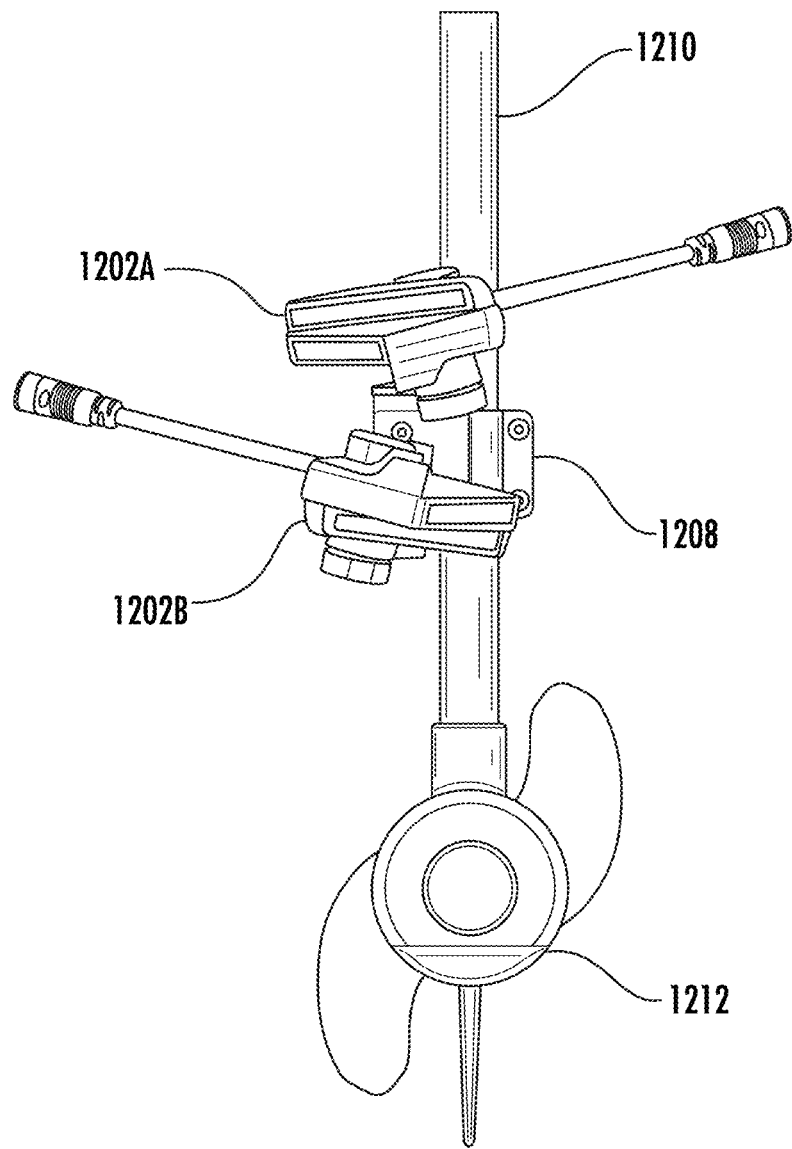
Figure 12C:
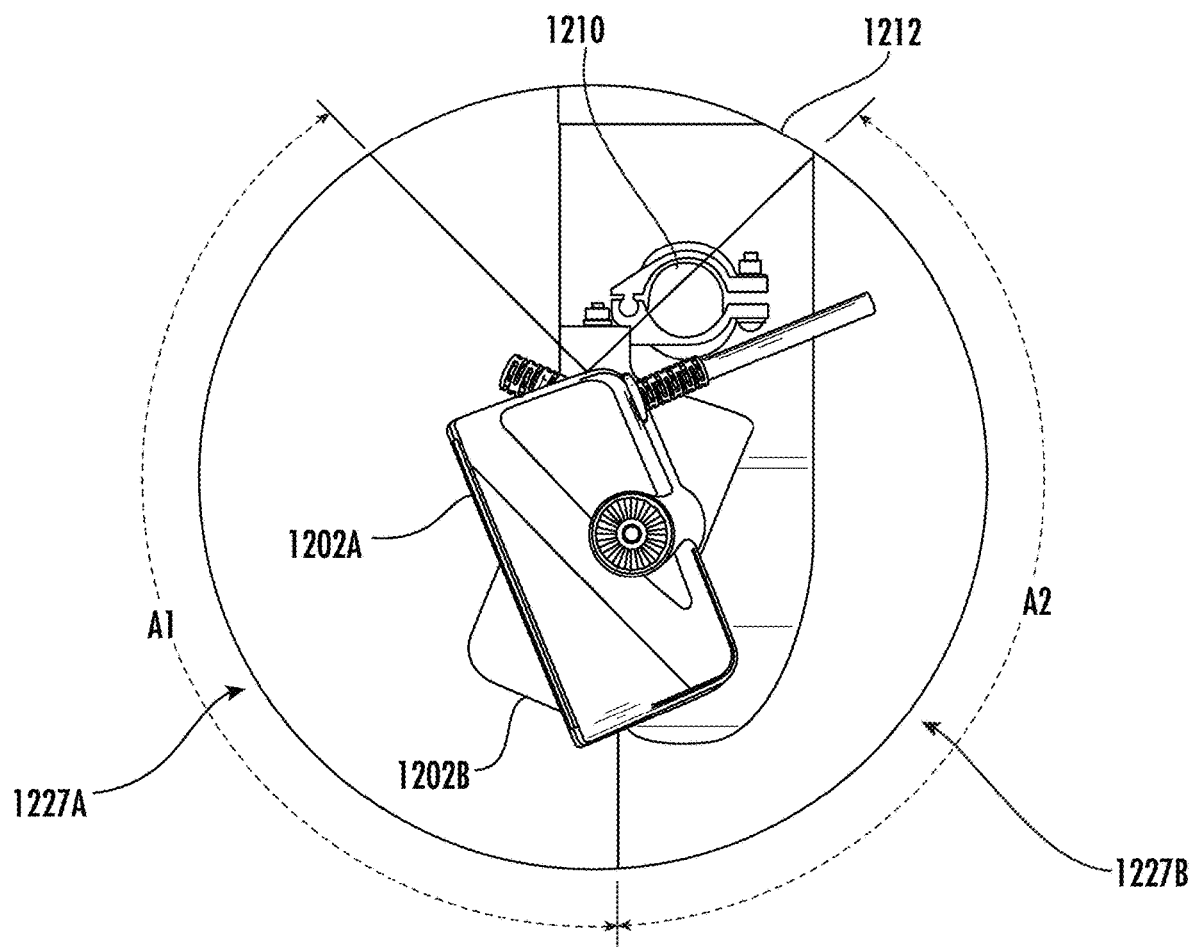
Figure 13:
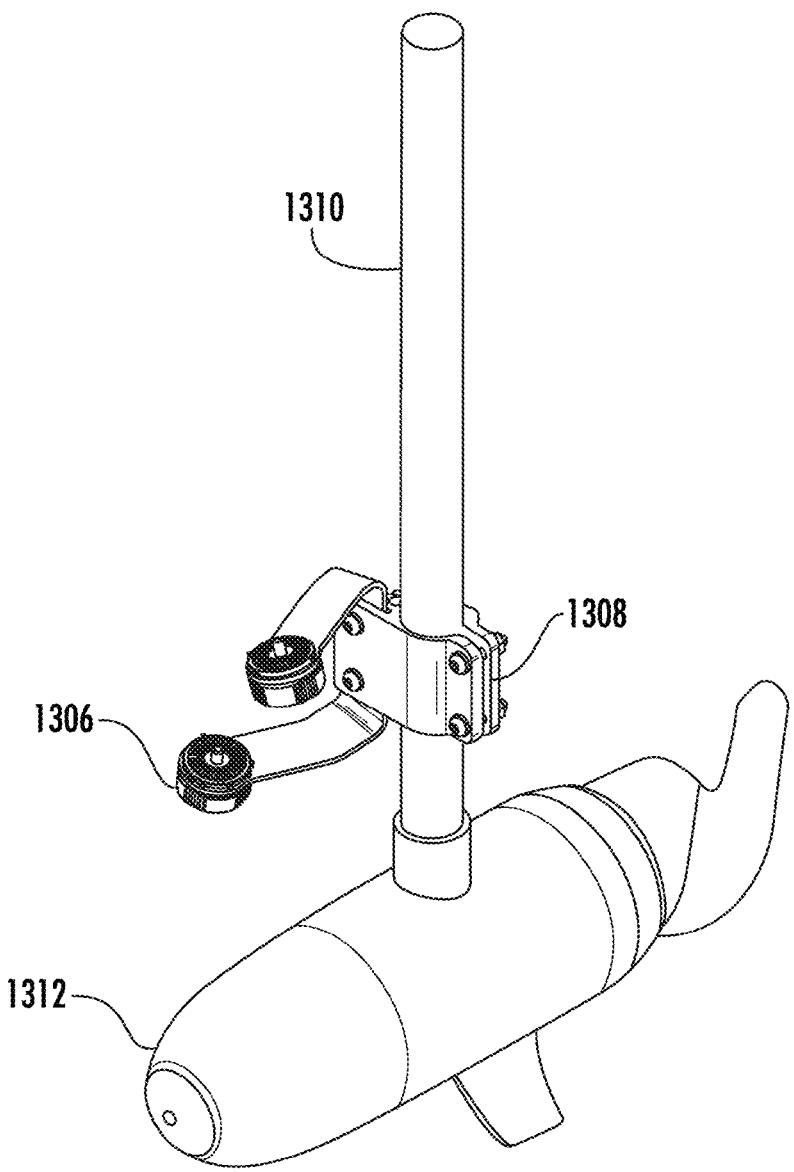
Figure 14A:
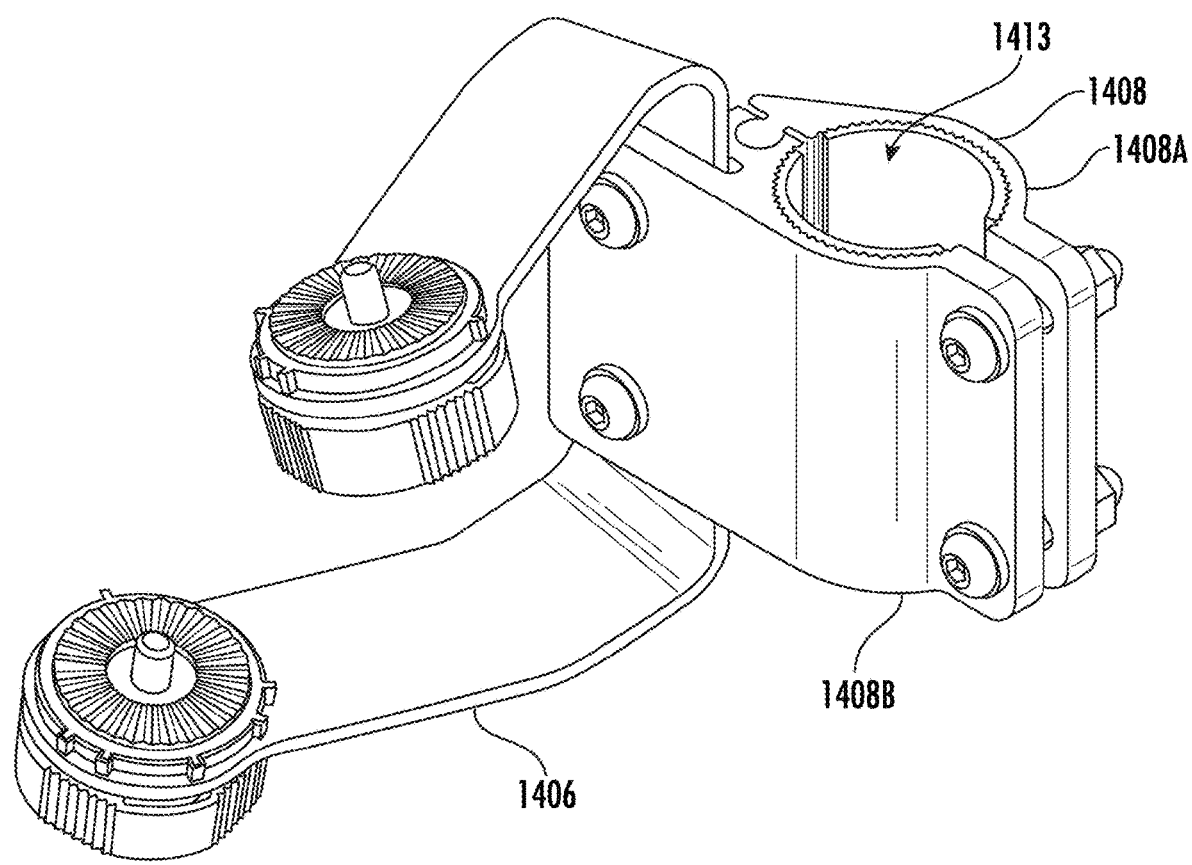
Figure 14B:
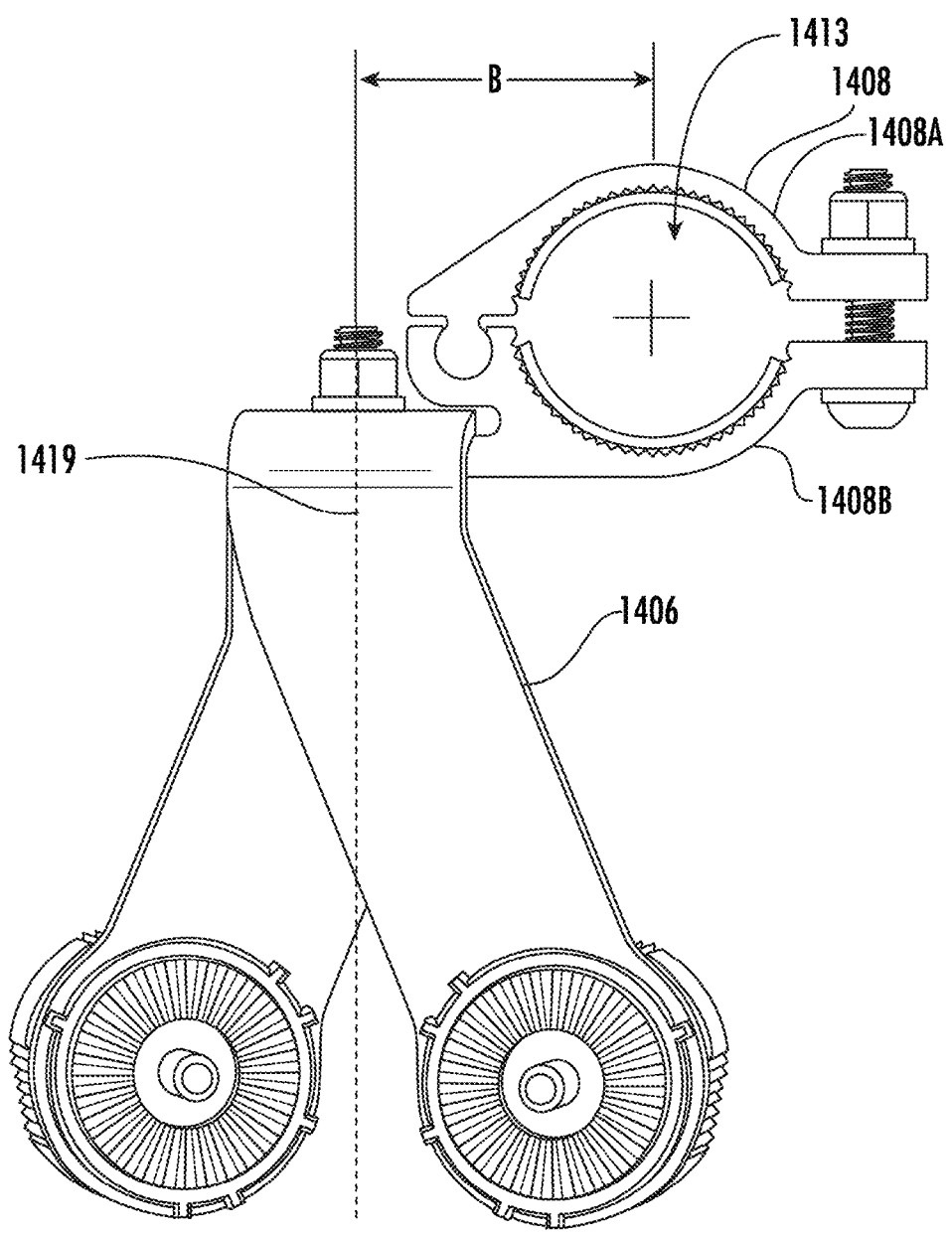
Figure 15A:
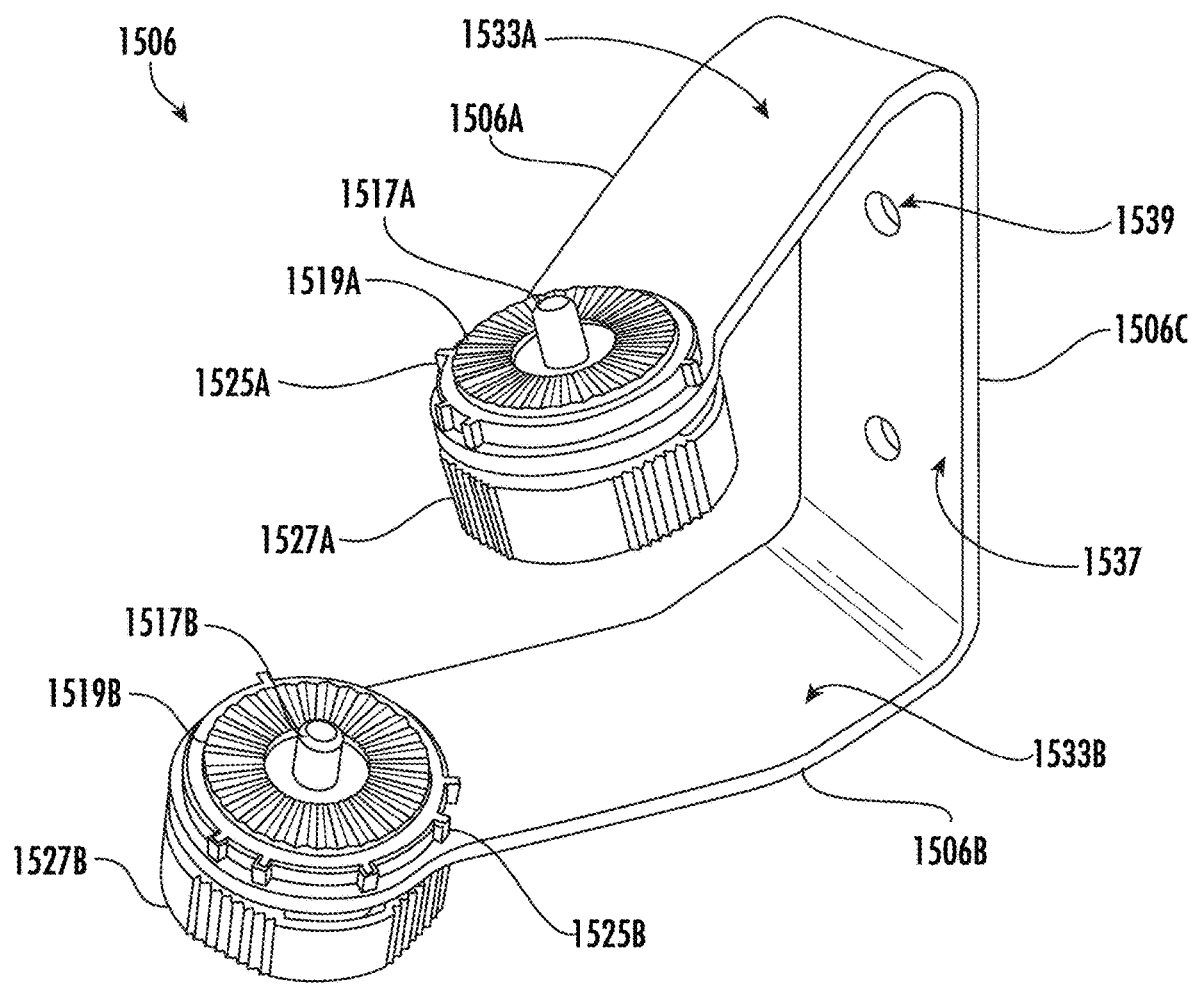
Figure 15B:
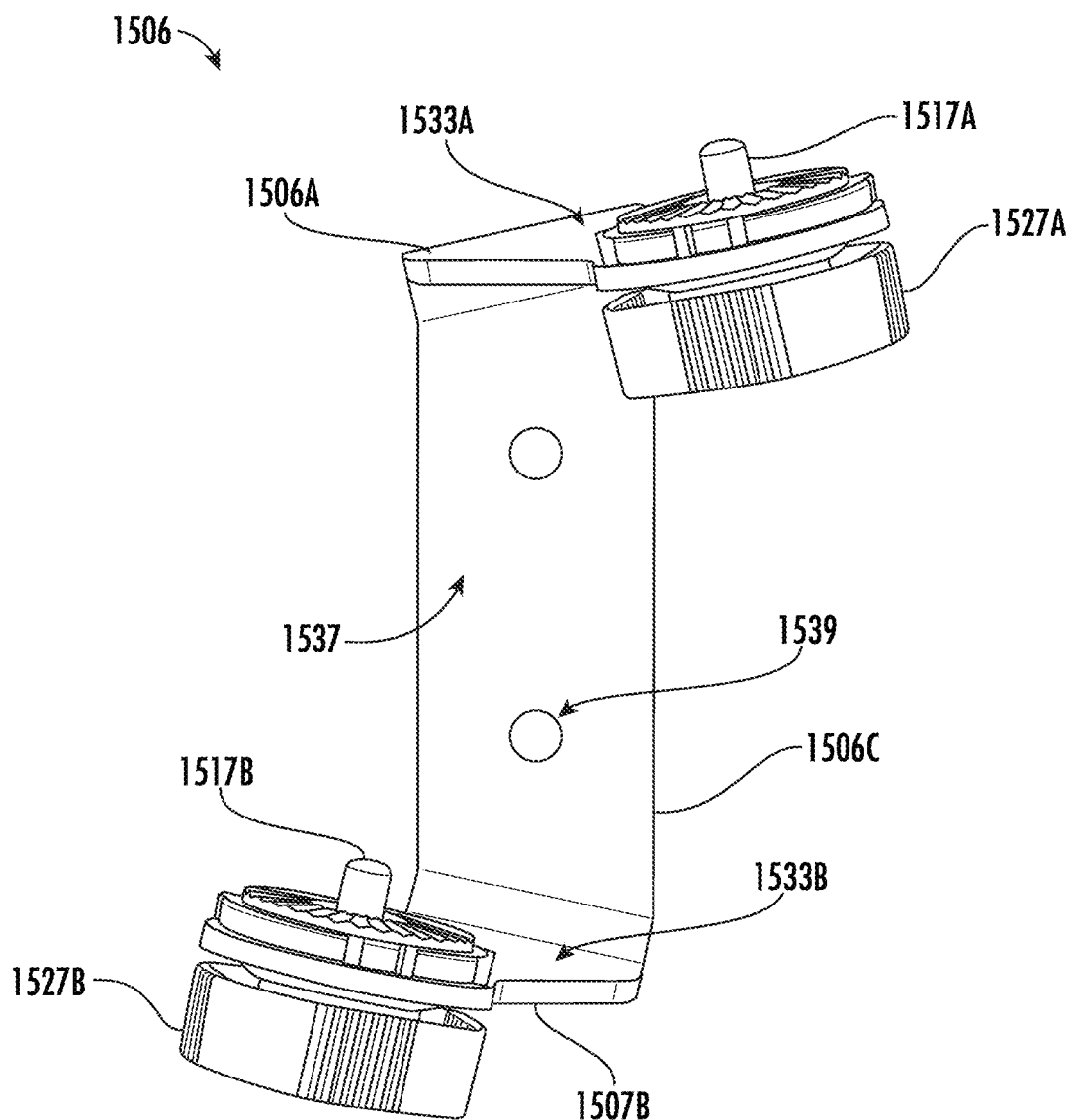
Figure 15C:
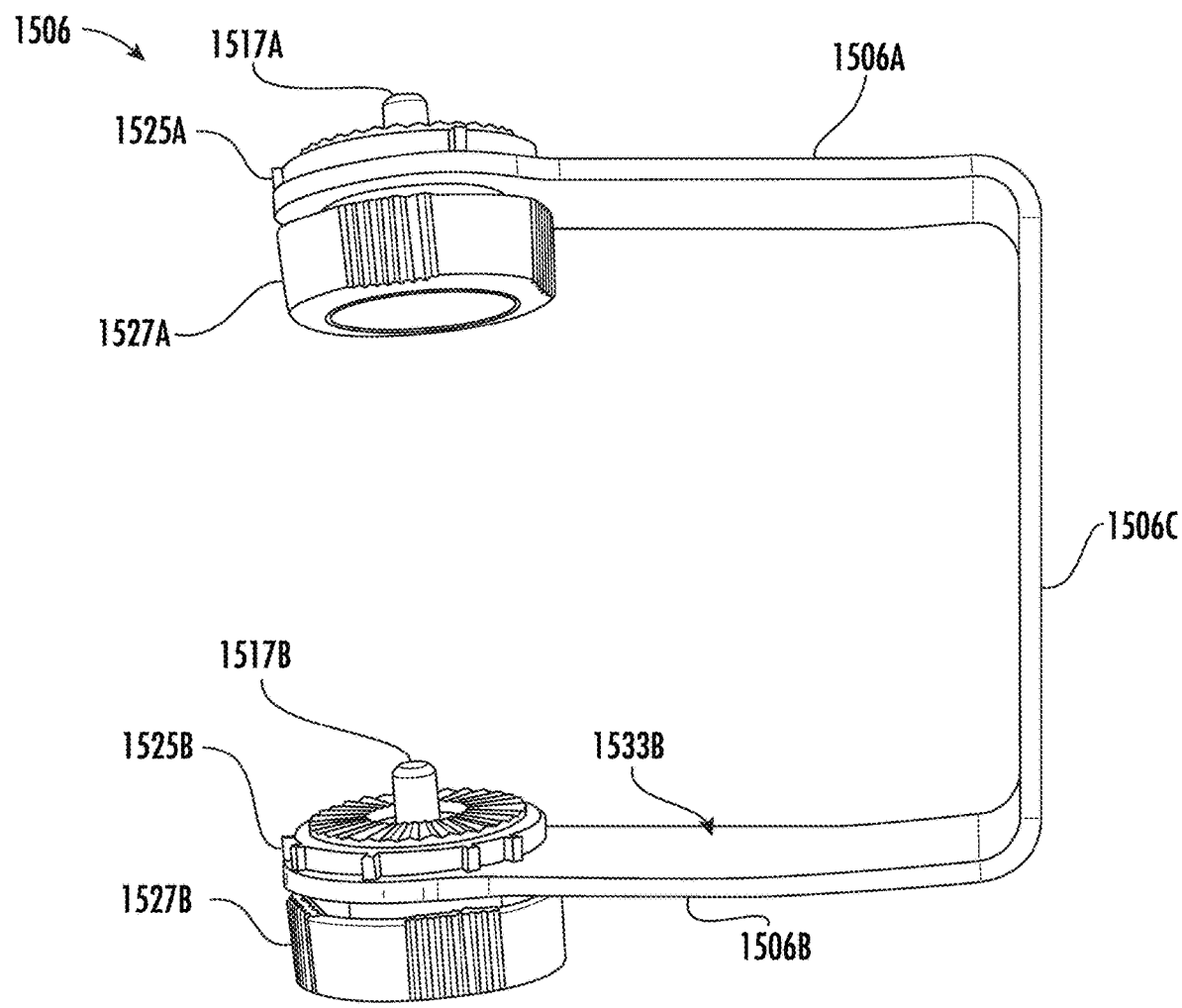
Figure 15D:
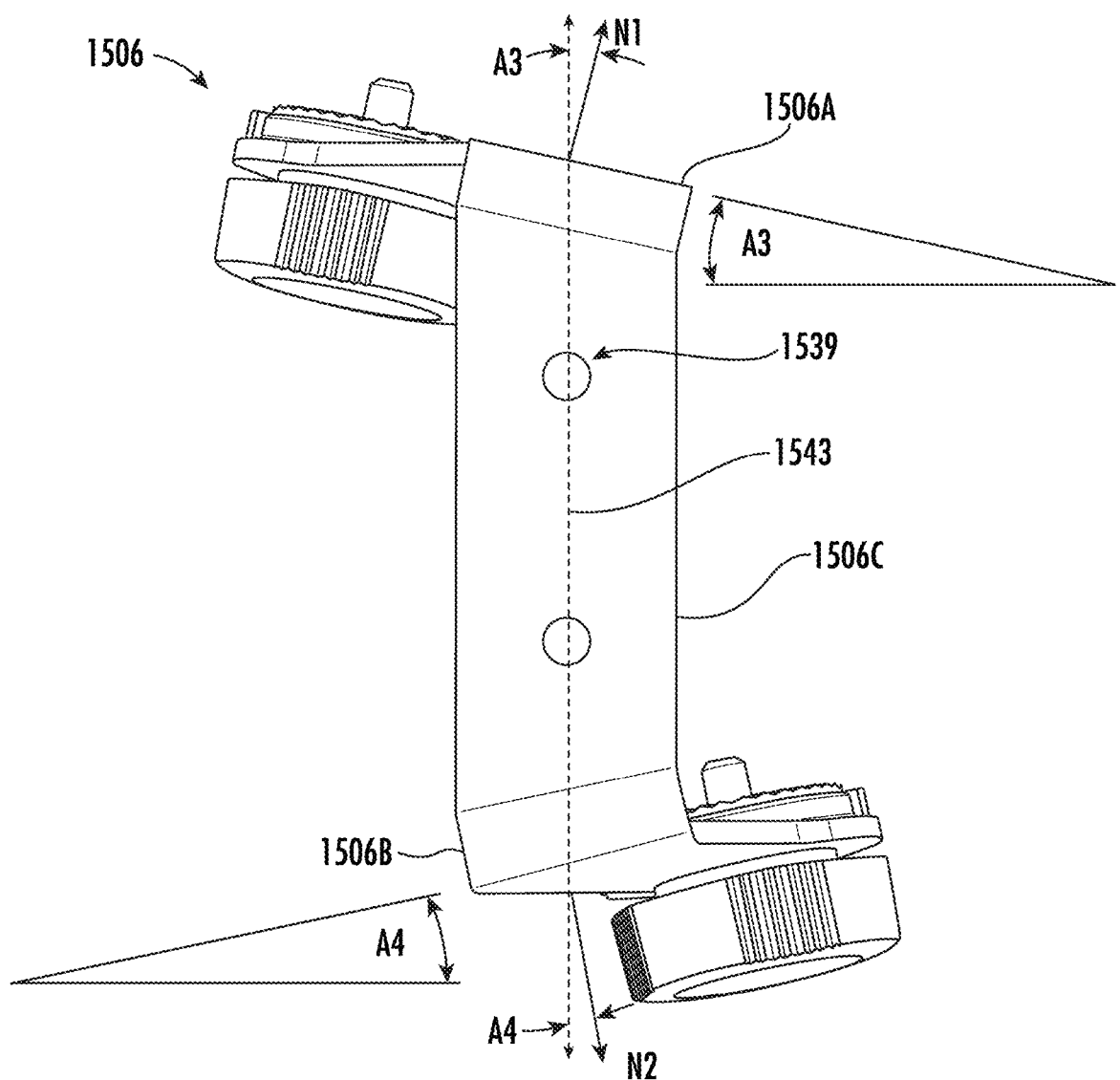
Figure 15E:
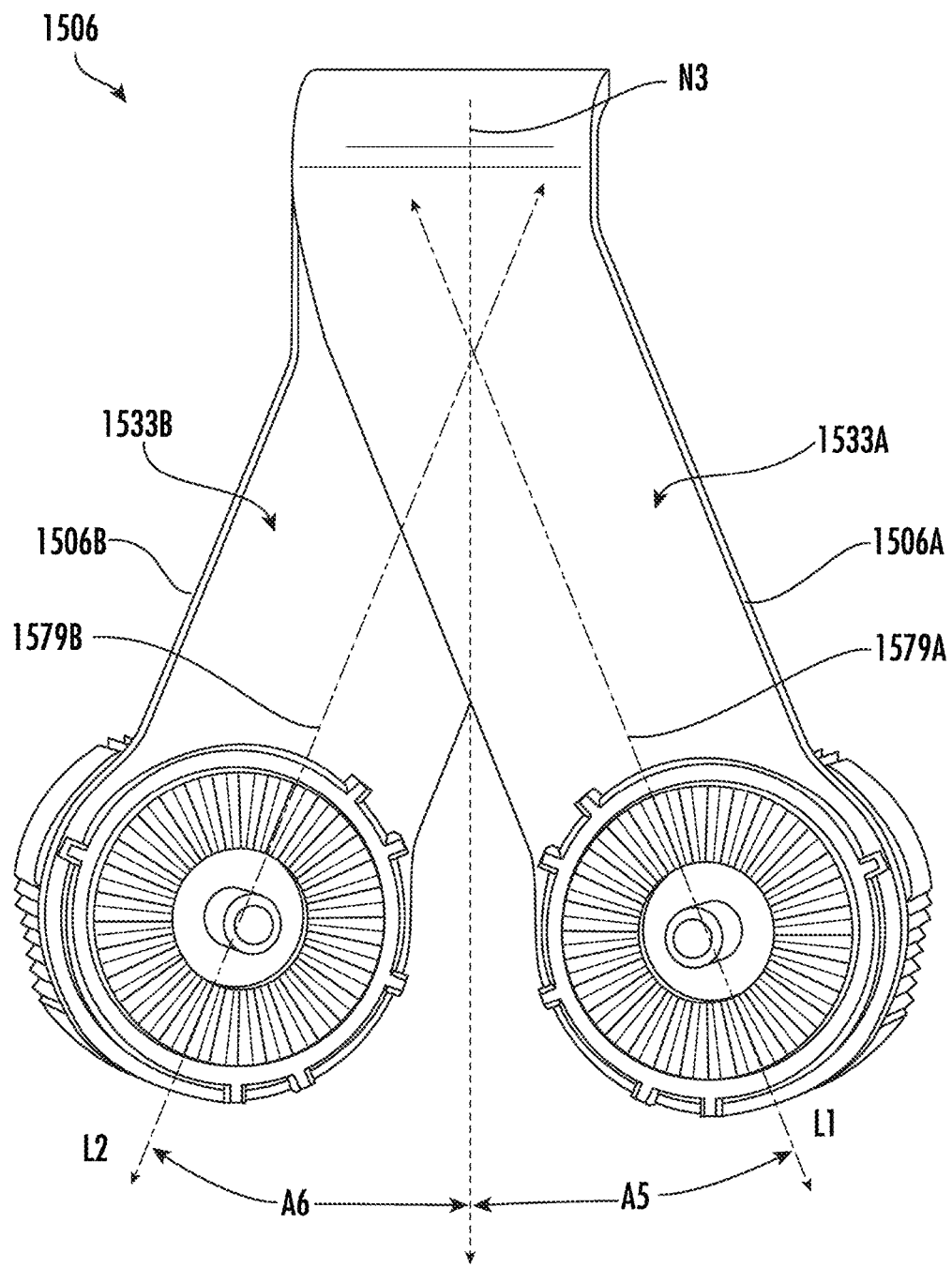
Figure 16:
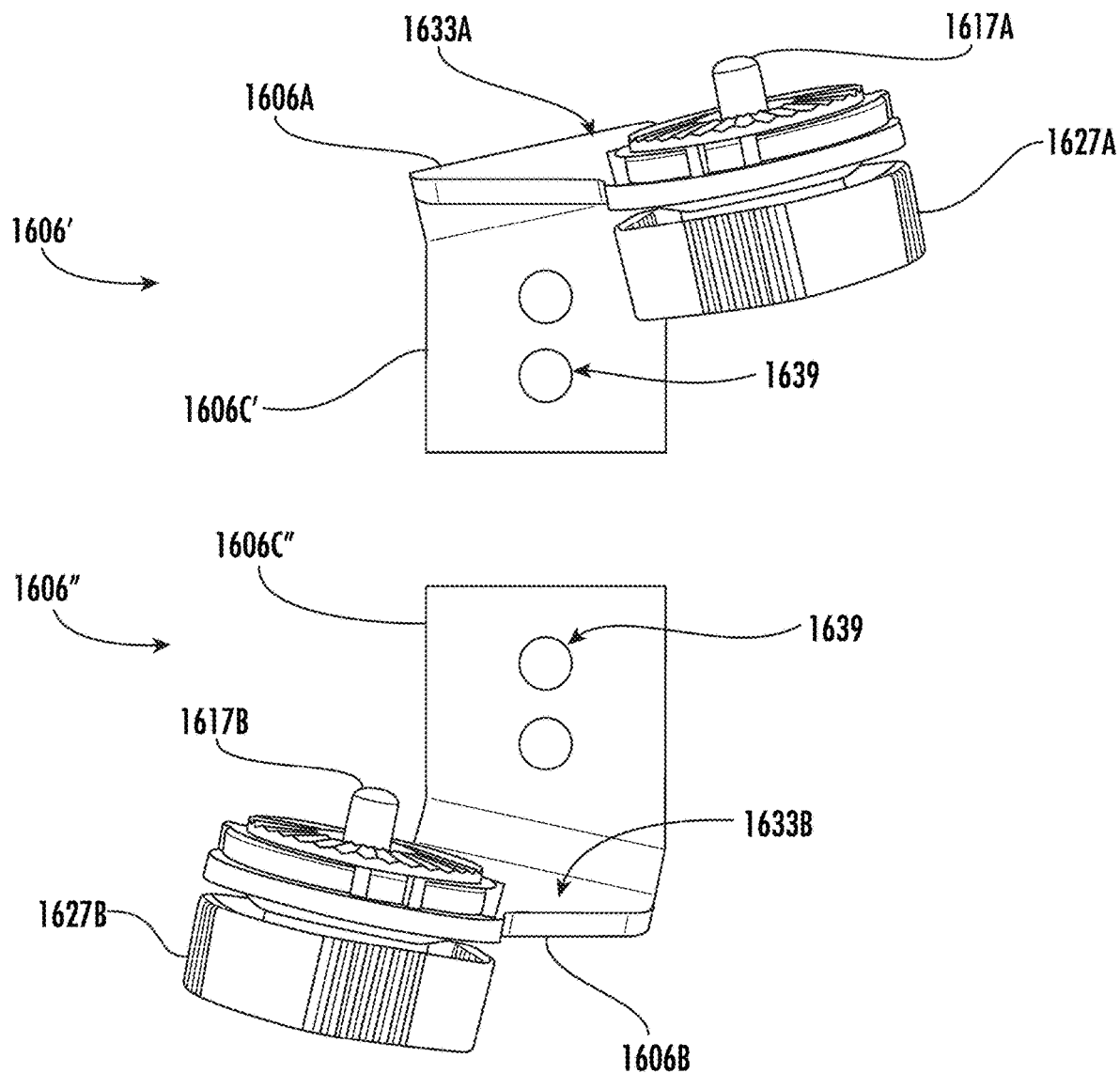
Figure 17:
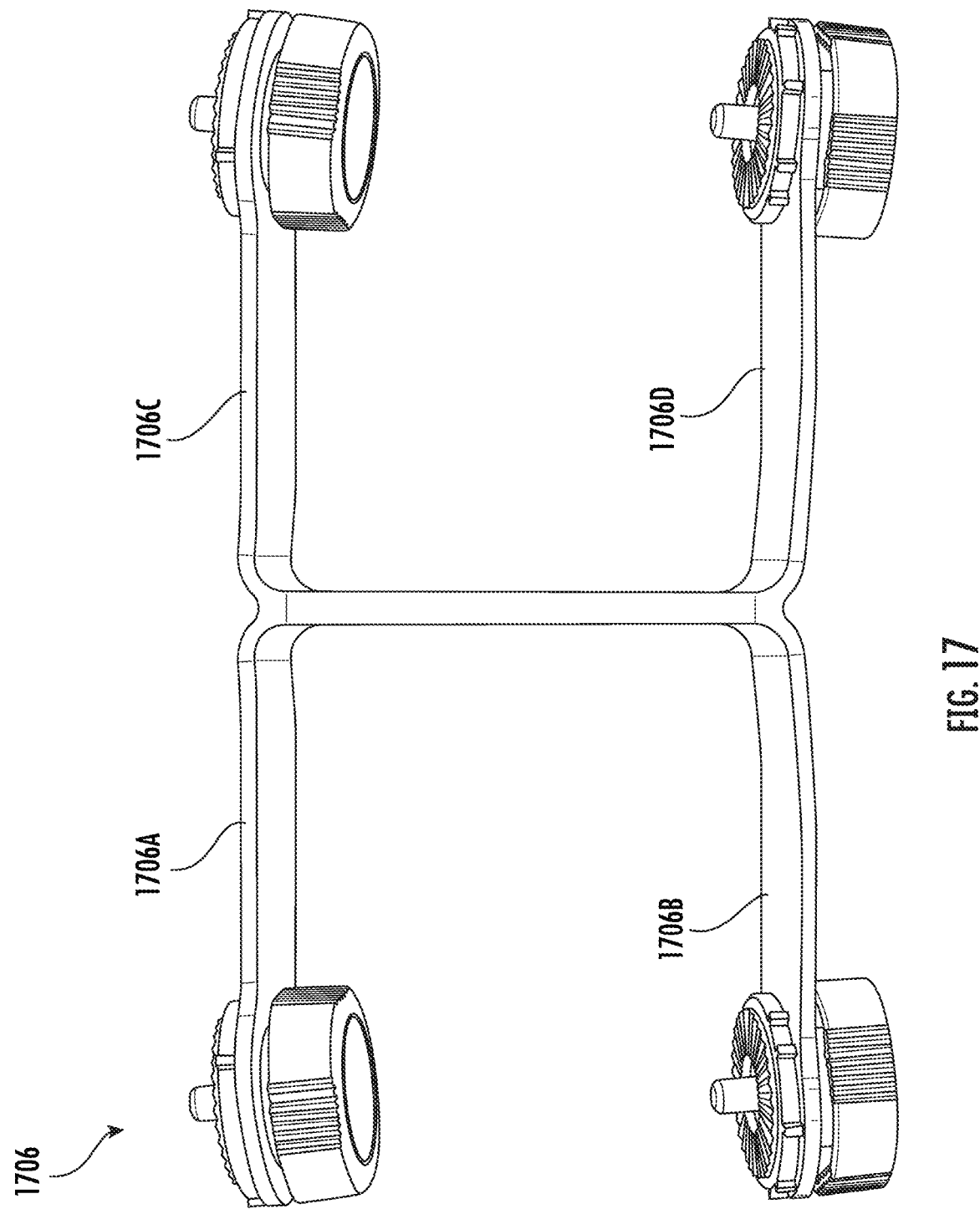
Figure 18:
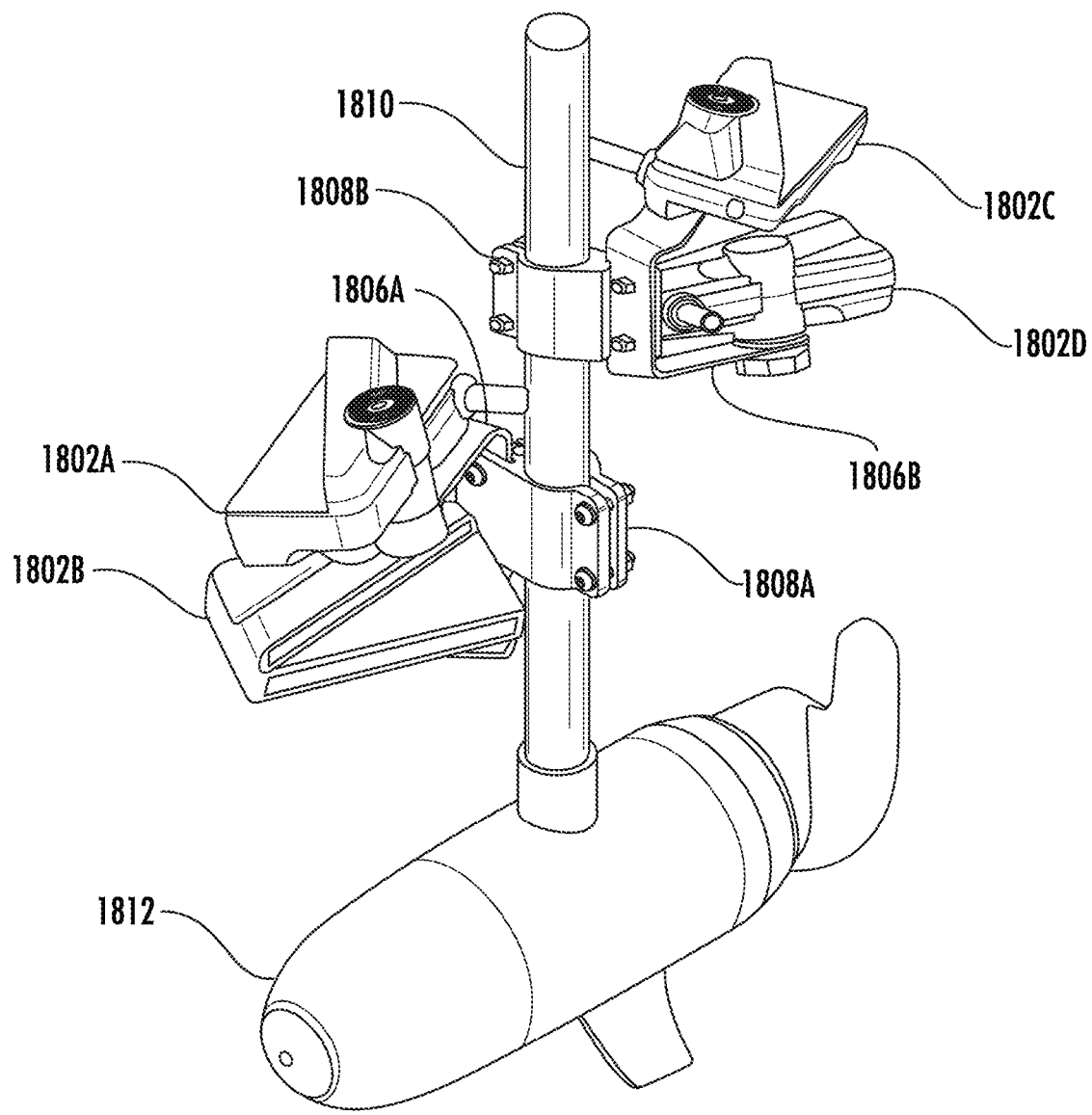
Figure 19:
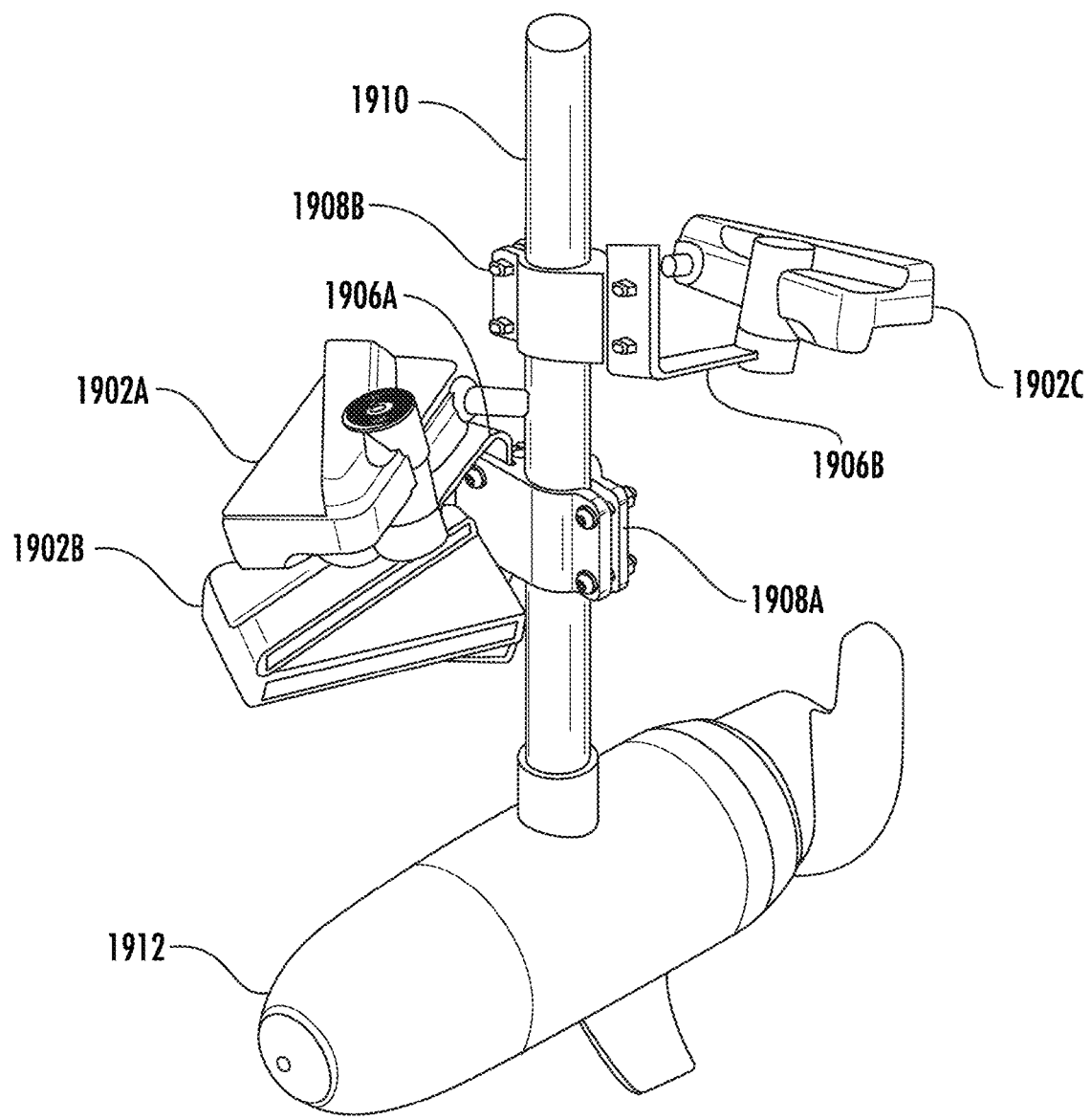
Figure 20:
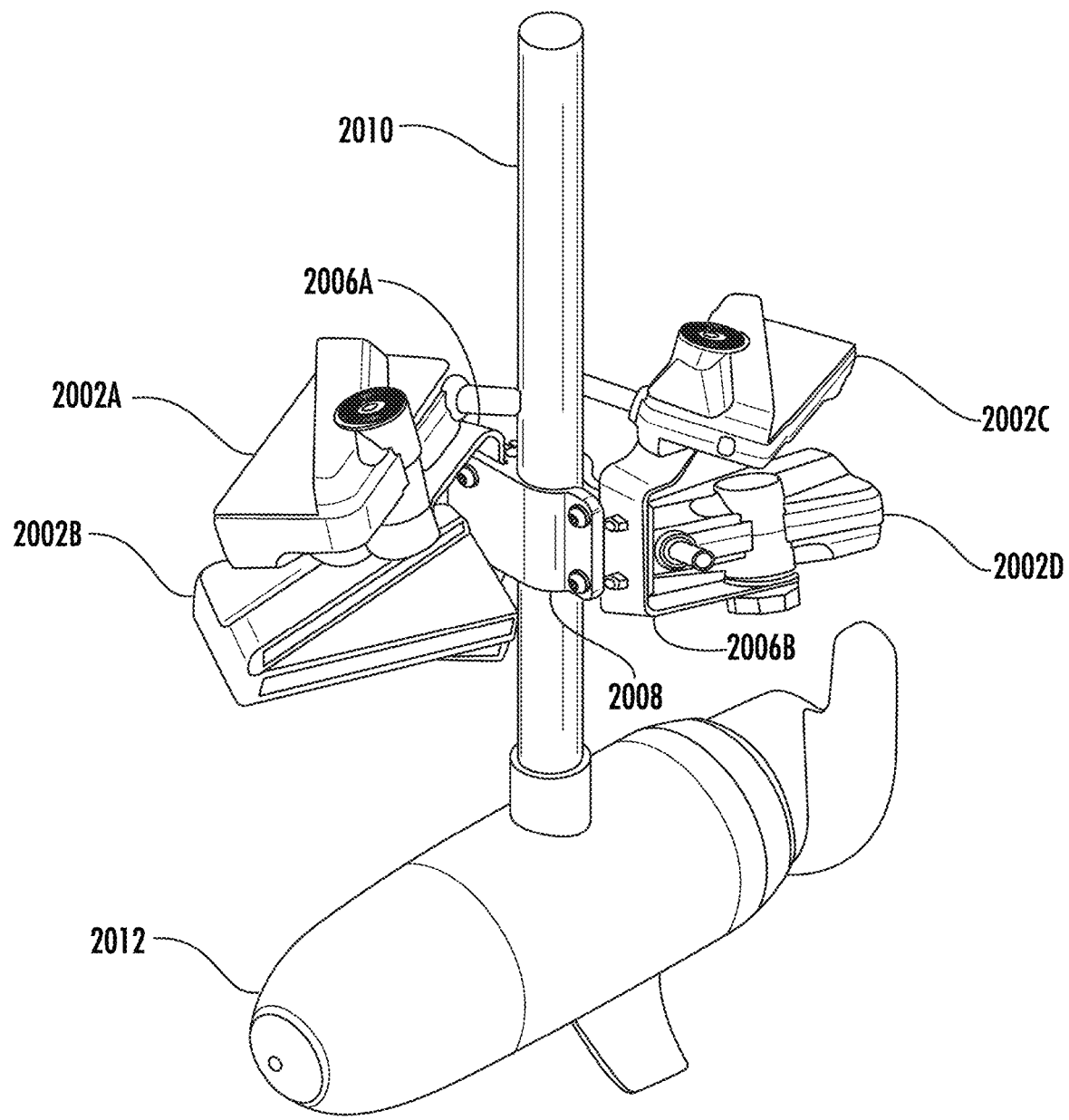
Figure 21:
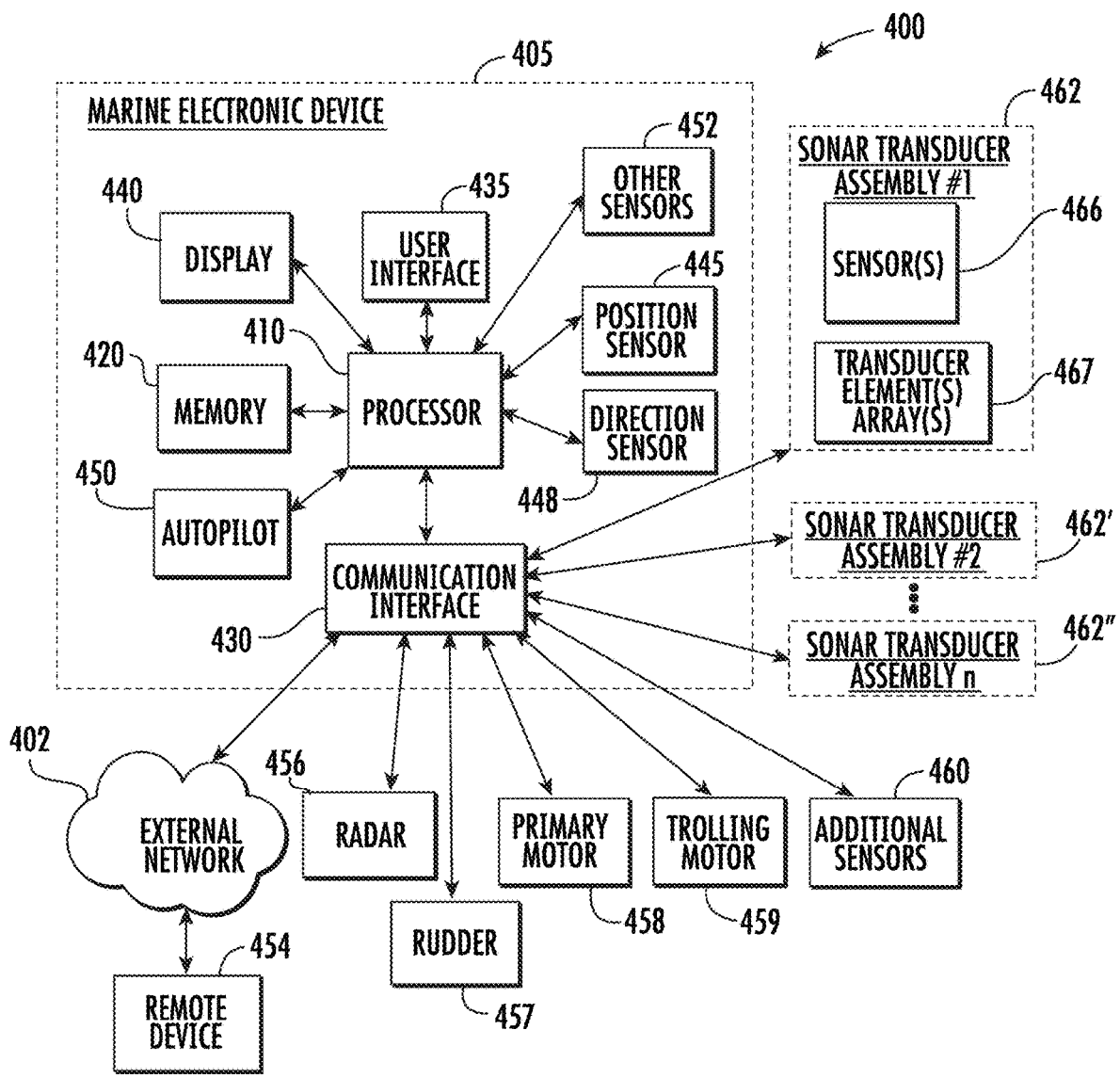
Figure 22:
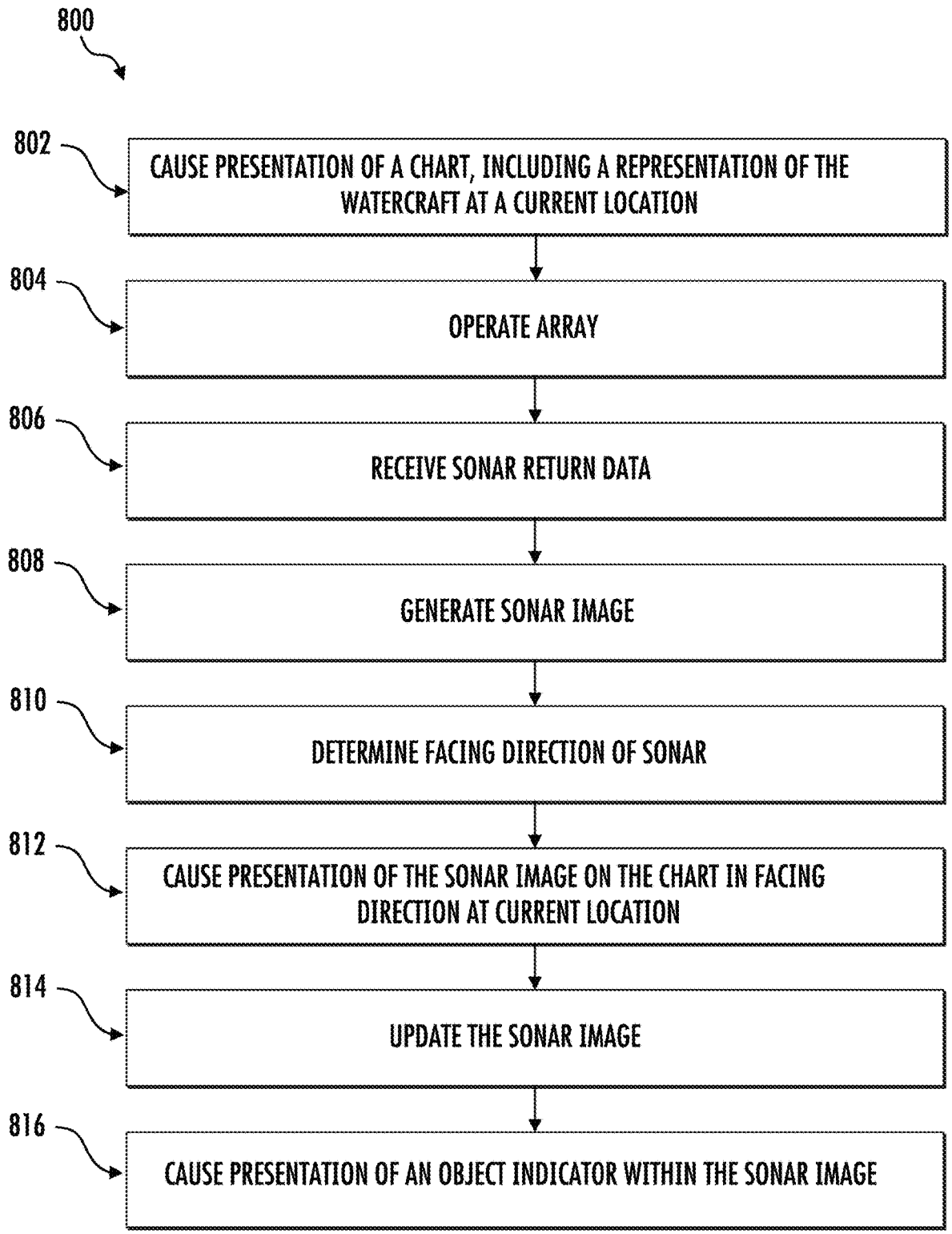
Figure 23:
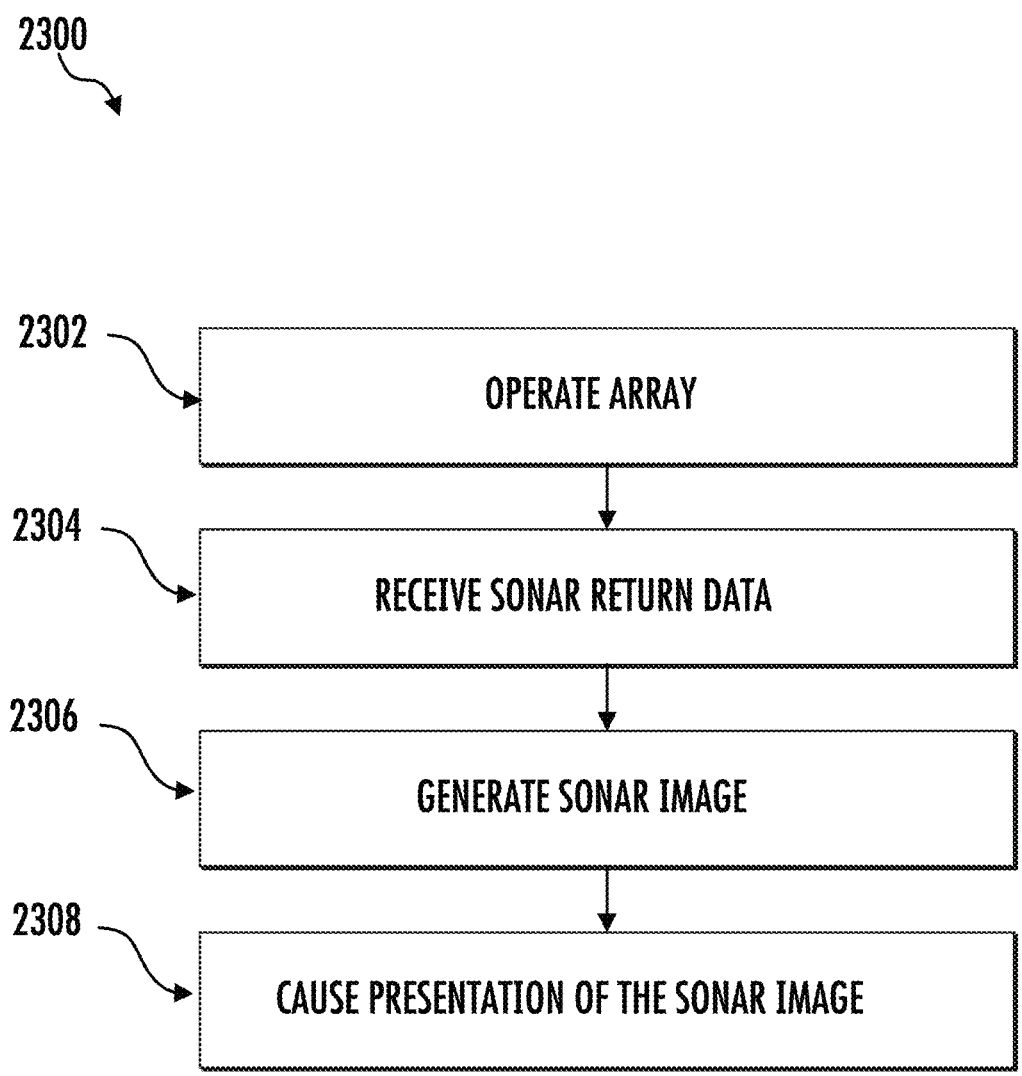

Having thus described the invention in general terms, reference will now be made to the accompanying drawings, which are not necessarily drawn to scale, and wherein:

FIG. 1 illustrates an example watercraft including various marine devices, in accordance with some embodiments discussed herein;

FIG. 2A illustrates an example array of transducer elements, in accordance with some embodiments discussed herein;

FIG. 2B illustrates a side view of the array of transducer elements shown in FIG. 2A, wherein an example first range of angles and an example second range of angles for beamformed sonar return beams are illustrated, in accordance with some embodiments discussed herein;

FIG. 2C illustrates an end view of the array of transducer elements shown in FIG. 2B along with illustrated ranges of angles of beamformed sonar return beams, in accordance with some embodiments discussed herein;

FIG. 3 illustrates three example arrays arranged to provide continuous sonar coverage utilizing beamformed sonar return beams, in accordance with some embodiments discussed herein;

FIG. 3A illustrates a first array shown in FIG. 3 along with its corresponding ranges of angles of beamformed sonar return beams, in accordance with some embodiments discussed herein;

FIG. 3B illustrates a second array shown in FIG. 3 along with its corresponding ranges of angles of beamformed sonar return beams, in accordance with some embodiments discussed herein;

FIG. 3C illustrates a third array shown in FIG. 3 along with its corresponding ranges of angles of beamformed sonar return beams, in accordance with some embodiments discussed herein;

FIG. 4 illustrates another example arrangement of three example arrays arranged to provide continuous sonar coverage utilizing beamformed sonar return beams, in accordance with some embodiments discussed herein;

FIG. 5 shows a perspective view of an example transducer assembly that includes three arrays, in accordance with some embodiments discussed herein;

FIG. 6 shows an exploded view of the example transducer assembly shown in FIG. 5, in accordance with some embodiments discussed herein;

FIGS. 7A-7B illustrate example mounting options for the example transducer assembly of FIG. 5 when mounted generally horizontally, in accordance with some embodiments discussed herein;

FIG. 8 illustrates a schematic top plan view of a watercraft with an example transducer assembly utilizing three arrays, wherein the transducer assembly is mounted generally horizontally to provide sonar coverage in the port-to-starboard direction in front of the watercraft, in accordance with some embodiments discussed herein;

FIG. 9 shows an example display presenting a two-dimensional (2D) live sonar image corresponding to the sonar coverage shown in FIG. 8, in accordance with some embodiments discussed herein;

FIG. 10 illustrates the example display presenting a chart with two example sonar image overlays that work together to provide increased coverage around the watercraft, in accordance with some embodiments discussed herein;

FIG. 11 illustrates the example display presenting the chart shown in FIG. 10 with a 360 degree sonar image overlay, in accordance with some embodiments discussed herein;

FIG. 12A illustrates a perspective view of a system for generating live sonar images, in accordance with some embodiments discussed herein;

FIG. 12B illustrates a front view of the system of FIG. 12A, in accordance with some embodiments discussed herein;

FIG. 12C illustrates a top, schematic view of the system of FIG. 12A, in accordance with some embodiments discussed herein;

FIG. 13 illustrates a perspective view of the system of FIG. 12A where all sonar transducer assemblies are hidden, in accordance with some embodiments discussed herein;

FIG. 14A illustrates a perspective view of a clamp and a bracket that may be used to position one or more sonar transducer assemblies, in accordance with some embodiments discussed herein;

FIG. 14B illustrates a top view of the clamp and bracket of FIG. 14A, in accordance with some embodiments discussed herein;

FIG. 15A illustrates a perspective view of the bracket of FIG. 14A in isolation, in accordance with some embodiments discussed herein;

FIG. 15B illustrates a front view of the bracket of FIG. 15A, in accordance with some embodiments discussed herein;

FIG. 15C illustrates a right-side view of the bracket of FIG. 15A, in accordance with some embodiments discussed herein;

FIG. 15D illustrates a rear view of the bracket of FIG. 15A, in accordance with some embodiments discussed herein;

FIG. 15E illustrates a top view of the bracket of FIG. 15A, in accordance with some embodiments discussed herein;

FIG. 16 illustrates a front view of two separate brackets that may each be configured to position a respective sonar transducer assembly, in accordance with some embodiments discussed herein;

FIG. 17 illustrates a right-side view of a bracket that may be configured to position four sonar transducer assemblies, in accordance with some embodiments discussed herein;

FIG. 18 illustrates a perspective view of another system for generating live sonar images having 360 degrees of coverage, in accordance with some embodiments discussed herein;

FIG. 19 illustrates a perspective view of another system for generating live sonar images having 360 degrees of coverage, in accordance with some embodiments discussed herein;

FIG. 20 illustrates a perspective view of another system for generating live sonar images having 360 degrees of coverage, in accordance with some embodiments discussed herein;

FIG. 21 illustrates a block diagram of an example system with various electronic devices, marine devices, and secondary devices shown, in accordance with some embodiments discussed herein;

FIG. 22 illustrates a flowchart of an example method of presenting a sonar image over a chart, in accordance with some embodiments discussed herein; and FIG. 23 illustrates a flowchart of an example method of displaying a sonar image, in accordance with some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

FIG. 1 illustrates an example watercraft 100 including various marine devices, in accordance with some embodiments discussed herein. As depicted in FIG. 1, the watercraft 100 (e.g., a vessel) is configured to traverse a marine environment, e.g. body of water 101, and may use one or more sonar transducer assemblies 102a, 102b, and 102c disposed on and/or proximate to the watercraft. Notably, example watercraft contemplated herein may be surface watercraft, submersible watercraft, or any other implementation known to those skilled in the art. The transducer assemblies 102a, 102b, and 102c may each include one or more transducer elements configured to transmit sound waves into a body of water, receive sonar returns from the body of water, and convert the sonar returns into sonar return data. Various types of sonar transducers may be utilized—for example, a linear downscan sonar transducer, a conical downscan sonar transducer, a sidescan sonar transducer, and/or one or more arrays of a plurality of sonar transducer elements.

In this regard, the sonar transducer may be formed of one or more active elements (e.g., piezoelectric crystals). Wires are soldered to coatings on the active element and can be attached to a cable which transfers the electrical energy from a transmitter to the active element. The shape of the active element determines both its resonant frequency and shape of the sonar beam. Further, padding can be used to prevent sonar emissions from certain faces of the active element (e.g., the top and sides) leaving exposed only the emitting faces for which the sonar beam is desired. Frequencies used by sonar devices vary, and some sonar transducers may produce sonar beams at multiple different frequencies. Some example sonar transducers utilize a frequency range from 50 KHz to over 900 KHz depending on application. Some sonar systems vary the frequency within each sonar pulse using "chirp" technology.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more transducer assemblies (e.g., 102a, 102b, and/or 102c) may be mounted in various positions and to various portions of the watercraft 100 and/or equipment associated with the watercraft 100. For example, the transducer assembly may be mounted to the hull (e.g., transom 106) of the watercraft 100, such as depicted by transducer assembly 102a. The transducer assembly may be mounted to the bottom or side of the hull 104 of the watercraft 100, such as depicted by transducer assembly 102b. The transducer assembly may be mounted to the trolling motor 108, such as depicted by transducer assembly 102c. Other mounting configurations are contemplated also, such as may enable rotation of the transducer assembly (e.g., mechanical and/or manual rotation, such as on a rod or other mounting connection).

The watercraft 100 may also include one or more marine electronic devices 160, such as may be utilized by a user to interact with, view, or otherwise control various functionality regarding the watercraft, including, for example, nautical charts and various sonar systems described herein. In the illustrated embodiment, the marine electronic device 160 is positioned proximate the helm (e.g., steering wheel) of the watercraft 100—although other places on the watercraft 100 are contemplated. Likewise, additionally or alternatively, a remote device (such as a user's mobile device) may include functionality of a marine electronic device.

The watercraft 100 may also comprise other components within the one or more marine electronic devices 160 or at the helm. In FIG. 1, the watercraft 100 comprises a radar 116, which is mounted at an elevated position (although other positions relative to the watercraft are also contemplated). The watercraft 100 also comprises an AIS transceiver 118, a direction sensor 120, and a camera 122, and these components are each positioned at or near the helm (although other positions relative to the watercraft are also contemplated). Additionally, the watercraft 100 comprises a rudder 110 at the stern of the watercraft 100, and the rudder 110 may be positioned on the watercraft 100 so that the rudder 110 will rest in the body of water 101. In other embodiments, these components may be integrated into the one or more electronic devices 160 or other devices. Another example device on the watercraft 100 includes a temperature sensor 112 that may be positioned so that it will rest within or outside of the body of water 101. Other example devices include a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110.

Some example embodiments of the present invention utilize sonar transducer assemblies that provide for generating near real-time (e.g., "live") sonar imagery. In this regard, in some embodiments, the entire sonar image is continuously updated all at once (e.g., as opposed to building up historical slices of sonar data as is typical of conventional downscan or sidescan sonar images). The example transducer assembly described with respect to FIGS. 2A-8 provides an example transducer assembly that can be used to form the live sonar imagery. Notably, however, other transducer assembly configurations can also be used to form live sonar imagery and embodiments of the present invention are not necessarily meant to be limited to a specific transducer assembly. For example, more or less arrays or elements within the arrays may be used, different transducer element configurations may be used, multiple sonar transducer assemblies can be used, etc.

FIGS. 2A-2C illustrate an example array 220 of transducer elements 208 that may be utilized with various embodiments of the present invention, such as within an example transducer assembly described herein. In some embodiments, the transducer array 220 may include a plurality of transducer elements 208 arranged in a line and electrically connected relative to each other. For example, the transducer elements 208 may be individually positioned on a printed circuit board (PCB). The PCB may mechanically support and electrically connect the electronic components, including the transducer elements using conductive tracks (e.g. traces), pads, and other features. The conductive tracks may comprise sets of traces; for example, each transducer element may be mounted to the PCB such that the transducer element is in electrical communication with a set of traces. Each transducer element, sub-array, and/or the array of transducer elements may be configured to transmit one or more sonar pulses and/or receive one or more sonar return signals. Unless otherwise stated, although FIGS. 2A-2C illustrate a linear array with transducer elements of a certain shape, different types of arrays (or sub-arrays), transducer elements, spacing, shapes, etc. may be utilized with various embodiments of the present invention.

In the illustrated embodiment shown in FIG. 2A, the transducer array 220 includes an emitting face 221 with a length $L_A$ and a width $W_A$, where the length is greater than the width. Within the array 220, each transducer element 208 defines an emitting face 209 with a length LT and a width WT, where the length is greater than the width. The length of each transducer element 208 is perpendicular to the length of the emitting face 221. Each transducer element 208 is spaced at a predetermined distance from an adjacent transducer element, which may be designed based on desired operating characteristics of the array 220, such as described herein.

In some embodiments, the array 220 of transducer elements 208 is configured to operate to transmit one or more sonar beams into the underwater environment. Depending on the configuration and desired operation, different transmission types of sonar beams can occur. For example, in some embodiments, the array 220 may transmit sonar beams according to a frequency sweep (e.g., chirp sonar) so as to provide sonar beams into the underwater environment. In some embodiments, the array 220 may be operated to frequency steer transmitted sonar beams into various volumes of the underwater environment. In some embodiments, the array 220 may be operated to cause a broadband transmit sonar beam to be sent into the underwater environment. Depending on the frequency used and phase shift applied between transducer elements, different volumes of the underwater environment may be targeted.

In some embodiments, the array 220 may be configured to receive sonar return signals. The way the sonar return signals are received and/or processed may vary depending on the desired sonar system configuration. FIGS. 2B-2C illustrate the array 220 with example possible sonar return beam coverage according to various example embodiments. In this regard, in some embodiments, each of the plurality of transducer elements are configured to operate at a fixed phase shift (e.g., at one of 0 radians, $\pi/2$ radian, $\pi/4$ radian, or $\pi/8$ radian) and vary in frequency (e.g., between 500 kHz-1200 kHz). This processing approach beamforms multiple sonar return beams (e.g., beam 280) between a first range of angles ($\theta_1$) 281 and between a second range of angles ($\theta_2$) 282. To explain, the sonar returns may be received by the array 220 and filtered into frequency bins based on the frequency of the signal. From that, sonar return beams 280 can be determined that provide sonar returns within a small angle window (e.g., 0.25 degrees to 2 degrees, although greater or lesser angle windows are contemplated). Since the mounting orientation with respect to the watercraft can be known, and the frequency is known, then the relative angle with respect to the waterline (or other reference) can be determined and used to form sonar imagery, as described herein.

With further reference to FIG. 2B, the sonar return beams (e.g., 280) can be "steered" (e.g., along arrow R) within the first range of angles 281 based on varying the frequency (e.g., between 291a and 291b). Likewise, the sonar return beams can be "steered" within the second range of angles 282 based on varying the frequency (e.g., between 292a and 292b). By operating the transducer elements at a fixed phase shift, the two range of angles 281, 282 can be covered with sonar beams, but there is also a gap (e.g., indicated by the range of angles ($\theta_3$) that is not able to be covered by the frequency steered sonar return beams.

Without being bound by theory, a perhaps simplified explanation of this can be based on considering a single beam shape that is formed by a receipt event of the array. The beam shape is formed of a rather wide main beam lobe, along with at least one relatively small defined side lobe (e.g., the beam 280) that extends outwardly therefrom. By operating at a fixed phase shift and ignoring the main beam lobe, the sonar return signals received within the side lobe can be determined. Further, changing the frequency causes a shifting of the direction of the side lobe among the range of angles (281 or 282). Since the side lobe is symmetrical about the main lobe, there are two ranges of angles that are symmetrical about the facing direction DFD of the emitting face 221 of the array 220.

Further information regarding beamforming, including frequency steered beamforming, can be found, for example, in the following: U.S. Pat. No. RE45,379, entitled "Frequency Division Beamforming for Sonar Arrays"; U.S. Pat. No. 10,114,119, entitled "Sonar Systems using Interferometry and/or Beamforming for 3D Imaging"; U.S. Pat. No. 9,739,884, entitled "Systems and Associated Methods for Producing a 3D Sonar Image"; and U.S. patent application Ser. No. 16/382,639, published as U.S. Publication No. 2019/0265354, and entitled "Sonar Transducer Having Geometric Elements"; the contents of each hereby being incorporated by reference in their entireties.

Depending on various factors, different beam shapes can be achieved and different ranges of angles can be achieved. The following describes some example factors that can be varied to effect the beam shapes and different ranges of angles: the number of transducer elements, the size/shape of the transducer elements, the size/shape of the array, the fixed phase shift, the frequency range, among other things. An example embodiment produces a first range of angles spanning ~22.5 degrees and a second range of angles spanning ~22.5 degrees with a gap of range of angles of ~45 degrees therebetween. Additionally, sonar return beams of ~0.5 degrees to 1 degrees are formed. Further, with reference to FIG. 2C, a transverse beamwidth $\theta_3$ of ~20 degrees is formed (although other transverse beamwidths are contemplated such as between ~9 degrees and 27 degrees). Some example embodiments that may achieve such example beam shapes include an array length of between ~100-150 mm; an array width of between ~3-10 mm; an array thickness of between ~1-3 mm; a number of transducer elements of between 50-200; a width of the transducer element of between ~0.4-1 mm; and a length of the transducer element of between ~2-10 mm (although outside of these ranges is also contemplated).

In some embodiments, the system may be configured to utilize more than one array, where the arrays are oriented relative to each other to increase coverage volume of the underwater environment. For example, in some embodiments, a second (or more) array(s) can be added and tilted relative to the first array such that the gap within the first array is "covered" by one or more of the range of angles of sonar return beams from such array(s). FIG. 3 illustrates an example three array assembly 310 that is designed to provide continuous sonar coverage utilizing beamformed sonar return beams. The sonar assembly 310 includes a first array 340, a second array 330, and a third array 320. The first array 340 (shown by itself in FIG. 3A), is oriented with a facing direction (e.g., substantially straight down relative to the figure) so as to produce a first range of angles 341 and a second range of angles 342 (with a gap in between). The second array 330 (shown by itself in FIG. 3B), is oriented with a facing direction at an angle (e.g., −22.5 degrees relative to the facing direction of the first array 340) so as to produce a first range of angles 331 and a second range of angles 332 (with a gap in between). The third array 320 (shown by itself in FIG. 3C), is oriented with a facing direction at another angle (e.g., −45 degrees relative to the facing direction of the first array 340) so as to produce a first range of angles 321 and a second range of angles 322 (with a gap in between). As so arranged, the gaps between each set of the two range of angles are covered by a range of angles from each of the other two arrays. The illustrated example thus provides continuous sonar beam coverage for ~135 degrees, although other overall coverage angles are contemplated such as angles ranging from 90 degrees-140 degrees.

FIG. 4 illustrates another example transducer assembly 510 that includes an arrangement of three arrays arranged to provide continuous sonar coverage utilizing beamformed sonar return beams. Notably, while the first array 540 and the third array 520 are mounted and oriented similarly to the first and third arrays of the transducer assembly 310 of FIG. 3, the second array 530 of the transducer assembly 510 has been shifted (e.g., offset) while maintaining its relative angle orientation (e.g., it is still mounted with a facing direction at an angle (e.g., 22.5 degrees) relative to the facing direction of the first array—just as in the transducer assembly 310). Thus, the transducer assembly 510 forms an "X" configuration for the first array 540 and the third array 520, but also has a line "_" at the bottom of the "X" corresponding to the second array 530. Notably, the same relative continuous sonar beam coverage is obtained (e.g., as the small relative shift from the centerpoint 315 in FIG. 3 does not significantly change the resulting beam coverage—particularly with respect to the distance covered in the underwater environment). For explanatory purposes, the various ranges of angles are shown extending from a slightly revised centerpoint 515.

FIG. 5 illustrates an example transducer assembly 602 including a housing 605 that houses the three arrays 620, 630, 640 (which are shown in exploded view in FIG. 6). Notably, the housing 605 includes one or more mounting features (e.g., a ratchet-type mounting feature 604 for enabling secured attachment in different orientations). The cable 606 provides a safe channel for running various wires 607 used in conjunction with the arrays. Notably, the X plus line configuration of the arrays enables some benefits for the transducer assembly 602. For example, the housing 605 of the transducer assembly 602 may maintain a small footprint and still provide a straight bottom that enables a user to more easily comprehend the position of the center array (and, thus, determine and orient the transducer assembly 602 properly with respect to the watercraft for the desired coverage). With reference to FIG. 6, the PCB 609 and the electrical connectors 603 are also shown for electrically connecting the arrays 620, 630, and 640.

Though shown mounted in FIGS. 3 and 4 so that the resulting sonar coverage is forward (left side) and downward, with the wide beam angle of ~135 degrees extending in the vertical plane, other orientations are contemplated. For example, in some embodiments, the transducer assembly may be oriented in a generally horizontal direction to cause the wide beam angle (e.g., ~135 degrees) to extend in a generally horizontal plane, such as may correspond with the water surface. Such an orientation provides a wider live sonar image in the horizontal plane extending from the watercraft and may be preferred for understanding positions of objects within the water (e.g., cast the fishing line 5 degrees off the bow on the starboard side) and/or distances of objects from the watercraft (e.g., the fish school is 15 feet from the watercraft).

FIGS. 7A-7B illustrate example mounting orientations for the transducer assembly shown in FIG. 5. For example, FIG. 7A illustrates the transducer assembly 902 mounted to a pole 910 (e.g., a shaft of a trolling motor) using a mounting arm 906. The mounting arm 906 attaches via a fastener to the transducer assembly 902 at a first end 907 and to the pole 910 via a clamp 908 at a second end 905. The mounting arm 906 includes a bend that enables the transducer assembly 902 to be spaced from the pole 910 and oriented as desired (e.g., facing generally horizontally along arrow J). FIG. 7B illustrates the transducer assembly 902 mounted to the trolling motor housing 912 via a strap and clamp 904. The transducer assembly 902 may be oriented as desired (e.g., facing generally horizontally along the arrow J).

FIG. 8 illustrates a watercraft 100 with an example transducer assembly 502 utilizing three arrays to provide continuous sonar coverage 505 horizontally in the forward direction relative to the watercraft 100 (e.g., port-to-starboard). In this regard, the three arrays work together to provide corresponding ranges of angles 521, 522, 531, 532, 541, 542—similar to those shown and described with respect to FIG. 4. In the illustrated embodiments, the lengths of each of the emitting faces of the three arrays extends in the port-to-starboard direction of the watercraft. As indicated herein, the frequency of the sonar return beams can be varied to provide a sonar return beam 506 that can sweep (e.g., along arrow A) within the sonar beam coverage 505 (e.g., across the three arrays)—to capture sonar return signals along the sonar beam coverage. With such an example set-up, the resulting 2D live sonar image would show a live (or near real-time) sonar image corresponding to the volume extending in front of the watercraft according to the beam coverage (although in some embodiments the transducer assembly may have a facing direction that is different than forward and/or rotatable with respect to the watercraft).

In some embodiments, the transducer assembly can be used to form a live (or substantially real-time) two-dimensional (2D) sonar image (e.g., time/distance from the transducer assembly and angle) with a horizontal view. For example, FIG. 9 illustrates a live 2D sonar image 720 presented on a display 705 (e.g., of a marine electronics device). The live 2D sonar image 720 is formed as slices of sonar return data corresponding to each sonar return beam 706 extending within that sonar beam coverage extending from the transducer assembly location 721. For example, the sonar return beam 706 may extend at different angles, such as along the arrow B. Overall, however, the sonar return beams 706 may add up to form an overall coverage angle θ4. Notably, the sonar image 720 may be formed with a radial distance $D_{RSI}$ that corresponds to an effective sonar return distance (e.g., a distance that corresponds to desirably accurate sonar returns from the emitting face of the transducer assembly). The live 2D sonar image 720 can be updated in substantially real-time all at once as the sonar return beams 706 are all received at substantially the same time (e.g., by selecting different frequencies to form all the different sonar return beams that are used to present sonar return data into the image at the proper angle). The detailed bottom surface is shown at 729.

Due to the overall coverage angle being ~135 degrees, there are blank spaces in each corner 723a, 723b (as the display is shaped as a rectangle). Notably, the shape of the sonar image may be different depending on the effective coverage provided by the sonar transducer assembly. In this regard, in some embodiments, the live sonar image is shaped to provide imagery of the sonar return data all at once, and that sonar return data is continuously updated such that the imagery is continuously updated.

Whether a novice or an expert, it would be beneficial to be able to quickly and easily visually appreciate the real-world sonar coverage of a sonar image, such as a live sonar image. Indeed, even for experts, it can be difficult (or mentally consuming) to determine the real-world sonar coverage of a sonar transducer of a watercraft, such as figuring out where objects in the sonar imagery are actually in the real-world. Some embodiments of the present invention aim to provide useful information that will aid the user in determining and understanding the sonar coverage of the underwater environment, such as by providing live sonar imagery on a chart in the proper location, orientation, and/or dimensional spacing.

Referencing FIG. 21, a processor 410 may be configured to receive location data from the position sensor 445, such as a global positioning system (GPS) sensor. The processor 410 may determine a location, e.g. geographical location, based on the location data and correlate the geographic location with a corresponding chart location in the nautical chart. Chart data associated with the chart 790 (see FIG. 10) may be stored in a memory, such as, referring back to FIG. 21, the memory 420 or remote device 454, from which the processor 410 may retrieve the chart data as necessary for rendering to the display 440.

The processor 410 may also be configured to receive sonar return data in response to the one or more sonar signals being transmitted into the body of water 101. As discussed above, the processor 410 may be configured to generate one or more sonar images based on the one or more sonar returns. In some embodiments, sonar return data from multiple of the sonar transducer assemblies, such as described herein, may be combined or otherwise integrated to form a sonar image of the overall coverage volume. The processor 410 may determine corresponding facing directions for each sonar transducer assembly and cause relative presentation of the sonar imagery based thereon to form the sonar image of the overall coverage volume. In some embodiments, the sonar transducer assemblies may include one or more sensors that may enable the processor to correlate received sonar return data with a facing direction for use in forming the sonar imagery. In some embodiments, certain sonar transducer assemblies may be assigned or predetermined for their relative orientations. In some embodiments, the resultant sonar image may be a composite of multiple sonar images. In some embodiments, the entire sonar image may be generated together.

The processor 410 may determine a location associated with the sonar return data based on location data received by the position sensor 445 at the time in which the sonar returns were received by the one or more transducer assemblies 102a, 102b, 102c (e.g., one or more of sonar transducer assemblies 462, 462', 462" in FIG. 21). The processor 410 may be configured to correlate the corresponding sonar return data (from the sonar returns) and/or the location data in real time such as by adding location data to the sonar return data and/or sonar image data, or by correlation of time stamps included in the location data and the sonar return data or sonar images. The sonar images may include, without limitation, sidescan 2D sonar images, 3D downscan sonar images, 3D sonar images, 2D and/or 3D live (e.g. real time or near real time) sonar images, or the like. The processor 410 may be configured to render the sonar images on the display 440 in real time or near real time, and/or store the sonar images and corresponding location information in a memory, such as the memory 420 or the remote device 454.

In some embodiments, the system may be configured to cause presentation of chart (e.g., nautical chart) on a display, along with a representation of the watercraft at a current location within the chart. The chart may be stored in memory and/or gathered via an external or internal network. The position and/or orientation of the watercraft may be determined via position/orientation data, such as from a global positioning system (GPS) and/or other source(s). Returning to FIG. 10, an example display 705 (e.g., the display 440 of the marine electronic device 405 shown in FIG. 21) is presenting a chart 790. The chart 790 includes a representation of the watercraft 711 at a current location within the chart (e.g., such as may be determined based on position data). As illustrated, the representation of the watercraft 711 may have a relative size, such as may correspond to the zoom level of the chart 790, and a direction that indicates in which direction the watercraft 711 is pointing (e.g., such as may be based on orientation data and/or recent/current position data). The body of water may be illustrated as 712, such as in comparison to land, which is illustrated as 714. The chart 790 may also include depth readings and/or contour lines, such as may be pre-stored and/or may be updated based on various incoming data (e.g., tidal data, sonar data, satellite data, etc.).

In some embodiments, the system may be configured to operate one or more sonar transducer assemblies associated with the watercraft. For example, the system may be configured to operate one or more arrays of a plurality of sonar transducer elements, such as from the sonar transducer assembly 602 shown in FIG. 5. Accordingly, the system may cause one or more sonar transducer assemblies associated with the watercraft to transmit sonar beams into the underwater environment and receive sonar returns therefrom (forming sonar return data). Accordingly, the system may be configured to receive the sonar return data, such as from the operated array. In some embodiments, the system may be configured to generate one or more sonar images, such as from the received sonar return data. An example sonar image is a two-dimensional live sonar image, such as shown in and described with respect to FIG. 9. Notably, any type of sonar transducer assembly and corresponding sonar image is contemplated by various embodiments of the present invention.

In some embodiments, the system may be configured to determine the facing direction of the sonar transducer assembly. In some embodiments, direction data (e.g., orientation data, compass data, etc.) may be determined regarding at least one of the watercraft or the sonar transducer assembly. For example, the relative facing direction of the sonar transducer assembly with respect to the watercraft may be known and fixed (e.g., forward, rearward, 10 degrees port of forward, etc.). In that case, the facing direction may be determined by determining the direction the watercraft is facing and then extracting out the facing direction of the sonar transducer assembly. In some cases, however, the sonar transducer assembly may have its own sensor for determining the facing direction (e.g., a direction sensor, GPS, orientation sensor, etc.) and the facing direction may be determined based on that data. Alternatively, the facing direction may be determined in other ways, such as being inputted by a user. FIG. 10 illustrates that the sonar transducer assembly utilized to generate the sonar image 740 has a facing direction $FD_1$ that is angled from the forward direction WD of the watercraft.

In some embodiments, the system is configured to cause, on the display, presentation of the sonar image in the facing direction on the chart and relative to the representation of the watercraft. In this regard, the sonar image is presented in the facing direction on the chart so as to provide live sonar imagery on the chart to visually provide a relationship between objects within the live sonar imagery and a real-world position of the objects. Referring to FIG. 10, the sonar image 793 is presented in the facing direction WD corresponding to the facing directions of the sonar transducer assembly that were utilized to generate the sonar image 793. Accordingly, the sonar image 793 extends forward of the representation of the watercraft 711. Additionally, the angle of coverage for the sonar image 793 corresponds to the overall sonar coverage angle of the sonar beams received by the sonar transducer assembly. In the sonar image 793, depth (or distance) readings are not provided (although some sonar images may include depth or distance readings). In some embodiments, user input may be provided (such as to the menu 718) to cause presentation of the sonar image 793 on the chart 790 and/or other functionality.

In some embodiments, the radial distance of the sonar image (e.g., radial distance $D_{RSI}$ in FIG. 9) may be utilized to adjust the distance the sonar image 793 extends when presented on the chart 790 such that the presentation of the sonar image 793 on the chart 790 dimensionally corresponds to the actual sonar coverage offered by the sonar transducer assembly. In some embodiments, the sonar transducer assembly may be aimed to emit sonar beams in a generally horizontal plane, such as parallel (or generally parallel) to the surface of the body of water. Accordingly, the resulting sonar image and the distance measurements therein (e.g., based on time of flight of the sonar returns) may correlate with real-world distance in the horizontal plane (e.g., that can be illustrated on the flat chart). In this regard, a user can accurately determine the real-world position of objects visible in the sonar image 793. For example, the user may be able to tell that there is a sunken boat off to the forward and starboard side and may even be able to utilize real-world markers (such as noted in the chart—e.g., a buoy) to mentally envision or determine the position of the sunken boat.

In some embodiments, the sonar image may be generated and/or presented to remove any unnecessary or unused space (e.g., so as to not detract from the view of the chart itself). For example, the blank corners 723a, 723b of the sonar image 720 of FIG. 9 may be removed prior to presentation of the sonar image on the chart. In this regard, only the active sonar imagery is shown on the chart. In some embodiments, only a portion of the sonar image may be shown depending on the desired view (e.g., to form a certain view angle for example).

As noted above, in some embodiments, the sonar image may be a live sonar image. In this regard, in some such embodiments, the sonar image 793 may be updated in real-time while being presented on the chart.

In addition to making it easier to determine real-world positions of objects within the sonar image, utilizing this feature enables a reduction of the number of images that are displayed (e.g., a normal split-screen chart and sonar view may be replaced with a single larger chart view with the sonar image presented thereon). In some embodiments, various navigation and other chart features may be presented along with the sonar image on the chart.

In some embodiments, the relative position of the sonar transducer on the watercraft may be accounted for when forming and/or presenting the sonar image. In this regard, a sonar image from a sonar transducer assembly positioned near the front of the watercraft (e.g., mounted to the front of the watercraft, mounted to a trolling motor positioned on the front of the watercraft, etc.) may extend from a point on the representation of the watercraft near the front. Likewise, a sonar image from a sonar transducer assembly positioned near the rear of the watercraft (e.g., mounted to the rear of the watercraft, mounted to a trolling motor positioned on the rear of the watercraft, etc.) may extend from a point on the representation of the watercraft near the rear. Other relative positions are also contemplated. In some embodiments, position data associated with the sonar transducer assembly may be utilized directly from the sonar transducer assembly (e.g., as opposed to from the watercraft) to determine where to position the sonar image on the chart. In some embodiments, the relative position of the sonar transducer on the watercraft may be known (or inputted), which can be used to position the sonar image on the chart relative to the representation of the watercraft.

In some embodiments, the sonar transducer assembly may be rotatable with respect to the watercraft. For example, the sonar transducer assembly may be mounted to a trolling motor that is rotatable with respect to the watercraft. As another example, the sonar transducer assembly may be mounted to a rod or directly mounted to the watercraft in a manner that enables rotation (e.g., manually and/or mechanically). In some such embodiments, it may be desirable to provide a direction sensor (e.g., direction sensor, orientation sensor, etc.) with the sonar transducer assembly to enable detection of the facing direction of the sonar transducer assembly. Accordingly, in some embodiments, the system may be configured to re-orient the sonar image (such as with respect to the watercraft) based on the current facing direction.

In some embodiments, the system may include one or more additional sonar transducer assemblies or arrays. Such additional sonar transducer assemblies or arrays may be formed of any configuration of sonar transducer elements. For example, the watercraft may include other types of sonar transducer assemblies, such as downscan transducer elements (traditional and/or linear), sidescan transducer elements, or other arrays of transducer elements. In some embodiments, the system may be configured to generate and present corresponding sonar images on the chart, such as in the proper orientation and at the proper location. In some embodiments, multiple sonar images may be presented on the chart simultaneously.

In some embodiments, the additional sonar transducer assemblies or arrays may be aimed in a different facing direction than the first sonar transducer assembly. In some such embodiments, the multiple sonar images may be presented on the chart at the same time, thereby providing a composite sonar image that covers a large section of the chart (and the underwater environment). For example, a first sonar image may define a first coverage area (with a first overall coverage angle) in a horizontal plane extending outwardly from the watercraft and a second sonar image may define a second coverage area (with a second overall coverage angle) in the horizontal plane extending outwardly from the watercraft, where the first coverage area is different than the second coverage area. In some embodiments, the coverage areas may be configured so as to not overlap.

In some embodiments, the multiple sonar transducer assemblies or arrays may be positioned (e.g., and mounted) and aimed to coordinate together to form a desirable coverage volume. For example, two sonar transducer assemblies with a similar configuration may be aimed in different facing directions, but the sonar transducer assemblies may be compliments to each other such that the two sonar coverage volume are positioned to form a continuous composite sonar coverage volume. Such a continuous composite sonar coverage volume may, for example, cover an angle range extending from the watercraft (e.g., 240 degrees, 360 degrees, or some other degree range). For example, FIG. 10 illustrates a chart 790 being presented on a display 705. A representation of the watercraft 711 is presented and is oriented in a direction WD. A first sonar transducer assembly is aimed in a first facing direction FD1 off to the port side of the watercraft and is used to generate the first sonar image 792, which is presented on the chart. A second sonar transducer assembly is aimed in a second facing direction FD2 off to the starboard side of the watercraft and is used to generate the second sonar image 793, which is presented on the chart. Notably, each sonar image has a sonar coverage angle of about 135 degrees. Accordingly, the sonar transducer assemblies are aimed such that the right side of the first sonar image 792 abuts the left side of the second sonar image 793, which also happens to be occurring in the direction the watercraft is facing WD. This forms a sonar coverage angle of 270 degrees around the watercraft. Notably, in the illustrated embodiment, the sonar image provides live sonar imagery, giving the user a live image in a large coverage area around the watercraft. In some embodiments, the two sonar transducer assemblies may be rotatable with respect to the watercraft to enable rotation of the sonar image on the chart (as described above). In some embodiments, one or more of the sonar transducer assemblies may be independently rotatable to enable greater flexibility in sonar coverage, such as via user control and/or according to automatic scan patterns.

In some embodiments, the sonar system may be designed to provide 360 degrees of coverage around the watercraft. For example, multiple arrays and/or multiple sonar transducer assemblies may be arranged in appropriate facing directions and have appropriate sonar coverage to enable the full 360 degree view. In some examples, the resulting sonar image may include live sonar imagery over the entire coverage area. Additionally or alternatively, in some embodiments, the 360 degree sonar image may be built up as the one or more sonar transducer assemblies or arrays rotate about the watercraft. FIG. 11 illustrates an example sonar image 798 that provides 360 degrees of sonar coverage around the watercraft.

Multiple sonar transducer assemblies may be used to increase the sonar coverage volume, and various brackets are contemplated herein that may be used to mount and position one or more sonar transducer assemblies. FIG. 12A illustrates a perspective view of a system for generating live sonar images. FIG. 12B illustrates a front view of the system of FIG. 12A. FIG. 12C illustrates a top, schematic view of the system of FIG. 12A.

As illustrated in FIG. 12A, the system may position a first sonar transducer assembly 1202A and a second sonar transducer assembly 1202B on a bracket 1306 (see FIG. 13). In the illustrated embodiment, the bracket 1306 (see FIG. 13) is attached to the first sonar transducer assembly 1202A and the second sonar transducer assembly 1202B, and the bracket 1306 (see FIG. 13) is attached to the clamp 1208. The clamp 1208 may be configured to be attached to an object by receiving the object in an internal volume 1413 (see FIG. 14A) of the clamp 1208. In the illustrated embodiment, the clamp 1208 is attached to a pole 1210 (e.g., a shaft) connected to a trolling motor housing 1212, and the pole 1210 is received in the internal volume 1413 (see FIG. 14A) of the clamp 1208.

The first sonar transducer assembly 1202A and the second sonar transducer assembly 1202B may each be similar to the sonar transducer assembly 602 of FIGS. 5 and 6 and other sonar transducer assemblies described herein. Thus, the first sonar transducer assembly 1202A may include a first array 620 (see FIG. 6), a second array 630 (see FIG. 6), and a third array 640 (see FIG. 6) of sonar transducer elements with each of the arrays oriented at different facing directions. Similarly, the second sonar transducer assembly 1202B may include three arrays of sonar transducer elements with each of the arrays oriented at different facing directions. The first sonar transducer assembly 1202A and the second sonar transducer assembly 1202B may also be oriented at different facing directions. By varying the facing direction of the sonar transducer assemblies and the arrays within the sonar transducer assemblies, the overall coverage volume may be increased while still providing continuous coverage.

Looking now at FIG. 12C, the combined coverage volume of the system is illustrated. The first sonar transducer assembly 1202A and the second sonar transducer assembly 1202B may be similar to other sonar transducer arrays discussed herein (see, e.g. sonar transducer assembly 602 of FIG. 5). The first sonar transducer assembly 1202A may possess a first facing direction and a first coverage volume 1227A, and this first coverage volume 1227A may be defined by a first angle (A1) (e.g., a first horizontal coverage angle). The second sonar transducer assembly 1202B may possess a second facing direction and a second coverage volume 1227B, and this second coverage volume 1227B may be defined by a second angle (A2) (e.g., a second horizontal coverage angle). In the illustrated embodiment, the first angle (A1) and the second angle (A2) are both one hundred thirty-five (135) degrees. With no overlapping area between the first coverage volume 1227A and the second coverage volume 1227B, the combined coverage volume of the system of FIG. 12C has a combined horizontal coverage angle of two hundred seventy (270) degrees. In some embodiments, the overall coverage volume may have a horizontal coverage angle that is greater than one hundred forty (140) degrees. In some embodiments, the overall coverage volume may have a horizontal coverage angle that is at least one hundred fifty (150) degrees. In some embodiments, the overall coverage volume may have a horizontal coverage angle that is at least one hundred eighty (180) degrees. In some embodiments, the overall coverage volume may have a horizontal coverage angle that is at least two hundred seventy (270) degrees, as illustrated in FIG. 12C. In some embodiments, the overall coverage volume may have a horizontal coverage angle that is a full three hundred sixty (360) degrees (see, e.g., FIG. 18).

FIG. 13 illustrates a perspective view of the system of FIG. 12A where all sonar transducer assemblies are hidden. Thus, the attachment of the bracket 1306 and the clamp 1308 may be more easily seen. Furthermore, the clamp 1308 is attached to a pole 1310 that is connected to a trolling motor housing 1312, and the pole 1310 is received in the internal volume of the clamp 1308.

Brackets utilized to receive and position sonar transducer assemblies may be attached to a pole or some other object using a clamp, and the engagement of a bracket and clamp are illustrated in FIGS. 14A-14B. FIG. 14A illustrates a perspective view of a clamp 1408 and a bracket 1406 that may be used to position one or more sonar transducer assemblies. FIG. 14B illustrates a top view of the clamp 1408 and bracket 1406 of FIG. 14A. The clamp 1408 defines an internal volume 1413. As illustrated in FIG. 14A, the clamp 1408 includes a first portion 1408A and a second portion 1408B, and the internal volume 1413 may be defined between the first portion 1408A and the second portion 1408B. The clamp may be configured to be attached to an object by receiving the object within the internal volume 1413 and by securing the first portion 1408A and the second portion 1408B around the object. In some embodiments, the clamp 1408 may be used to assist in attaching one or more brackets to a pole, a trolling motor, a primary motor, a stern, or a hull. In the illustrated embodiments, the clamp 1408 is configured to attach to a pole associated with a trolling motor housing by receiving the pole within the internal volume 1413.

As illustrated in FIG. 14B, the internal volume 1413 of the clamp 1408 may define a center point. When a bracket 1406 is attached to the clamp 1408, a connecting arm 1506C (see FIG. 15A) of the bracket 1406 is offset by an offset distance (B) from a center point of the internal volume 1413 when the bracket 1406 is attached to the clamp 1408. In FIG. 14B, this offset distance (B) is the shortest distance from the center point of the internal volume 1413 to the plane illustrated by line 1419 in FIG. 14B. The plane illustrated by line 1419 in FIG. 14B extends perpendicularly to the first surface 1537 (see FIG. 15A) of the connecting arm 1506C (see FIG. 15A) of the clamp 1408 and also extends lengthwise along the center of the connecting arm 1506C (see FIG. 15A). Notably, the offset distance (B) may assist in keeping the mounted sonar transducer assemblies out of the way during stowing of the trolling motor and shaft that the bracket may be attached to. For example, during stowing of the trolling motor, the shaft is laid substantially horizontally on (or parallel to) the deck of the watercraft. The offset distance (B) may account for the angle of one or more of the mounting arms of the bracket and the relative position of one or more of the sonar transducer assemblies mounted thereto—still allowing the shaft of the trolling motor to enter a stowed position while maintaining mounting of the sonar transducer assemblies.

Brackets are contemplated herein having the ability to receive and position two different sonar transducer assemblies, and FIGS. 15A-15E illustrate various views of one such bracket. FIG. 15A illustrates a perspective view of the bracket of FIG. 14A in isolation. FIG. 15B illustrates a front view of the bracket 1506 of FIG. 15A. FIG. 15C illustrates a right-side view of the bracket 1506 of FIG. 15A. FIG. 15D illustrates a rear view of the bracket 1506 of FIG. 15A. FIG. 15E illustrates a top view of the bracket 1506 of FIG. 15A.

Looking first at FIG. 15A, the bracket 1506 is illustrated with a first arm 1506A and a second arm 1506B. A connecting arm 1506C connects the first arm 1506A and the second arm 1506B. The first arm 1506A may be configured to receive the first sonar transducer assembly 1202A (see FIG. 12A), and the first arm 1506A may be connected to the connecting arm 1506C at a first end of the connecting arm 1506C. The second arm 1506B may be configured to receive the second sonar transducer assembly 1202B (see FIG. 12A), and the second arm 1506B may be connected to the connecting arm 1506C at a second end of the connecting arm 1506C. The connecting arm 1506C extends in a lengthwise direction from the first end to the second end. This lengthwise direction is represented by the line 1543 in FIG. 15D.

Each of the first arm 1506A and the second arm 1506B may include various alignment features. For example, the first arm 1506A includes a first bar 1517A, a first patterned surface 1519A, protrusions 1525A, and/or first knob 1527A. Additionally, the second arm 1506B may include alignment features in the form of second bar 1517B, a second patterned surface 1519B, protrusions 1525B, and/or second knob 1527B. The first patterned surface 1519A and the second patterned surface 1519B may include a plurality of elevated regions and depressed regions, and the patterned surfaces may be configured to assist with positioning of sonar transducer assemblies, to assist in retaining the sonar transducer assembly in position, and/or to assist in preventing inadvertent rotation or movement of the sonar transducer assemblies. The first bar 1517A and the second bar 1517B may be received in a sonar transducer assembly to restrain the lateral movement of the respective sonar transducer assemblies. The first bar 1517A may be attached to the first knob 1527A, and rotation of the first knob 1527A may result in rotation of the first bar 1517A and any sonar transducer assembly attached to the first bar 1517A. Similarly, the second bar 1517B may be attached to the second knob 1527B, and rotation of the second knob 1527B may result in rotation of the second bar 1517B and any sonar transducer assembly attached to the second bar 1517B. Furthermore, the protrusions 1525A and protrusions 1525B may be configured to assist a user in positioning a sonar transducer assembly at a desired angular orientation on the bracket 1506. The first arm 1506A possesses a first inclined surface 1533A, and some of the alignment features may be provided on the first inclined surface 1533A. The second arm 1506B possesses a second inclined surface 1533B, and some of the alignment features may be provided on the second inclined surface 1533B.

Using the first arm 1506A, the second arm 1506B, and the alignment features on the arms, sonar transducer assemblies may be positioned as desired. The sonar transducer assemblies may be positioned so that the first facing direction of the first sonar transducer assembly 1202A (see FIG. 12C) is different from the second facing direction of the second sonar transducer assembly 1202B (see FIG. 12C). By making the facing direction of these sonar transducer assemblies different, contiguous coverage may be provided and the overall coverage angle obtained in this contiguous coverage may be greater than the individual coverage angles of the first sonar transducer assembly 1202A and the second sonar transducer assembly 1202B.

The connecting arm 1506C defines a front surface 1537. The connecting arm 1506C possesses one or more holes 1539. These holes 1539 may be provided at the front surface 1537 and may extend through the connecting arm 1506C. These holes 1539 may be threaded holes in some embodiments. The holes 1539 may be used to assist in attaching the bracket 1506 to a clamp 1408 (see FIG. 14A) and to a pole 1310 (see FIG. 13) or some other object (e.g., a hull of a watercraft). The bracket 1506 may be attached to a variety of objects. For example, the bracket 1506 may be attached, directly or indirectly, to a pole, a trolling motor, a primary motor, or a hull.

Looking now at FIG. 15D, the slope of the first arm and the second arm is illustrated. The connecting arm 1506C may define a lengthwise direction, and this lengthwise direction is represented by the line 1543 in FIG. 15D. The first inclined surface 1533A (see FIG. 15B) of the first arm 1506A may define a first normal vector (N1). Due to the slope in the first inclined surface 1533A, the first normal vector (N1) may be angularly offset by a third angle (A3) from the lengthwise direction of the connecting arm 1506C. Thus, when the bracket 1506 is oriented in an upright manner as illustrated in FIG. 15D, the lengthwise direction may extend vertically and the third angle (A3) may define a downward slope relative to the horizontal towards the right. Similarly, the second inclined surface 1533B (see FIG. 15B) of the second arm 1506B may define a second normal vector (N2). Due to the slope in the second inclined surface 1533B, the second normal vector (N2) may be angularly offset by a fourth angle (A4) from the lengthwise direction of the connecting arm 1506C. Thus, when the bracket 1506 is oriented in an upright manner as illustrated in FIG. 15D, the fourth angle (A4) may define a downward slope relative to the horizontal towards the left. In some embodiments, the angle (A3) and the angle (A4) may be between five (5) degrees and twenty-five (25) degrees. In some embodiments, these angles may be between seven (7) degrees and twenty (20) degrees. In some embodiments, the angles may be between thirteen (13) degrees and fifteen (15) degrees. In the illustrated embodiment, the third angle (A3) and the fourth angle (A4) are equal to each other. However, the third angle (A3) and the fourth angle (A4) may not be equal in other embodiments.

The first arm 1506A defines a surface 1533A, and the first arm 1506A possesses a slope so that a normal to the surface 1533A is angularly offset from the lengthwise direction of the connecting arm 1506C.

Looking now at FIG. 15E, a lengthwise direction of the first arm 1506A is represented by a first line (L1), and a lengthwise direction of the second arm 1506B is represented by a second line (L2). Furthermore, a third normal vector (N3) is illustrated, with the third normal vector being normal to the front surface 1537 (see FIG. 15A) of the connecting arm 1506C (see FIG. 15A) of the bracket 1506 (see FIG. 15A). The lengthwise direction of the first arm 1506A is represented by the line 1579A in FIG. 15E, and the lengthwise direction of the first arm 1506A is angularly offset from the third normal vector (N3) by a fifth angle (A5). The lengthwise direction of the second arm 1506B is represented by the line 1579B in FIG. 15E, and the lengthwise direction of the second arm 1506B is angularly offset from the third normal vector (N3) by a sixth angle (A6). The fifth angle (A5) and the sixth angle (A6) may be different from each other in some embodiments, but the two angles are the same in the illustrated embodiment (albeit in opposite directions relative to the third normal vector (N3)). In some embodiments, the fifth angle (A5) and the sixth angle (A6) may be between zero degrees and thirty (30) degrees. However, the angles may take a wide variety of values. Extension of the first arm 1506A at the fifth angle (A5) and extension of the second arm 1506B at the sixth angle (A6) may reduce an overall footprint of the system with attachments when the first sonar transducer assembly 1202A (see FIG. 12A) and the second sonar transducer assembly 1202B (see FIG. 12A) are received on the bracket 1506.

While brackets are described having the ability to receive and position multiple sonar transducer assemblies, other brackets may be provided having only the ability to receive and position a single sonar transducer assembly. FIG. 16 illustrates a front view of two separate brackets 1606' and 1606" that may each be configured to position a respective sonar transducer assembly. A first bracket 1606' is illustrated in FIG. 16 as having a first arm 1606A, and the first bracket 1606' may be configured to receive/mount and position a first sonar transducer assembly at the first arm 1606A. A second bracket 1606" is illustrated with a second arm 1606B, and the second bracket may be configured to receive/mount and position a second sonar transducer assembly at the second arm 1606B. Alignment features may be provided on the first arm 1606A and the second arm 1606B. For example, alignment features on the first arm 1606A may include a first bar 1617A and a first knob 1627A as illustrated, and alignment features on the second arm 1606B may include a second bar 1617B and a second knob 1627B as illustrated. However, other alignment features described herein may be provided on the first arm 1606A and the second arm 1606B. The first arm 1606A of the first bracket 1606' possesses a first inclined surface 1633A with a downward slope, and the second arm 1606B of the second bracket 1606" possesses a second inclined surface 1633B with a downward slope. Thus, when the first bracket 1606' and the second bracket 1606" are oriented in an upright manner as illustrated in FIG. 16, the sonar transducer assemblies received on those brackets may be directed at a downward angle. This may be beneficial to maximize the sonar coverage within the body of water by reducing the amount of sonar coverage extending up to the surface of the body of water. The first bracket 1606' may possess one or more holes 1639 at a first connecting arm 1606C', and the second bracket 1606" may possess one or more holes 1639 at a second connecting arm 1606C". These holes 1639 may be configured to permit easy attachment to a clamp similar to clamp 1408 (see FIG. 14B), and the holes 1639 may be threaded in some embodiments. The first bracket 1606' and the second bracket 1606" may be attached to a single clamp or the two brackets may be attached to separate clamps. The brackets may also be attached to objects without the use of any clamp in some embodiments (e.g. the brackets may be fastened or welded directly to an object).

In some embodiments, a bracket may be provided with the ability to receive and position four different sonar transducer assemblies. FIG. 17 illustrates a right-side view of a bracket 1706 that may be configured to position four sonar transducer assemblies. As illustrated in FIG. 17, the bracket 1706 may include a first arm 1706A, a second arm 1706B, a third arm 1706C, and a fourth arm 1706D. Each of the arms may possess alignment features as described herein. Furthermore each of the arms may be configured to receive a sonar transducer assembly. Using the bracket 1706, sonar transducer assemblies may be positioned in a manner that will permit 360 degrees of coverage to be obtained. The bracket 1706 may be attached to a single clamp 1408 (see FIG. 14B) in some embodiments. The bracket 1706 may be provided by taking two of the brackets 1506 and attaching the connecting arms 1506C of the brackets 1506 together. This attachment may be accomplished through welding, through the use of fasteners, etc. Alternatively, the bracket 1706 may be created as one integral piece without any further attachment being required.

In various embodiments, sonar transducer assemblies may be arranged in a manner that is configured to permit the generation of live sonar images having 360 degrees of coverage. FIGS. 18-20 illustrate perspective views of different embodiments where 360 degrees of coverage may be obtained.

Looking first at FIG. 18, an embodiment is illustrated where a first bracket 1806A and a second bracket 1806B are included. The first bracket 1806A is configured to hold a first sonar transducer assembly 1802A and a second sonar transducer assembly 1802B, and the second bracket 1806B is configured to hold a third sonar transducer assembly 1802C and a fourth sonar transducer assembly 1802D. In the illustrated embodiment, a first clamp 1808A is used to assist in attaching the first bracket 1806A to a pole 1810, and a second clamp 1808B is used to assist in attaching the second bracket 1806B to the pole 1810. The pole 1810 is connected to a trolling motor housing 1812. Thus, in the embodiment of FIG. 18, four sonar assemblies, two brackets, and two clamps are used. The first bracket 1806A may possess alignment features that may be configured to position the sonar transducer assemblies so that they each possess a different facing direction. With the embodiment of FIG. 18, the sonar transducer assemblies may be positioned in a manner that will permit 360 degrees of coverage to be obtained.

Turning now to FIG. 19, an embodiment is illustrated where a first bracket 1906A and a modified second bracket 1906B are utilized. The first bracket 1906A is configured to hold a first sonar transducer assembly 1902A and a second sonar transducer assembly 1902B, and the second bracket 1906B is configured to hold a third sonar transducer assembly 1902C. In the illustrated embodiment, a first clamp 1908A is used to assist in attaching the first bracket 1906A to a pole 1910, and a second clamp 1908B is used to assist in attaching the modified second bracket 1906B to the pole 1910. The pole 1910 is connected to a trolling motor housing 1912. Thus, in the embodiment of FIG. 19, three sonar assemblies, two brackets, and two clamps are used.

With the embodiment of FIG. 19, the sonar transducer assemblies may be positioned in a manner that will permit three hundred sixty (360) degrees of coverage to be obtained—for example, the first sonar transducer assembly 1902A and the second sonar transducer assembly 1902B may have a combined coverage area of two hundred seventy (270) degrees together (see FIG. 12C and corresponding discussion), and the third sonar transducer assembly 1902C may be positioned in a manner to cover the final ninety (90) degrees so that a full three hundred sixty (360) degree coverage area may be obtained. While a modified second bracket 1906B is used, another bracket similar to bracket 1506 (see FIG. 15D) may be used instead of the modified second bracket 1906B, and only a single sonar transducer assembly may be received on the bracket. Using only three sonar transducer assemblies (rather than using four or more sonar transducer assemblies) may be beneficial to reduce the cost of system. The brackets 1906A, 1906B may possess alignment features that may be configured to position the sonar transducer assemblies so that they each possess a different facing direction.

Looking now at FIG. 20, an embodiment is illustrated where a first bracket 2006A and a second bracket 2006B are included. The first bracket 2006A is configured to hold a first sonar transducer assembly 2002A and a second sonar transducer assembly 2002B, and the second bracket 2006B is configured to hold a third sonar transducer assembly 2002C and a fourth sonar transducer assembly 2002D. In the illustrated embodiment, a single clamp 2008 is used to assist in attaching the first bracket 2006A and the second bracket 2006B to a pole 2010. The pole 2010 is connected to a trolling motor housing 2012. Thus, in the embodiment of FIG. 20, four sonar assemblies, two brackets, and one clamp are used. With the embodiment of FIG. 20, the sonar transducer assemblies may be positioned in a manner that will permit three hundred sixty (360) degrees of coverage to be obtained. Three hundred sixty (360) degrees of coverage may also be accomplished through the use of the bracket 1706 of FIG. 17, with four sonar transducers being received on the single bracket 1706 and with a single clamp being used to assist in attaching the bracket 1706 to a pole. The first bracket 2006A and the second bracket 2006B may possess alignment features that may be configured to position the sonar transducer assemblies so that they each possess a different facing direction. With the embodiment of FIG. 18, the sonar transducer assemblies may be positioned in a manner that will permit three hundred sixty (360) degrees of coverage to be obtained.

Though various illustrated embodiments show various brackets attached to a shaft of a trolling motor, other mountings are contemplated, such as on a pole separate from a trolling motor shaft (although the pole may be attached to a trolling motor shaft).

Example Architecture

FIG. 21 illustrates a block diagram of an example system 400 according to various embodiments of the present invention described herein. The illustrated system 400 includes a marine electronic device 405. The system 400 may comprise numerous marine devices. As shown in FIG. 21, one or more sonar transducer assemblies 462 may be provided. A radar 456, a rudder 457, a primary motor 458, a trolling motor 459, and additional sensors/devices 460 may also be provided as marine devices, but other marine devices may be provided as well. One or more marine devices may be implemented on the marine electronic device 405. For example, a position sensor 445, a direction sensor 448, an autopilot 450, and other sensors 452 may be provided within the marine electronic device 405. These marine devices can be integrated within the marine electronic device 405, integrated on a watercraft at another location and connected to the marine electronic device 405, and/or the marine devices may be implemented at a remote device 454 in some embodiments. The system 400 may include any number of different systems, modules, or components; each of which may comprise any device or means embodied in either hardware, software, or a combination of hardware and software configured to perform one or more corresponding functions described herein.

The marine electronic device 405 may include at least one processor 410, a memory 420, a communication interface 430, a user interface 435, a display 440, autopilot 450, and one or more sensors (e.g. position sensor 445, direction sensor 448, other sensors 452). One or more of the components of the marine electronic device 405 may be located within a housing or could be separated into multiple different housings (e.g., be remotely located).

The processor(s) 410 may be any means configured to execute various programmed operations or instructions stored in a memory device (e.g., memory 420) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 410 as described herein. For example, the at least one processor 410 may be configured to analyze sonar return data for various features/functions described herein (e.g., generate a sonar image, determine an object and/or object position, etc.).

In some embodiments, the at least one processor 410 may be further configured to implement signal processing. In some embodiments, the at least one processor 410 may be configured to perform enhancement features to improve the display characteristics of data or images, collect or process additional data, such as time, temperature, GPS information, waypoint designations, or others, or may filter extraneous data to better analyze the collected data. The at least one processor 410 may further implement notices and alarms, such as those determined or adjusted by a user, to reflect proximity of other objects (e.g., represented in sonar data), to reflect proximity of other vehicles (e.g. watercraft), approaching storms, etc.

In an example embodiment, the memory 420 may include one or more non-transitory storage or memory devices such as, for example, volatile and/or non-volatile memory that may be either fixed or removable. The memory 420 may be configured to store instructions, computer program code, sonar data, and additional data such as radar data, chart data, location/position data in a non-transitory computer readable medium for use, such as by the at least one processor 410 for enabling the marine electronic device 405 to carry out various functions in accordance with example embodiments of the present invention. For example, the memory 420 could be configured to buffer input data for processing by the at least one processor 410. Additionally or alternatively, the memory 420 could be configured to store instructions for execution by the at least one processor 410.

The communication interface 430 may be configured to enable communication to external systems (e.g. an external network 402). In this manner, the marine electronic device 405 may retrieve stored data from a remote device 454 via the external network 402 in addition to or as an alternative to the onboard memory 420. Additionally or alternatively, the marine electronic device 405 may transmit or receive data, such as sonar signal data, sonar return data, sonar image data, or the like to or from a sonar transducer assembly 462. In some embodiments, the marine electronic device 405 may also be configured to communicate with other devices or systems (such as through the external network 402 or through other communication networks, such as described herein). For example, the marine electronic device 405 may communicate with a propulsion system of the watercraft 100 (e.g., for autopilot control); a remote device (e.g., a user's mobile device, a handheld remote, etc.); or another system. Using the external network 402, the marine electronic device may communicate with and send and receive data with external sources such as a cloud, server, etc. The marine electronic device may send and receive various types of data. For example, the system may receive weather data, data from other fish locator applications, alert data, among others. However, this data is not required to be communicated using external network 402, and the data may instead be communicated using other approaches, such as through a physical or wireless connection via the communications interface 430.

The communications interface 430 of the marine electronic device 405 may also include one or more communications modules configured to communicate with one another in any of a number of different manners including, for example, via a network. In this regard, the communications interface 430 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sonar transducer assemblies) may be included in the system 400.

The position sensor 445 may be configured to determine the current position and/or location of the marine electronic device 405 (and/or the watercraft 100). For example, the position sensor 445 may comprise a GPS, bottom contour, inertial navigation system, such as machined electromagnetic sensor (MEMS), a ring laser gyroscope, or other location detection system. Alternatively or in addition to determining the location of the marine electronic device 405 or the watercraft 100, the position sensor 445 may also be configured to determine the position and/or orientation of an object outside of the watercraft 100.

The display 440 (e.g. one or more screens) may be configured to present images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In some embodiments, the display 440 may present one or more sets of data (or images generated from the one or more sets of data). Such data includes chart data, radar data, sonar data, weather data, location data, position data, orientation data, sonar data, or any other type of information relevant to the watercraft. Sonar data may be received from one or more sonar transducer assemblies 462 or from sonar devices positioned at other locations, such as remote from the watercraft. Additional data may be received from marine devices such as a radar 456, a primary motor 458 or an associated sensor, a trolling motor 459 or an associated sensor, an autopilot, a rudder 457 or an associated sensor, a position sensor 445, a direction sensor 448, other sensors 452, a remote device 454, onboard memory 420 (e.g., stored chart data, historical data, etc.), or other devices.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 21 is shown as being directly connected to the at least one processor 410 and within the marine electronic device 405, the display 440 could alternatively be remote from the at least one processor 410 and/or marine electronic device 405. Likewise, in some embodiments, the position sensor 445 and/or user interface 435 could be remote from the marine electronic device 405.

The marine electronic device 405 may include one or more other sensors/devices 452, such as configured to measure or sense various other conditions. The other sensors/devices 452 may include, for example, an air temperature sensor, a water temperature sensor, a current sensor, a light sensor, a wind sensor, a speed sensor, or the like.

The sonar transducer assemblies 462 illustrated in FIG. 21 may include one or more sonar transducer array(s) and/or elements 467, such as described herein. In some embodiments, additional separate sonar transducer elements (arranged to operate alone, in an array, or otherwise) may be included. The sonar transducer assemblies 462 may also include a sonar signal processor or other processor (although not shown) configured to perform various sonar processing. In some embodiments, the processor (e.g., at least one processor 410 in the marine electronic device 405, a controller (or processor portion) in the sonar transducer assemblies 462, or a remote controller—or combinations thereof) may be configured to filter sonar return data and/or selectively control transducer element(s) 467. For example, various processing devices (e.g., a multiplexer, a spectrum analyzer, A-to-D converter, etc.) may be utilized in controlling or filtering sonar return data and/or transmission of sonar signals from the transducer element(s) 467.

The sonar transducer assemblies 462 may also include one or more other systems, such as various sensor(s) 466. For example, the sonar transducer assembly 462 may include an orientation sensor, such as gyroscope or other orientation sensor (e.g., accelerometer, MEMS, direction, etc.) that can be configured to determine the relative orientation and/or direction of the sonar transducer assembly 462 and/or the one or more sonar transducer array(s) and/or element(s) 467—such as with respect to the watercraft. In some embodiments, additionally or alternatively, other types of sensor(s) are contemplated, such as, for example, a water temperature sensor, a current sensor, a light sensor, a wind sensor, a speed sensor, or the like.

The components presented in FIG. 21 may be rearranged to alter the connections between components. For example, in some embodiments, a marine device outside of the marine electronic device 405, such as the radar 456, may be directly connected to the at least one processor 410 rather than being connected to the communication interface 430. Additionally, sensors and devices implemented within the marine electronic device 405 may be directly connected to the communications interface in some embodiments rather than being directly connected to the at least one processor 410.

Example Flowchart(s) and Operations

Some embodiments of the present invention provide methods, apparatus, and computer program products related to the presentation of information according to various embodiments described herein. Various examples of the operations performed in accordance with embodiments of the present invention will now be provided with reference to FIGS. 22-23. FIG. 22 presents a flowchart with example method(s) of presenting a sonar image over a chart according to various embodiments described herein, and FIG. 23 illustrates a flowchart of an example method of displaying a sonar image according to various embodiments described herein. These methods may be performed by a wide variety of components, including, but not limited to, one or more processors, one or more microprocessors, and one or more controllers. In some embodiments, a marine electronic device 405 (see FIG. 21) may comprise one or more processors that perform the functions shown in FIG. 22. Further, these methods may be provided on a piece of software which runs on a central server that is at a remote location away from the watercraft, and the remote server may communicate with a processor or a similar component on the watercraft. Additionally, the methods could be integrated into a software update that may be installed onto existing hardware, or the methods may be integrated into the initial software or hardware provided in a radar unit, watercraft, server, etc.

FIG. 22 is a flowchart of an example method 800 for presenting a sonar image over a chart, in accordance with some embodiments discussed herein. The operations illustrated in and described with respect to FIG. 22 may, for example, be performed by, with the assistance of, and/or under the control of one or more of the processor 410, memory 420, communication interface 430, user interface 435, position sensor 445, direction sensor 448, other sensor 452, autopilot 450, transducer assembly 462, 462', 462", display 440, radar 456, rudder 457, primary motor 458, trolling motor 459, additional sensors 460, and/or external network 402/remote device 454.

At operation 802, the method comprises causing presentation of a chart, including a representation of the watercraft at a current location within the chart. At operation 804, the method comprises operating an array of a plurality of elements of one or more transducer assemblies. At operation 806, the method comprises receiving sonar return data from the one or more transducer assemblies. At operation 808, the method comprises generating a sonar image, such as a live sonar image. Then, at operation 810, the method comprises determining a facing direction corresponding to the one or more transducer assemblies and/or the sonar image. At operation 812, the method comprises causing presentation of the sonar image on the chart in a facing direction at the current location for the watercraft. In some embodiments, the method may include, at operation 814, updating the sonar image. In some embodiments, at operation 816, the method may include causing presentation of an object indicator within the sonar image (which may include determining the object and/or tracking the object).

FIG. 23 illustrates a flowchart of an example method 2300 of displaying a sonar image. At operation 2302, a sonar transducer array is operated. This may entail causing sonar transducer elements associated with sonar transducer assemblies to transmit sonar beam(s) into the underwater environment. At operation 2304, sonar return data is received. The sonar return data may be received from the plurality of sonar transducer elements within sonar transducer assemblies. At operation 2306, a sonar image is generated. This sonar image may be a live sonar image of the underwater environment in some embodiments, and the sonar image may be based on the sonar return data received at operation 2304. In some embodiments sonar return data from each of the sonar transducer assemblies may be combined or otherwise integrated to form a sonar image of the overall coverage volume. In some embodiments, the sonar image may be a 360-degree live sonar image of the underwater environment. In some embodiments, the sonar image may be a two-dimensional live sonar image, and sonar return data used to form the sonar image may be received at substantially the same time by the sonar transducer elements. At operation 2308, presentation of the sonar image is caused. This presentation may be caused on a display 440 (see FIG. 21).

FIGS. 22-23 illustrate a flowchart of a system, method, and computer program product according to various example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system for generating live sonar images, the system comprising:
   a first sonar transducer assembly having a first plurality of sonar transducer elements, wherein the first sonar transducer assembly defines a first facing direction, wherein the first plurality of sonar transducer elements are configured to transmit one or more first sonar beams into an underwater environment to form a first coverage volume within the underwater environment;
   a second sonar transducer assembly having a second plurality of sonar transducer elements, wherein the second sonar transducer assembly defines a second facing direction, wherein the second plurality of sonar transducer elements are configured to transmit one or more second sonar beams into the underwater environment to form a second coverage volume within the underwater environment, wherein the first sonar transducer assembly is distinct from the second sonar transducer assembly; and
   a first bracket having one or more alignment features, wherein the first bracket is configured to mount both the first sonar transducer assembly and the second transducer assembly to a watercraft, wherein the one or more alignment features are configured to position the first sonar transducer assembly and the second sonar transducer assembly so that the first facing direction and the second facing direction are different and relative to each other so as to create continuous coverage of the underwater environment, wherein the continuous coverage has an overall coverage volume that is greater than either of the first coverage volume or the second coverage volume individually;
   wherein the first facing direction and the second facing direction are generally outward of the watercraft, wherein sonar return data from the first plurality of sonar transducer elements and the second plurality of sonar transducer elements is used to form a live sonar image representative of sonar returns received from the overall coverage volume.

2. The system of claim 1, further comprising
   at least one processor configured to:
      receive first sonar return data from the first plurality of sonar transducer elements and second sonar return data from the second plurality of sonar transducer elements; and
      generate the live sonar image based on the first sonar return data and the second sonar return data.

3. The system of claim 1, wherein the first bracket includes a first arm, a second arm, and a connecting arm, wherein the connecting arm connects the first arm and the second arm, wherein the first arm is configured to mount the first sonar transducer assembly, wherein the second arm is configured to mount the second sonar transducer assembly.

4. The system of claim 3, wherein the first arm is connected to the connecting arm at a first end of the connecting arm, wherein the second arm is connected to the connecting arm at a second end of the connecting arm, wherein the connecting arm extends in a lengthwise direction from the first end to the second end, wherein the first arm possesses a slope that is angularly offset from the lengthwise direction.

5. The system of claim 4, wherein the first bracket is oriented such that the lengthwise direction is a vertical direction, wherein the slope causes the first sonar transducer assembly to be rotated at a downward angle relative to a horizontal direction when mounted on the first arm.

6. The system of claim 4, wherein the connecting arm defines a first surface, wherein the first arm extends at a first angle that is angularly offset from the first surface, wherein the second arm extends at a second angle that is angularly offset from the first surface.

7. The system of claim 6, wherein the first angle is angularly offset from the first surface in a first direction, wherein the second angle is angularly offset from the first surface in a second direction that is the opposite of the first direction.

8. The system of claim 6, wherein extension of the first arm at the first angle and extension of the second arm at the second angle reduces an overall footprint of the first sonar transducer assembly and the second sonar transducer assembly when the first sonar transducer assembly and the second sonar transducer assembly are mounted on the first bracket.

9. The system of claim 1, further comprising:
a clamp defining an internal volume, wherein the clamp is configured to be attached to an object by receiving the object in the internal volume,
wherein the clamp is configured to be attached to the first bracket to assist in attaching the first bracket to the object, wherein a connecting arm of the first bracket is offset by some distance from a center point of the internal volume when the first bracket is attached to the clamp.

10. The system of claim 1, wherein the first bracket is attachable to at least one of a pole, a trolling motor, a primary motor, or a hull of the watercraft.

11. A system for generating live sonar images, the system comprising:
a first sonar transducer assembly having a first plurality of arrays of a first plurality of sonar transducer elements associated with a watercraft on a body of water and oriented with an emitting face in a first facing direction, wherein the first facing direction is generally outward of the watercraft, and
a second sonar transducer assembly having a second plurality of arrays of a second plurality of sonar transducer elements associated with the watercraft and oriented with an emitting face in a second facing direction, wherein the second facing direction is generally outward of the watercraft and different from the first facing direction, wherein the first sonar transducer assembly is distinct from the second sonar transducer assembly,
wherein the first plurality of sonar transducer elements and the second plurality of sonar transducer elements are configured to transmit sonar beams into an underwater environment to form an overall coverage volume with a continuous horizontal coverage angle, wherein the continuous horizontal coverage angle defines an angle that is greater than or equal to 180 degrees,
wherein sonar return data from the first plurality of sonar transducer elements and the second plurality of sonar transducer elements is used to form a live sonar image representative of sonar returns received from the overall coverage volume.

12. The system of claim 11, further comprising at least one processor configured to:
receive the sonar return data from the first plurality of sonar transducer elements and the second plurality of sonar transducer elements; and
generate the live sonar image of the underwater environment based on the sonar return data.

13. The system of claim 11, wherein the horizontal coverage angle defines an angle that is at least 270 degrees.

14. The system of claim 11, wherein the horizontal coverage angle defines an angle that is at least 360 degrees.

15. The system of claim 14, further comprising a third sonar transducer assembly having a third facing direction, wherein the first facing direction, the second facing direction, and the third facing direction are different, wherein the sonar return data is used to generate a 360 degree live sonar image.

16. The system of claim 15, further comprising a first bracket and a second bracket, wherein the first bracket is configured to mount the first sonar transducer assembly and the second sonar transducer assembly, wherein the second bracket is configured to mount the third sonar transducer assembly.

17. The system of claim 16, wherein the at least one sonar transducer assembly further comprises a fourth sonar transducer assembly, wherein the second bracket is configured to mount the third sonar transducer assembly and the fourth sonar transducer assembly.

18. The system of claim 11, further comprising:
a display;
at least one processor;
a memory including computer program code configured to, when executed, cause the at least one processor to:
cause the first plurality of sonar transducer elements and the second plurality of sonar transducer elements to transmit the sonar beams into the underwater environment;
receive the sonar return data;
generate the live sonar image of the underwater environment based on the sonar return data, wherein the live sonar image is a two-dimensional live sonar image that is formed of the sonar return data, and wherein the sonar return data used to form the live sonar image was received at substantially a same time by the plurality of sonar transducer elements; and
cause, on the display, presentation of the live sonar image.

19. A bracket for positioning sonar transducer assemblies, the bracket comprising:
a first arm having a first alignment feature,
a second arm having a second alignment feature, and
a connecting arm,
wherein the connecting arm connects the first arm and the second arm, wherein the connecting arm extends in a lengthwise direction between a first end and a second end, wherein the first arm is connected to the connecting arm at the first end, wherein the second arm is connected to the connecting arm at the second end, wherein the first alignment feature is configured to receive a first sonar transducer assembly and aim the first sonar transducer assembly in a first facing direction, wherein the second alignment feature is configured to receive a second sonar transducer assembly and aim the second sonar transducer assembly in a second facing direction, wherein the bracket is configured to position the first sonar transducer assembly and the second sonar transducer assembly such that the first sonar transducer assembly and the second sonar transducer assembly together provide an overall coverage volume with a horizontal coverage angle of greater than 140 degrees.

20. A system for generating live sonar images, the system comprising:
a first sonar transducer assembly having a first plurality of sonar transducer elements, wherein the first sonar transducer assembly defines a first facing direction, wherein the first plurality of sonar transducer elements are configured to transmit one or more first sonar beams into an underwater environment to form a first coverage volume within the underwater environment;

a second sonar transducer assembly having a second plurality of sonar transducer elements, wherein the second sonar transducer assembly defines a second facing direction, wherein the second plurality of sonar transducer elements are configured to transmit one or more second sonar beams into the underwater environment to form a second coverage volume within the underwater environment; and at least one bracket having one or more alignment features, wherein the at least one bracket includes a first bracket and a second bracket, wherein the first bracket is configured to mount the first sonar transducer assembly to a watercraft, wherein the second bracket is configured to mount the second sonar transducer assembly to the watercraft, wherein the one or more alignment features are configured to position the first sonar transducer assembly and the second sonar transducer assembly so that the first facing direction and the second facing direction are different and relative to each other so as to create continuous coverage of the underwater environment, wherein the continuous coverage has an overall coverage volume that is greater than either of the first coverage volume or the second coverage volume individually; wherein the first facing direction and the second facing direction are generally outward of the watercraft, wherein sonar return data from the first plurality of sonar transducer elements and the second plurality of sonar transducer elements is used to form a live sonar image representative of sonar returns received from the overall coverage volume.

* * * * *